(12) United States Patent
Brown et al.

(10) Patent No.: US 12,114,607 B1
(45) Date of Patent: Oct. 15, 2024

(54) LAWN TRACTOR WITH ELECTRONIC DRIVE AND CONTROL SYSTEM

(71) Applicant: Hydro-Gear Limited Partnership, Sullivan, IL (US)

(72) Inventors: Alyn G. Brown, Indianapolis, IN (US); K. Mike McCoy, Avon, IN (US); Gregory Barton Moebs, Avon, IN (US); Gregory E. Arends, Fishers, IN (US); Damon J. Hoyda, McCordsville, IN (US); Jesse L. Probst, Strasburg, IL (US); Joseph Hamilton, Indianapolis, IN (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 261 days.

(21) Appl. No.: 17/814,751

(22) Filed: Jul. 25, 2022

Related U.S. Application Data

(63) Continuation of application No. 17/181,793, filed on Feb. 22, 2021, now Pat. No. 11,395,458, which is a
(Continued)

(51) Int. Cl.
*A01D 34/00* (2006.01)
*A01D 69/02* (2006.01)
(Continued)

(52) U.S. Cl.
CPC ........... *A01D 69/02* (2013.01); *A01D 34/006* (2013.01); *A01D 69/025* (2013.01);
(Continued)

(58) Field of Classification Search
CPC .... A01D 69/02; A01D 34/006; A01D 69/025; A01D 34/66; A01D 2101/00;
(Continued)

(56) References Cited

U.S. PATENT DOCUMENTS 4,328,494 A    5/1982   Goodall
4,600,999 A    7/1986   Ito et al.
(Continued)

FOREIGN PATENT DOCUMENTS

DE        19645723        5/1997
DE      102007008910      8/2008
(Continued)

OTHER PUBLICATIONS

"Methodological approach to assess tractor stability in normal operation in field using a commercial warning device," Journal of Agricultural Engineering 2013, vol. XLIV (s2):e132.
(Continued)

*Primary Examiner* — Jaime Figueroa
(74) *Attorney, Agent, or Firm* — Neal, Gerber & Eisenberg LLP

(57) ABSTRACT

A drive and control system for a utility vehicle includes a CAN-Bus network and a vehicle control module operable to communicate signals to and from one or more components via the CAN-Bus network. The system includes first and second electric actuators with first and second electronic drive modules, respectively. The system includes a steering and drive input device and a steering and drive sensor module operable to post on the CAN-Bus network a steering and drive input command. The vehicle control module processes the steering and drive input command and post on the CAN-Bus network a steering and drive output command. The first and second electronic drive modules process and convert the steering and drive output command to appropriate first and second actuator commands to drive the first and second electric actuators to obtain the desired speed and direction of motion of the utility vehicle.

20 Claims, 35 Drawing Sheets

Related U.S. Application Data continuation of application No. 16/041,547, filed on Jul. 20, 2018, now Pat. No. 10,925,216, which is a continuation of application No. 15/640,300, filed on Jun. 30, 2017, now Pat. No. 10,058,031, which is a continuation-in-part of application No. 15/056,839, filed on Feb. 29, 2016, now Pat. No. 9,980,434.

(60) Provisional application No. 62/360,109, filed on Jul. 8, 2016, provisional application No. 62/357,758, filed on Jul. 1, 2016, provisional application No. 62/126,569, filed on Feb. 28, 2015.

(51) Int. Cl.
*B60K 7/00* (2006.01)
*B60K 17/00* (2006.01)
*B60K 17/14* (2006.01)
*B60K 17/356* (2006.01)
*B60R 16/023* (2006.01)
*A01D 34/66* (2006.01)
*A01D 101/00* (2006.01)

(52) U.S. Cl.
CPC .......... *B60K 7/0007* (2013.01); *B60K 7/0015* (2013.01); *B60K 17/00* (2013.01); *B60K 17/14* (2013.01); *B60K 17/356* (2013.01); *B60R 16/0231* (2013.01); *A01D 34/66* (2013.01); *A01D 2101/00* (2013.01); *B60Y 2200/221* (2013.01); *B60Y 2200/223* (2013.01); *B60Y 2400/30* (2013.01)

(58) Field of Classification Search
CPC .... B60K 7/0007; B60K 7/0015; B60K 17/00; B60K 17/14; B60K 17/356; B60R 16/0231; B60Y 2200/221; B60Y 2200/223; B60Y 2400/30
USPC ....................................................... 701/1, 50
See application file for complete search history.

(56) References Cited

U.S. PATENT DOCUMENTS

| | | | |
|---|---|---|---|
| 4,700,301 A | 10/1987 | Dyke | |
| 4,962,453 A | 10/1990 | Pong et al. | |
| 5,149,023 A | 9/1992 | Sakurai et al. | |
| 5,163,273 A | 11/1992 | Wojtkowski et al. | |
| 5,197,008 A | 3/1993 | Itoh et al. | |
| 5,204,814 A * | 4/1993 | Noonan | B60L 15/2036 701/25 |
| 5,528,888 A | 6/1996 | Miyamoto et al. | |
| 5,712,782 A | 1/1998 | Weigelt et al. | |
| 5,906,645 A | 5/1999 | Kagawa et al. | |
| 5,925,080 A | 7/1999 | Shimbara et al. | |
| 5,974,347 A * | 10/1999 | Nelson | B62D 1/28 701/410 |
| 6,009,358 A | 12/1999 | Angott et al. | |
| 6,052,647 A | 4/2000 | Parkinson et al. | |
| 6,101,795 A | 8/2000 | Diekhans | |
| 6,112,143 A | 8/2000 | Allen et al. | |
| 6,128,574 A | 10/2000 | Diekhans | |
| 6,230,089 B1 | 5/2001 | Lonn et al. | |
| 6,263,269 B1 | 7/2001 | Dannenberg | |
| 6,321,158 B1 | 11/2001 | DeLorme et al. | |
| 6,609,357 B1 | 8/2003 | Davis et al. | |
| 6,728,268 B1 | 4/2004 | Bird | |
| 6,757,583 B2 | 6/2004 | Giamona et al. | |
| 6,782,797 B1 | 8/2004 | Brandenburg et al. | |
| 6,808,032 B2 | 10/2004 | Wuertz et al. | |
| 6,851,067 B2 | 2/2005 | Indefrey | |
| 6,943,521 B2 | 9/2005 | Kurokawa et al. | |
| 7,089,721 B2 | 8/2006 | Turner et al. | |
| 7,154,814 B2 | 12/2006 | Straka | |
| 7,172,041 B2 | 2/2007 | Wuertz et al. | |
| 7,313,915 B1 | 1/2008 | Windhorst et al. | |
| 7,356,393 B1 | 4/2008 | Schlatre et al. | |
| 7,458,311 B2 | 12/2008 | Korthals | |
| 7,499,775 B2 | 3/2009 | Filippov et al. | |
| 7,503,173 B2 | 3/2009 | Dong et al. | |
| 7,511,711 B2 | 3/2009 | Ing et al. | |
| 7,575,437 B2 | 8/2009 | Mincek | |
| 7,590,481 B2 | 9/2009 | Lu et al. | |
| 7,610,122 B2 | 10/2009 | Anderson | |
| 7,705,553 B2 | 4/2010 | Worrall | |
| 7,748,480 B2 | 7/2010 | Loxterkamp et al. | |
| 7,855,573 B1 | 12/2010 | Yost | |
| 7,953,526 B2 | 5/2011 | Durkos et al. | |
| 7,975,786 B2 | 7/2011 | Ishii et al. | |
| 8,072,174 B2 | 12/2011 | Campbell et al. | |
| 8,078,338 B2 | 12/2011 | Pack et al. | |
| 8,191,342 B2 * | 6/2012 | Ishii | B60K 7/0015 56/320.1 |
| 8,207,693 B2 | 6/2012 | Hauser et al. | |
| 8,234,026 B2 | 7/2012 | Wyatt et al. | |
| 8,239,083 B2 | 8/2012 | Durkos et al. | |
| 8,275,516 B2 | 9/2012 | Murphy | |
| 8,301,714 B2 | 10/2012 | Johnson et al. | |
| 8,434,809 B2 | 5/2013 | Young et al. | |
| 8,483,911 B2 | 7/2013 | Reich | |
| 8,490,722 B2 | 7/2013 | Koga et al. | |
| 8,544,570 B2 | 10/2013 | Ishii et al. | |
| 8,548,646 B1 | 10/2013 | Gariepy et al. | |
| 8,645,016 B2 | 2/2014 | Durkos et al. | |
| 8,657,041 B2 * | 2/2014 | Ishii | B60L 15/2036 701/41 |
| 8,668,036 B2 | 3/2014 | Wyatt et al. | |
| 8,706,297 B2 | 4/2014 | Letsky | |
| 8,708,074 B1 * | 4/2014 | McCoy | B60K 6/52 180/65.285 |
| 8,712,639 B2 | 4/2014 | Lu et al. | |
| 8,824,113 B2 | 9/2014 | Casey | |
| 8,838,311 B2 | 9/2014 | Koike et al. | |
| 9,026,711 B2 | 5/2015 | Kessler | |
| 9,038,490 B2 | 5/2015 | Huebner et al. | |
| 9,051,010 B2 | 6/2015 | Young et al. | |
| 9,114,798 B1 | 8/2015 | Fox et al. | |
| 9,164,934 B2 | 10/2015 | Reidt | |
| 9,236,910 B2 | 1/2016 | Eguchi | |
| 9,251,627 B2 | 2/2016 | Carl | |
| 9,265,196 B2 | 2/2016 | Albinger et al. | |
| 9,301,443 B2 * | 4/2016 | Hashima | B60W 30/18 |
| 9,408,343 B2 | 8/2016 | Wyatt et al. | |
| 9,499,199 B1 | 11/2016 | Laymon et al. | |
| 9,656,687 B2 | 5/2017 | Koike et al. | |
| 9,679,419 B2 | 6/2017 | Dwyer | |
| 9,764,734 B1 | 9/2017 | Brown | |
| 9,794,652 B2 | 10/2017 | Nohra et al. | |
| 9,798,451 B2 | 10/2017 | Grevinga et al. | |
| 10,058,031 B1 | 8/2018 | Brown et al. | |
| 10,150,503 B1 | 12/2018 | Laymon et al. | |
| 10,392,007 B1 | 8/2019 | Brown et al. | |
| 10,414,436 B1 | 9/2019 | Bonny | |
| 10,562,567 B2 * | 2/2020 | Koike | B60L 50/16 |
| 10,629,005 B1 | 4/2020 | Brown et al. | |
| 10,890,253 B1 | 1/2021 | Probst et al. | |
| 10,919,463 B1 | 2/2021 | Brown et al. | |
| 10,926,768 B1 | 2/2021 | Brown et al. | |
| 2002/0049505 A1 | 4/2002 | Heinemann et al. | |
| 2003/0144774 A1 | 7/2003 | Trissel et al. | |
| 2004/0049324 A1 * | 3/2004 | Walker | B60T 7/18 701/1 |
| 2004/0085198 A1 | 5/2004 | Saito et al. | |
| 2004/0199703 A1 | 10/2004 | Wurth et al. | |
| 2005/0126145 A1 * | 6/2005 | Hunt | B62D 11/003 56/11.9 |
| 2005/0206226 A1 | 9/2005 | Lu et al. | |
| 2006/0010844 A1 | 1/2006 | Angott | |
| 2006/0020369 A1 | 1/2006 | Taylor et al. | |
| 2006/0059879 A1 * | 3/2006 | Edmond | A01D 34/78 56/6 |
| 2006/0059880 A1 | 3/2006 | Angott | |
| 2006/0155437 A1 | 7/2006 | Wang et al. | |

(56) References Cited

U.S. PATENT DOCUMENTS

| | | |
|---|---|---|
| 2006/0190162 A1 | 8/2006 | Ampunan et al. |
| 2007/0050096 A1 | 3/2007 | Mattes et al. |
| 2007/0125056 A1* | 6/2007 | Edmond .............. A01D 34/78 |
| | | 56/11.9 |
| 2008/0027590 A1 | 1/2008 | Phillips et al. |
| 2008/0091309 A1* | 4/2008 | Walker ................ B60R 25/102 |
| | | 701/1 |
| 2008/0155073 A1 | 6/2008 | Swain |
| 2008/0264026 A1* | 10/2008 | Ishii .................... B60K 17/356 |
| | | 56/10.8 |
| 2008/0294288 A1 | 11/2008 | Yamauchi |
| 2009/0000839 A1 | 1/2009 | Ishii et al. |
| 2009/0065273 A1 | 3/2009 | Wyatt et al. |
| 2010/0317485 A1* | 12/2010 | Gillingham ............ B60L 58/20 |
| | | 180/242 |
| 2012/0056572 A1 | 3/2012 | Bigler et al. |
| 2012/0159916 A1* | 6/2012 | Ishii ....................... B60L 1/003 |
| | | 56/10.2 G |
| 2013/0268165 A1* | 10/2013 | Hashima .............. B60W 10/30 |
| | | 701/50 |
| 2014/0013722 A1 | 1/2014 | Pitcel et al. |
| 2014/0053092 A1 | 2/2014 | Grevinga et al. |
| 2014/0172197 A1 | 6/2014 | Ganz et al. |
| 2014/0371975 A1 | 12/2014 | Biber et al. |
| 2015/0006025 A1 | 1/2015 | Rhoades et al. |
| 2015/0007541 A1 | 1/2015 | Albinger et al. |
| 2015/0025755 A1 | 1/2015 | Willgert et al. |
| 2015/0039171 A1 | 2/2015 | Koike et al. |
| 2015/0301978 A1 | 10/2015 | Messina |
| 2015/0346259 A1 | 12/2015 | Jiang et al. |
| 2015/0346260 A1 | 12/2015 | Jiang et al. |
| 2016/0029555 A1* | 2/2016 | Ishii ................... B60L 15/2009 |
| | | 701/22 |
| 2016/0073275 A1 | 3/2016 | Inoue et al. |
| 2018/0303027 A1* | 10/2018 | Koike .................... B60L 50/51 |

FOREIGN PATENT DOCUMENTS

| | | |
|---|---|---|
| DE | 102010020537 | 11/2011 |
| EP | 1211849 | 6/2002 |
| EP | 1445700 | 8/2004 |
| EP | 1419687 | 10/2006 |
| EP | 2327607 | 4/2013 |
| EP | 2644780 | 10/2013 |
| EP | 1674324 | 5/2014 |
| EP | 2728805 | 5/2014 |
| EP | 2218630 | 12/2016 |
| EP | 2702846 | 11/2018 |
| JP | 10-006890 | 1/1998 |
| JP | H10-011142 | 1/1998 |
| JP | 5542094 | 7/2014 |
| JP | 5580783 | 8/2014 |
| JP | 6032871 | 11/2016 |
| JP | 2017085814 | 5/2017 |
| WO | WO1993015926 | 8/1993 |
| WO | WO2007084965 | 7/2007 |
| WO | WO2008079767 | 7/2008 |
| WO | WO2009036208 | 3/2009 |
| WO | WO2010077198 | 7/2010 |
| WO | WO2013100938 | 7/2013 |
| WO | WO2013102023 | 7/2013 |
| WO | WO2013134615 | 9/2013 |
| WO | WO2013134721 | 9/2013 |
| WO | WO2014062176 | 4/2014 |
| WO | WO2015022672 | 2/2015 |
| WO | WO2015129795 | 9/2015 |
| WO | WO2016108105 | 7/2016 |

OTHER PUBLICATIONS

Alabama Precision AG Extension, Terrain Compensation for Guidance Systems, Auburn University, Jul. 2010, 8 pp.

ASI Accelerated Systems Inc., ASi 8000W Controller, Specification Sheet, Date unknown but believed to be published at least as early as Jul. 28, 2016, 1 p.

Bendix EC-60 ABS/ATC/ESP Controllers Service Data, BW2429, Bendix Commercial Vehicle Systems LLC, May 2005.

Control Devices, Specification Sheet, Jun. 18, 2012, 3 pp.

Delta Systems, Advanced Displays, Information Sheet, Date unknown but believed to be at least as early as Feb. 28, 2015, 3 pp.

Electronic Stability Control Manual, Freescale Semiconductor, Inc., STABCTRLFS Rev. 5, 2012.

Gerald, et al., "A new generation of contactless magnetic position sensors," Moving Magnet Technologies, Date unknown but believed to be at least as early as Feb. 28, 2015, 7 pp.

Honeywell Datasheet, Hall-Effect Rotary Position Sensors, RTY Series, Honeywell International Inc., Mar. 2016.

IBM Manual, Synchronous Data Link Control, Fourth Edition, Jun. 1986, 99 pp.

Inertial Technology For North Finding Brochure, Silicon Sensing Systems, Ltd., Dec. 2013.

Lutz, et al., "Remote Controls on a Zero-Turn Commercial Lawn Mower to Conduct Sae J2194 Rollover Tests," An ASAE Meeting Presentation, Paper No. 055004, Jul. 17-20, 2005.

Mandapat, "Development and Evaluation of Positioning Systems for Autonomous Vehicle Navigation," Thesis paper, University of Florida, 2001, 276 pp.

North, et al., "Improved Inertial/Odometry/GPS Positioning of Wheeled Robots Even in GPS-Denied Environments," Global Navigation Satellite Systems—Signal, Theory and Applications, 2012, 23 pp.

Seastar Electronic Shift & Throttle Quick Reference Guide, Marine Canada Acquisition Inc., 2014.

Seastar Solutions Installation Manual, Electronic Shift & Throttle (EST), i6800 Shift & Throttle System, 2014.

Sevcon, Gen4, AC Motor Controller, Data Sheet, Date unknown but believed to be at least as early as Feb. 28, 2015, 2 pp.

Sevcon, Using DVT with Gen4 Systems, Tutorial, Date unknown but believed to be at least as early as Feb. 28, 2015, 11 pp.

Smith, et al., "Design and Implementation of a Control Algorithm for an Autonomous Lawnmower," IEEE 0-7803-9197, Jul. 2005.

Spencer, "The Development of an Autonomous Vehicle for Use in Agriculture," A thesis submitted to the Graduate Faculty of North Carolina State University, 2004.

Technik, Position Transducers and Rotary Sensors, novotechnik, Siedle Group, Dec. 2000, 36 pp.

U.S. Appl. No. 62/481,422, filed Apr. 4, 2017.

U.S. Appl. No. 62/702,086, filed Jul. 23, 2018, 20 pp.

Wabco Electronic Stability Control (ESC) Informational Sheet, Obtained from website <http://www.wabco-auto.com> on Feb. 19, 2015.

* cited by examiner

| Alarms/Status | Screenshot | Calibration |

Calibration

1302

[Auto Calibrate]

| Component | | Set Range | Default Range |
|---|---|---|---|
| Left Accelerator | 🔧 | 1.14 - 4.89 V | 1 - 5 V |
| Right Accelerator | 🔧 | 1.25 - 4.79 V | 1 - 5 V |
| Left Feedback | 🔧 | 1.03 - 4.67 V | 1 - 5 V |
| Right Feedback | 🔧 | 1.05 - 4.75 V | 1 - 5 V |

For Service Information: http://www.hydro-gear.com/service-and-repair-manuals/

| Log | | More |

FIG. 23

| Alarms/Status | Screenshot | Calibration |

Fault Log

1302

Clear Log

| Date | Level | System | Description |
|------|-------|--------|-------------|
| 21-Mar-2016 | Critical | Right Accelerator | No Comm |
| 21-Mar-2016 | Non Critical | Right Accelerator | Accelerator Limit |
| 16-Mar-2016 | Non Critical | Right Controller | Feedback Limit |
| 01-Feb-2016 | Critical | Left Drive | Motor No Comm |
| 20-Dec-2015 | Critical | Left Drive | Motor No Comm |

For Service Information: http://www.hydro-gear.com/service-and-repair-manuals/

| Log | | More |

| Alarms/Status | Screenshot | Calibration |

1302

Right Accelerator Status

Generic Part Number: SMRTC-XXXXXX

| Status | Description | Potential Cause |
|---|---|---|
| Communication Lost (Critical Failure) | No communication from Throttle Sensor Board to Controller Board. | Cable Damaged Cable Unplugged |
| Limit Exceeded (Non Critical Failure) | Throttle Sensor detected movement beyond programmed limit. | Sensor Calibrated Incorrectly<br><br>Excessive Force on Lever Arm |

For Service Information:  http://www.hydro-gear.com/service-and-repair-manuals/

Log      More

LAWN TRACTOR WITH ELECTRONIC DRIVE AND CONTROL SYSTEM

CROSS-REFERENCE

This application is a continuation of U.S. patent application Ser. No. 17/181,793, filed on Feb. 22, 2021, which is a continuation of U.S. patent application Ser. No. 16/041,547, filed on Jul. 20, 2018, now U.S. Pat. No. 10,925,216, which is a continuation of U.S. patent application Ser. No. 15/640,300, filed on Jun. 30, 2017, now U.S. Pat. No. 10,058,031, which is a continuation-in-part of U.S. patent application Ser. No. 15/056,839, filed on Feb. 29, 2016, now U.S. Pat. No. 9,980,434, which claims the benefit of U.S. Provisional Patent Application No. 62/126,569, filed on Feb. 28, 2015. U.S. patent application Ser. No. 15/640,300 also claims the benefit of U.S. Provisional Patent Application No. 62/360,109, filed on Jul. 8, 2016, and U.S. Provisional Application No. 62/357,758, filed on Jul. 1, 2016. These prior applications are incorporated herein by reference in their entirety.

FIELD

The present disclosure relates to utility vehicles, such as lawnmowers, utility terrain vehicles, all-terrain vehicles, turf care devices, etc., and more particularly to a communication network for an electronic control system capable of controlling drive systems for a utility vehicle such as a zero turn radius lawnmower.

The present disclosure also relates to the integration of analog and digital signal devices, and more particularly to utility vehicles which include legacy analog sensors as well as one or more digital controllers capable of controlling a generator and a traction motor. The one or more digital controllers permit communication between the analog and digital sensors in a simple and cost effective manner.

The present disclosure also relates to systems and methods for remotely communicating with and programming utility vehicles.

BACKGROUND

Zero turn radius utility vehicles exist today in a wide variety of forms and types with lawnmowers being among the most popular. Typically, the prime mover for a zero turn radius lawnmower consists of an internal combustion engine. The output from the internal combustion engine is then coupled to one or more pulleys and/or a direct shaft link, for turning at least two different drive systems that are driven by the rotary output of the engine.

The first drive system is usually a pulley, or a direct shaft link, that drives a tool, such as a blade system that turns the blades of the lawnmower. Other tools driven by the tool driver include snow blowers, tillers, winches and the like that can be driven by the tool driver that is powered by the internal combustion engine.

The second drive system is usually a pulley, or a direct shaft link, that drives a propulsion system, such as a variable speed drive (e.g. hydrostatic, toroidal, friction, CVT or the like) or the generator/alternator of a hybrid propulsion system.

Hydrostatic zero turn propulsion systems are known, including at least two outputs of a transmission or pair of transmissions that are independently controllable with respect to each other. By independently controlling the first and second transmission outputs, one can control the operation of the first and second driven wheels.

Although such propulsion systems for zero turn radius vehicles perform their function in a workmanlike manner and provide the basis for operation of a wide variety of highly functional and well received products on the market, room for improvement exists. In particular, room for improvement exists in being able to provide a propulsion system for a lawnmower that is more energy efficient. One way in which such efficiency can be achieved is through the use of a hybrid propulsion system.

Hybrid propulsion systems and components therefor that are useable with lawnmowers are described in U.S. patent application Ser. No. 14/918,465, filed on Oct. 20, 2015, now U.S. Pat. No. 10,629,005, the terms of which are incorporated fully herein by reference.

The hybrid propulsion system of the present disclosure preferably comprises an internal combustion engine whose primary purpose is to rotate a generator/alternator to thereby generate electricity. The electricity so generated is stored in one or more storage batteries. Electricity from the storage batteries is then directed to one or more electric motors. The electric motors are operatively coupled to the driven wheels so that the rotation of the motor rotates the driven wheels. In such systems a gear reduction assembly can be provided to reduce the speed of the rotary output of an electric motor to a rotary output speed that is suitable for use in connection with the lawnmower.

One benefit of such a propulsion system is that it has the potential to be more energy efficient than straight internal combustion driven power systems. Another benefit is that it has the potential to simplify the design of the vehicle by employing electronic controls in place of complex levers and linkages.

One difficulty encountered with a use of a plurality of electrical controls and electrically actuated components relates to operatively coupling the various components and systems together. Coupling is necessary both for facilitating communication between the components and to provide a power source for those components that may require power to operate.

One way to provide power and communication between the various components is to couple the components together by hard wiring with conductors of appropriate gauges. Hard wiring is usually more reliable and cost-effective than wireless communications. Additionally, although communication signals can be easily transferred between components via a radio or wireless communication, it is often difficult to conduct power between components by any means other than the use of a wire conductor.

One of the difficulties with wiring components together relates to the number of wires that must be employed to handle the myriad of components that are employed for modern devices. Even allegedly "simple" devices such as zero turn radius lawnmowers can include a plurality of components that require a large number of wires being strung between components. The wiring necessary to appropriately serve all of the components has the distinct potential to create the need for large wiring harnesses that may be difficult to install correctly during the manufacture of a device. As such, one object of the present disclosure is to provide a wiring system with reduced complexity.

Another issue that arises for designers and manufacturers of utility vehicles is designing such vehicles to be flexible enough to be able to accept additional, improved and newly developed electronic components. These may include electronic components such as global positioning devices, inertial measurement units, temperature sensors, tachometers, processors and the like. Other examples may include processors that control the operation of the device to automatically "drive it," by controlling the speed and direction of movement of the electrical motors, along with processors that may communicate with all of the various sensors, GPS devices and other electronic components on the utility vehicle to transmit real time data relating to the operation of the vehicle via a phone or Wi-Fi link to a remote management or command center.

Another desirable feature of such a wiring system would be the ability of a system to quickly and easily adopt and be operatively coupled to a newly added or different controller.

In some embodiments, a "master controller" may not be a required component of the utility device, as each of the individual components may include enough processing power to handle the functions that the particular component must perform, along with communicating with other components of the utility vehicle so that the vehicle can perform all of its intended functions. However, in other situations, a master controller may be utilized to control one or more components, and may, from time to time, need to be upgraded to incorporate additional functionalities, or to enhance the performance of the controller by performing software upgrades and the like.

As such, one object of the present disclosure is to provide an electronic control system that has the flexibility to incorporate a wide variety of existing components, sensors and other devices requiring an electrical power or communication capability (collectively, "add on devices") that exist now, and that may exist in the future.

Known lawn-tractor type utility vehicles include a plurality of analog sensors which may include, among other things, an operator presence sensor, a parking brake sensor, a power take-off engagement sensor, and a transmission neutral sensor. Outputs from these sensors are typically fed into a bank of relays which utilizes simple ladder logic to make determinations such as whether the vehicle engine can be started or whether the vehicle engine must be shut off during operation.

For example, if an operator presence sensor detects an operator is sitting in a seat, a parking brake sensor detects engagement of the parking brake, and a power take-off sensor detects the power take-off is turned off the relays will be in a state such that the engine will be allowed to start. However, if an operator presence is detected, the parking brake is detected as being engaged, but the power take-off is in an on state then the engine will not be permitted to start. As another example, if the parking brake sensor detects that the parking brake is disengaged (e.g. the vehicle is being driven), and the operator presence sensor detects an operator is not present (e.g. the driver stands up) then a kill signal will be sent to the engine. Therefore, various combinations of sensor detection will permit the engine to start, prevent the engine from starting, or kill the engine.

There has been a recent trend to incorporate various electronic components into lawn tractor-type vehicles for which operation by digital controllers is desired. For example, in a hybrid-type lawn vehicle, digital controllers are utilized to control one or more electric motors and a generator. To incorporate these digital controllers into such a vehicle, some manufacturers replace the aforementioned analog sensors with digital sensors. However, digital sensors are typically more expensive than their analog counterparts and can require very complex wiring systems. Additionally, in some instances the use of digital sensors can require a partial vehicle redesign. Therefore, it would be desirable to incorporate the analog sensors and digital controllers in such a vehicle in a less complex and cost effective manner.

In addition, these controllers may be programmable and therefore allow for a great degree of flexibility. A programmable controller can allow the user to set and alter various parameters of the vehicle that can affect the performance characteristics of the vehicle. However, the incorporation of such controllers can result in a very complicated electronic control and communication system.

Lawnmower vendors, original equipment manufacturers, and repair technicians desire a simple way to troubleshoot, repair, and/or setup the electronic system. Presently a technician will plug in a custom manufactured programming device or laptop computer to perform programming changes. However, both custom programming devices and laptops require a substantial initial investment in equipment and software and often require significant training to operate.

One potential solution would be to incorporate an onboard input device, having a screen, keypad, and necessary software, into the vehicle. However, utility vehicles are subjected to harsh environmental and operating conditions such as large temperature swings, wet weather, and bumps; therefore, any onboard input device would need to be very rugged. This dedicated onboard input device, especially with a highly robust and rugged construction, would add substantial cost to the vehicle and may not be seen as a "value added" feature to many consumers.

Therefore, it would be desirable to have a system which can troubleshoot, setup, and/or repair the aforementioned controllers, which requires little skill to operate, is highly portable, and which requires minimum cost. Therefore, further technological developments are desirable in this area.

SUMMARY

In accordance with the present disclosure, a network system is provided for inter-operatively coupling a plurality of electronic components of a utility vehicle. The network system is provided for operatively coupling a plurality of electrical components of the utility vehicle together to provide electrical power, communication, and diagnostic capabilities among the electrical components of the network system. The network system comprises a first electrical component that includes a first processor and a first port; a second electrical component that includes a second processor and a second port; and a third electrical component that includes a third processor and a third port. A first conductor is provided that is coupled between the first and second components for conducting electrical power and communication signals between the first and second electrical components. A second conductor is provided that is coupled between the second and third components for conducting electrical power and communication signals between the second and third components. The processors of each of the first, second and third components are capable of communicating with any of the other of the first, second and third components, without the need of a separate controller such that the first electrical component can communicate with and influence the operation of the third electrical component without being coupled through a separate controller, or being directly coupled thereto.

One feature of the present disclosure is that the first, second and third components can be coupled to each other to communicate among each other without the need of a controller. This feature has the advantage of significantly simplifying the wiring of components among each other.

As discussed above, the typical procedure is to couple each of the first, second and third components to a controller. In such an arrangement, a first component may then communicate with the third component only by communicating with the controller, which then itself communicates with the third component.

The present disclosure improves on this by enabling the user, for example, to couple the first component to the second component, and then couple the second component to the third component. The first component can then communicate with the third component, or any other component in the network, without being coupled to a separate component. This permits the user and designer to simplify the wiring, by coupling each component to its nearest network component, rather than requiring each component to have a wire extended all the way through a separate controller, that may be located rather remotely of one or more of the particular components of the network.

One embodiment of the present disclosure includes a unique controller which processes, controls, and/or permits communication between a plurality of analog input signals, one or more analog output signals, and one or more digital controllers. Other embodiments include unique combined analog/digital controller apparatuses, systems, and methods. Further embodiments, inventions, forms, objects, features, advantages, aspects, and benefits of the present application are otherwise set forth or become apparent from the description and drawings included herein.

Another embodiment of the present disclosure includes a remote lawnmower programming device. Other embodiments include unique lawnmower programming, setup, diagnostic, and/or repair apparatuses, systems, and methods.

These and other features of the present disclosure will become apparent to those skilled in the art upon a review of the drawings and detailed description contained herein.

BRIEF DESCRIPTION OF THE FIGURES

The description herein makes reference to the accompanying drawings wherein:

FIGS. 21-25 depict various potential displays capable of being rendered by an illustrative embodiment of one graphical user interface of the remote programming device.

FIGS. 26-29 and 31-35 depict various potential displays of a second illustrative embodiment of a graphical user interface of the remote programming device.

DETAILED DESCRIPTION

The description that follows describes, illustrates and exemplifies one or more particular embodiments of the present disclosure in accordance with its principles. This description is not provided to limit the invention to the embodiment or embodiments described herein, but rather to explain and teach the principles of the invention in such a way to enable one of ordinary skill in the art to understand these principles and, with that understanding, be able to apply them to practice not only the embodiment or embodiments described herein, but also other embodiments that may come to mind in accordance with these principles. The scope of the present disclosure is intended to cover all such embodiments that may fall within the scope of the appended claims, either literally or under the doctrine of equivalents.

The present specification is intended to be taken as a whole and interpreted in accordance with the principles of the present disclosure as taught herein and understood by one of ordinary skill in the art. It should be appreciated that any of the features of an embodiment discussed with reference to the figures herein may be combined with or substituted for features discussed in connection with other embodiments in this disclosure.

Figure 1:
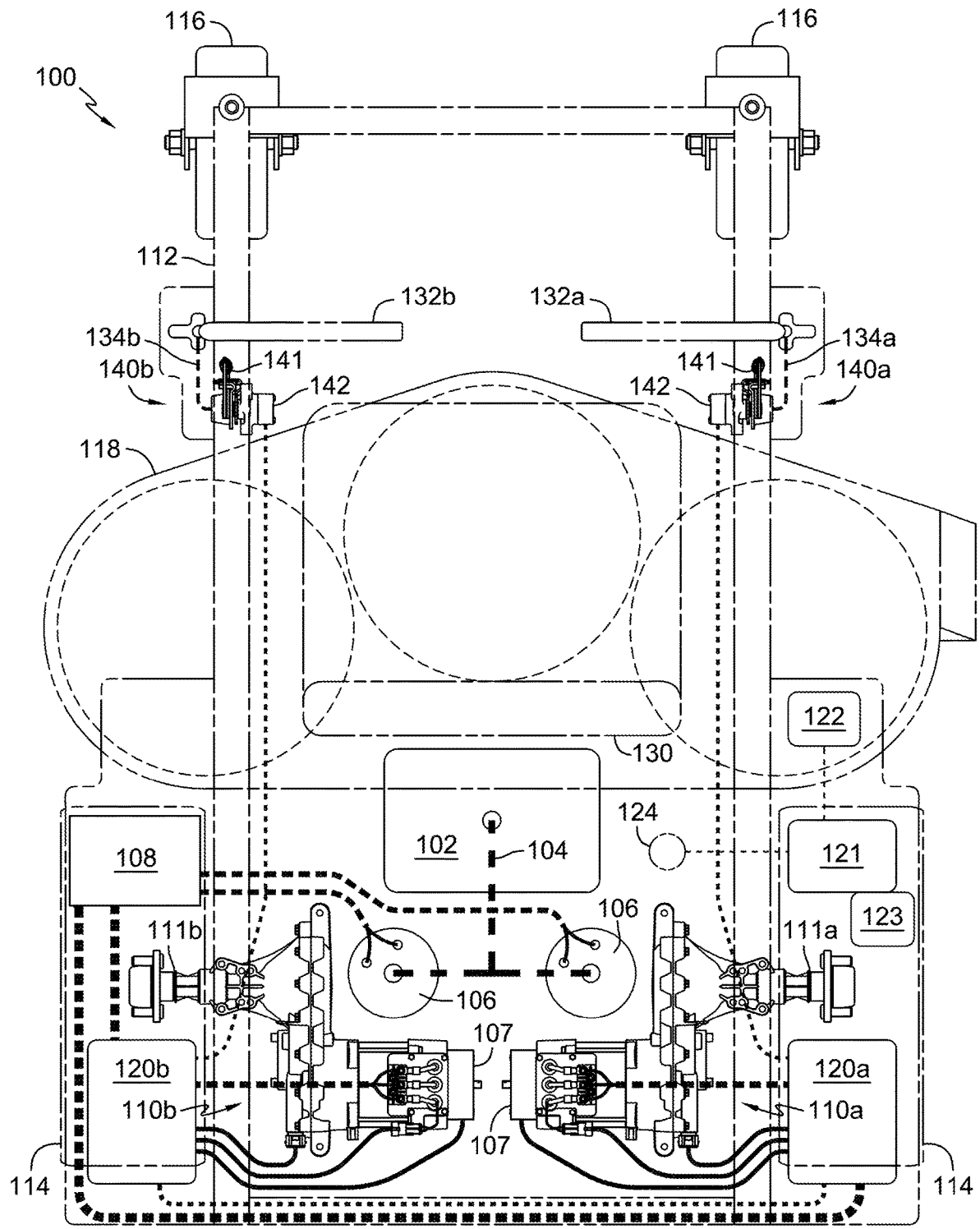
FIG. 1 is a schematic view of an exemplary hybrid zero turn radius vehicle for use with the teachings herein.

FIG. 1 depicts an embodiment of a zero turn hybrid utility vehicle 100, which by way of example only is a riding utility vehicle. Various components of vehicle 100 can be mounted on and supported by a frame 112. In particular, an engine 102, alternators 106, battery 108, electric transaxles 110a, 110b, and traction controllers 120a, 120b can be mounted on frame 112. Frame 112 also supports a deck 118, which may be of fixed height (relative to ground), ground-following, or height adjustable as known in the art. Deck 118 can include mowing blades and is intended to be representative of other ground engaging equipment such as brush cutters, aerators, and the like.

Operator seat 130 is positioned above deck 118 and is also affixed to frame 112. Frame 112 is supported above ground by a pair of caster wheels 116 and a pair of driven wheels 114.

An engine 102, such as a gasoline or diesel type internal combustion engine drives the alternators 106 via a belt and pulley assembly 104. Alternators 106 generate electric power to charge a battery 108. The alternators could be replaced with generators. Battery 108 supplies electric power to electric transaxles 110a, 110b. Electric transaxles 110a, 110b provide rotational output through a pair of output shafts 111a, 111b to rotationally drive a pair of driven wheels 114.

Traction controllers 120a, 120b can control the speed and direction of driven wheels 114 by controlling the respective electric transaxles 110a, 110b, based on inputs from an operator (sitting in operator seat 130). Traction controllers 120a, 120b are mounted near the rear of vehicle 100 near electric transaxles 110a, 110b away from engine 102 to aid in cooling, although other locations are possible. The operator can provide speed and direction inputs through a pair of drive levers 132a, 132b. Each transaxle 110a, 110b may include a brake mechanism 107.

Drive levers 132a, 132b can connect to a pair of control assemblies 140a, 140b via mechanical linkages 134a, and 134b. Control assemblies 140a, 140b can each include a mechanical return to neutral ("RTN") mechanism 141 and a potentiometer 142 to communicate the position of drive levers 132a and 132b to traction controllers 120a and 120b respectively.

Based on the position of drive levers 132a, 132b, potentiometers 142 can provide varying inputs to traction controllers 120a, 120b so that electric transaxles 110a, 110b (and wheels 114) are driven as desired by the operator. In the absence of inputs from the operator, RTN mechanisms 141 can force the drive levers 132a, 132b to a neutral position. Front caster wheels 116 react in response to the actions of rear driven wheels 114. An optional onboard processor 121 may be provided for processing various data streams fed to it by the sensors 124 and a GPS unit 123. Processor 121 may also include a transceiver 122.

Figure 2:
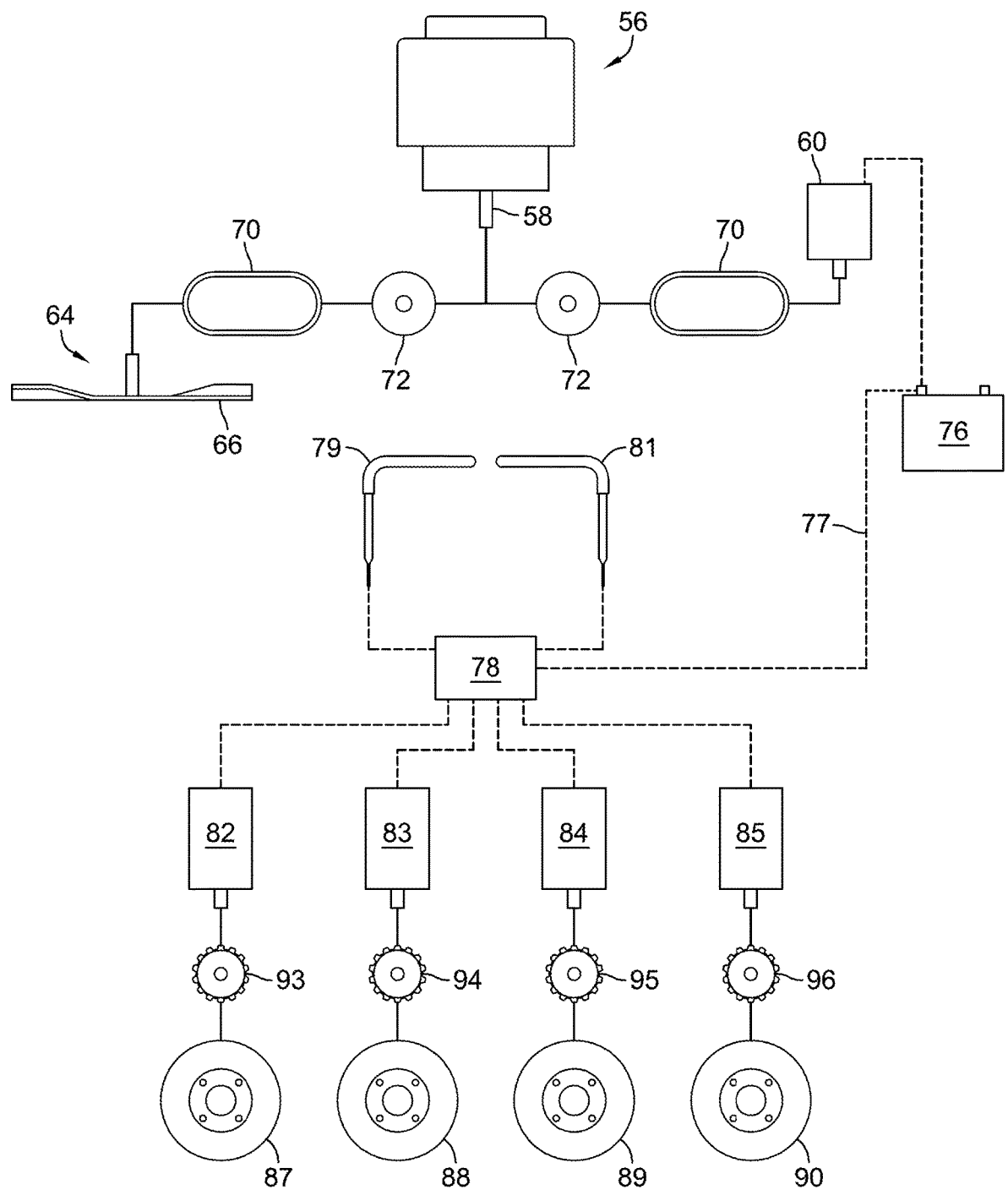
FIG. 2 is a schematic view showing the various components of an exemplary drive system.

Turning now to FIG. 2, an exemplary drive system is shown schematically. The internal combustion engine 56 contains a downwardly extending output shaft 58. The output shaft of engine 56 drives two primary devices. The first device driven by the output shaft is a generator or alternator 60 that generates electricity for operating the electric motors that drive the wheels of the utility vehicle of the present disclosure. The other output device comprises a rotatable accessory output device 64. Such output devices may include blades 66 on a lawnmower, tines on a plow, or other attachments to which one may attach to the utility vehicle. These attachments may include rollers, sprayers or other power driven accessories.

The common feature shared by many mower attachments is that they are driven by a belt that is coupled either directly or indirectly to the output shaft 58 of internal combustion engine 56. The rotation of engine 56 turns a pulley 72 that, through a belt 70, actuates the accessories, such as the blades 66. The primary driving device that is driven by the engine 56 with the drive system of the current invention is alternator 60 provided for generating electricity which is then transmitted to a battery 76, for storage for later use.

Energy that is stored in battery 76 is then delivered by wiring 77 to a controller 78 that controls the current from the battery, and directs the current to the proper component of the utility vehicle. User input devices 79, 81 are coupled to the controller 78 so that the user can control the action of the controller 78 and hence, direct where the output from battery 76 is directed. Information about the alternator 60, batteries 76, controller 78 and user input devices 79, 81 will be discussed in more detail below.

The output from the controller 78 is directed to one or more electric motors 82, 83, 84, 85. As shown in FIG. 2, there exist four electric motors including first electric motor 82, second electric motor 83, third electric motor 84 and fourth electric motor 85. The motor array shown in FIG. 2 contemplates a single motor being used for each of four wheels 87, 88, 89, 90 of a four wheel vehicle. The use of four electric motors 82, 83, 84, 85 is relatively less common than the more common use of just a first 82 and second 83 motor for controlling first and second wheels 87, 88, with third and fourth wheels 89, 90 being non-driven, rather than driven wheels. For example, as shown in FIG. 1, the front two wheels 116 are not driven wheels. The driving of vehicle 100 is done by the first and second (left and right) rear driven wheels 114.

Each of the motors 82-85 is coupled to a gear box 93, 94, 95, 96 that in most cases, comprises a reduction gear box, so that the rotational speed (RPM) output of the motors 82-85 is reduced to a suitable rotational speed for driving the wheels 87-90. The gear boxes are coupled to their respective wheels 87-90.

It is usually advisable to provide a gear box between the output of the electric motors 82-85 and the respective first 87, second 88, third 89 and fourth 90 wheels, but is not necessary in all situations.

Figure 3:
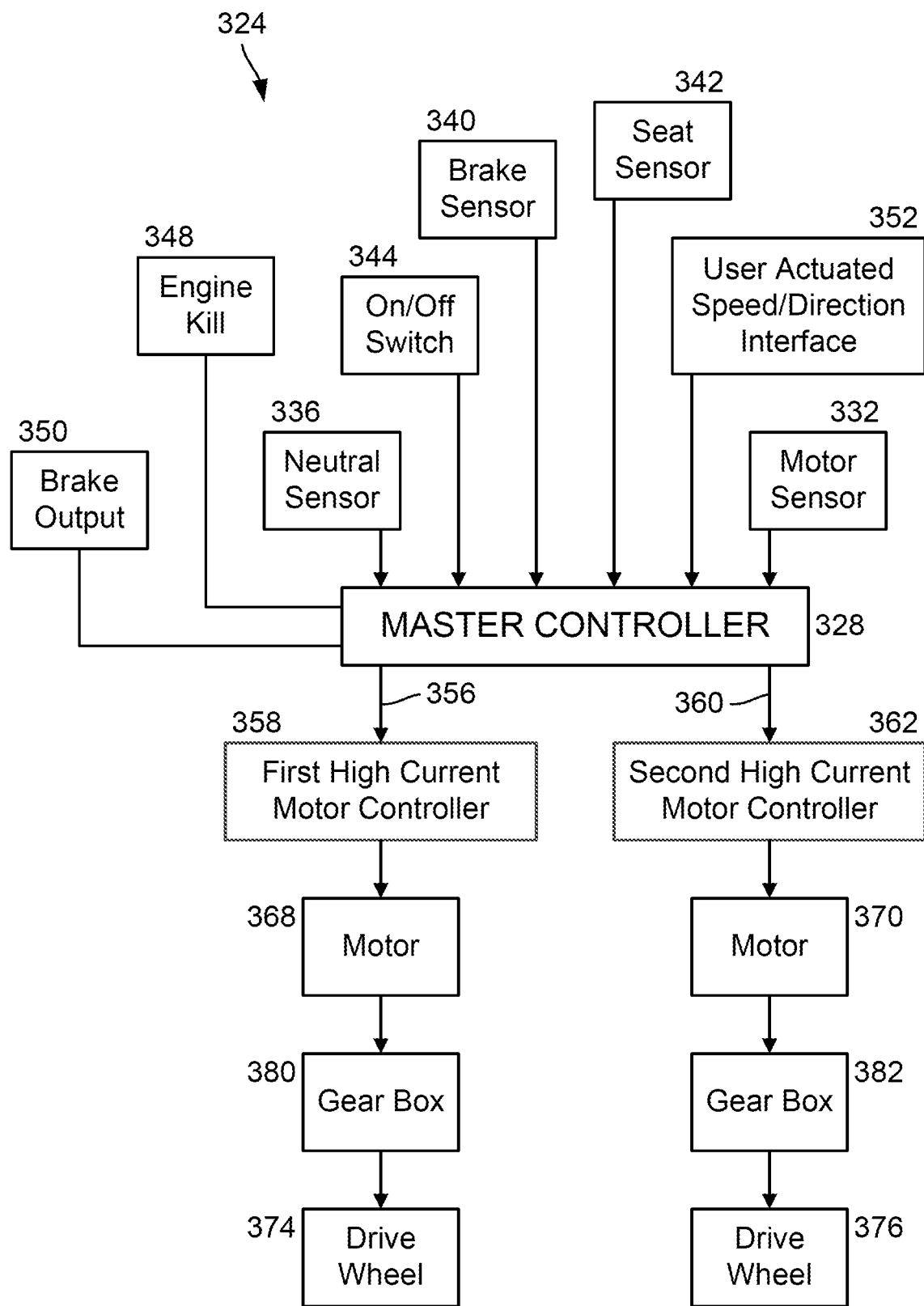
FIG. 3 is a schematic view showing the various control systems and components of a utility vehicle.

FIG. 3 shows a first embodiment of an electronic control system 324 having a master controller 328 that includes a plurality of input ports and a plurality of output ports. The input ports receive information from a variety of sources and sensors. The sensors include a motor sensor 332 that senses the operating condition and operating status of the various electric drive motors. Although a single motor sensor 332 is shown, it is more likely that the motor sensor comprises a plurality of motor sensors 332, with one sensor being coupled to each of the various electric drive motors 368,370.

The second sensor comprises a neutral sensor 336. A neutral sensor 336 is provided to tell the master controller 328 whether the vehicle is in a "neutral" drive state. This neutral sensor 336 is employed as a safety device to ensure that the engine does not start with the device "in gear," because starting in gear would cause the vehicle to lurch forward or backward. Rather, the neutral sensor 336 can help to ensure that the vehicle will not jump forward or backward when starting.

Similarly, a brake sensor 340 provides a signal to the master controller 328 to tell the master controller 328 that the brake is actuated. This brake sensor 340 is also a safety device, as many vehicles require the brakes to be actuated before the engine of the vehicle begins operation, hence requiring the brake sensor 340 to be actuated.

Another sensor is a seat sensor 342 that detects the presence of weight on the vehicle seat. This sensor 342 is also employed as a safety feature to ensure that the engine is not started with the user not being appropriately positioned on the seat. A final input source is the on/off switch 344. The on/off switch 344 will tell the master controller 328 whether it has permission to actuate the engine and commence operation.

One of the outputs is an output that is referred to as the engine kill output switch 348. The engine kill output switch 348 enables the master controller 328 to control whether the engine is allowed to start, or whether the engine is allowed to continue running.

Normally, the engine kill switch 348 is defaulted so as to not allow the engine to run. The engine is not allowed to run until the master controller 328 senses that all the appropriate run conditions exist. For example, the master controller 328 will have the engine kill output 348 in the "kill the engine" mode unless the on/off switch 344 is turned to on, the brake sensor 340 recognizes the brake as being actuated, the seat sensor 342 recognizes that the seat has weight put on it, and the neutral sensor 336 senses that the vehicle is in neutral. If all appropriate conditions are met, the engine kill switch 348 will move to an engine run position wherein the engine is allowed to run, and be turned on by the on/off switch 344.

There is also a brake output control 350 that is coupled to the master controller 328. The brake output control 350 can run in several different modes. For example, the brake output control 350 can work in conjunction with the engine kill switch 348. If the controller senses that a problem has arisen that should cause the engine to be shut off (such as if the user comes out of his seat), the master controller may send an output signal to the engine kill switch 348 to kill the engine, along with a signal to the brake output 350 to cause the brake to be actuated to cause the vehicle to stop.

Another way in which the brake output 350 can function is to work in conjunction with the neutral sensor 336, so that if the vehicle is sensed to be in neutral, the brake will be engaged. In such a situation when the user wishes to stop the vehicle, the user places it in neutral. Although the placement of a moving vehicle in neutral will normally cause the vehicle to continue to roll in the direction in which it is moving, the coupling of the neutral sensor 336 to the brake output 350 causes the brake to be engaged, so that by placing the vehicle in neutral, one is effectively applying the brake, thereby causing the vehicle to not be easily movable. The master controller 328 also has one or two inputs for receiving signals and commands from the user actuated speed and direction interface 352, such as the drive levers 132a, 132b of vehicle 100.

Most importantly, the master controller 328 includes a first output 356 that is directed to a first motor controller 358, and a second output 360 that is directed to the second motor controller 362. In devices with multiple motors, there would also likely be a third and/or fourth motor output controller in addition to a first and second motor output controllers shown in FIG. 3.

The first motor output controller 358 is a high current type of output controller, that is configured to deal with the high current outputs that are transmitted between the battery and/or alternator and the drive motors 368,370 that are coupled to the wheels 374, 376 of the vehicle. The first and second motor controllers 358, 362 are coupled to the first and second motors 368,370 respectively, for controlling the operation of the first and second motors 368, 370. The rotational outputs for the motors 368, 370 are then transmitted through first and second gear boxes 380, 382, respectively, and ultimately to the first and second drive wheels 374, 376.

The propulsion system for driving a zero turn hybrid utility vehicle is likely to be an electric hub motor that is coupled to a gear reduction member for driving the driven wheel. The hub motor 368 is preferably one of an AC motor, a DC brushless motor, or a DC brush motor. The hub motor has an output that is coupled to a gear box that has an output shaft (axle) that is coupled to a wheel of the utility vehicle. The gear box reduces the rotational speed of the output of the hub motor to a suitable speed for turning the wheel at an appropriate speed and with sufficient torque.

Figure 4:
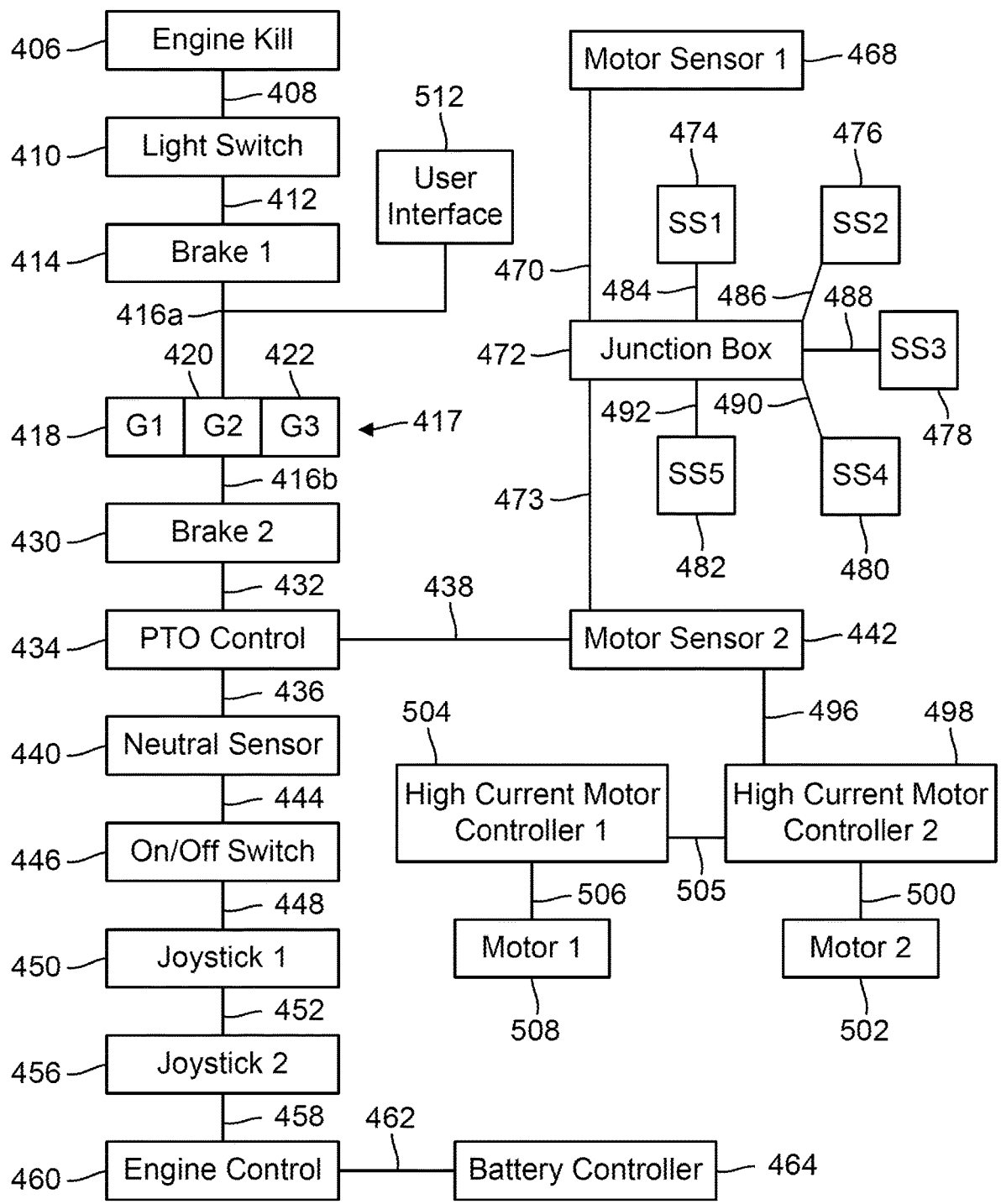
FIG. 4 is a schematic view of a plurality of components of a utility vehicle networked together in accordance with the disclosures herein.

The networking system of the present disclosure is best described with regard to FIG. 4, which shows a plurality of electronic or electrically actuated components that may be found on a utility vehicle, such as a zero turn radius lawnmower. The various components such as the engine kill switch 406, light switch 410, and others are characterized in that each of them includes appropriate circuitry that enables the device to achieve its intended function, as described above. Additionally, each of the devices, such as the engine kill switch 406 and light switch 410 should include a port that enables a conductor to be connected to the component, such as conductor 408 that extends between the engine kill switch 406 and the light switch 410. The conductor such as conductor 408 is preferably a standard, off-the-shelf conductor that includes sufficient wiring having a sufficient gauge to carry communication signals and/or current for power between the components, such as engine kill switch 406 and light switch 410.

For many of the components, the power required to drive the particular component is relatively small, and measured in fractional amps or milliamps. For such components, standard conductors of the type that are normally associated with these conductors having USB connector type ends will typically suffice. However, conductors that conduct a large amount of amperage, such as the conductors 506, 500 between the first and second high current controllers 504, 498 and respective motors 508 and 502, would probably be made of a larger (lower gauge) wire that has sufficient amperage carrying capacity to carry the current necessary to operate the large power consuming components, such as first motor 508 and second motor 502. It will be understood that independent conductors may be required for components requiring a large amount of amperage.

Preferably, the ports of the various components should comprise ports that are configured as commonly employed ports, such as USB ports, mini USB ports, HDMI ports, etc., so as to cut down on the expenses that are typically entailed with customer connectors (plugs). For example, most or all of the components that require low power can include female USB ports, and the plug of the conductor (e.g. 408) that plugs into the ports can be a conductor having a pair of male USB connector plugs on either end of the conductor, so that in the case of conductor 408, a first plug of the conductor can extend into the USB receiving port of the engine kill switch 406, while a second plug of conductor 408 can be received into the receiving USB port of the light switch 410.

Additionally, each of the components should have a processor capable of processing information. The processing capability need not necessarily be a large processing capability. Rather, the processing capability that each component should contain should be sufficient both to operate the component and to generate and receive a mating or handshake signal to find the component to which it is to mate and to then mate with and establish a communication protocol with that component. In addition to its processing capabilities, each component should have communication capabilities to enable the particular component to communicate with its appropriate counterpart component. Communication capabilities should be such that the kill switch, when coupled to the network, can send a signal to other components of the network to find another component with which it should interact, and thereby be operatively coupled to.

For example, the engine kill switch 406 should be able to have sufficient communication abilities to communicate with the first and second motor controllers 504, 498, to be able to cause motor controllers 504, 498 to turn off in a situation wherein the engine needs to be killed, and the engine kill switch 406 is actuated to do so. Additionally (or alternately), the engine kill switch 406 can be designed to communicate with and be coupled to the on/off switch 446 of the utility vehicle, so as to be able to communicate with the on/off switch to turn the utility vehicle "off," in the event that the engine kill switch 406 is actuated.

In the present disclosure, it will be noted that the various electronic components are all coupled together, so that any of the various components can communicate with any of the other various components within the network. However, this operative coupling together is not necessarily a direct connection wherein a conductor extends between the two components that are communicating with each other.

Nor is it a design wherein all of the conductors feed into a central controller that then serves as a switching station for directing appropriate signals from the sending component to the desired recipient component that is being controlled by the sending component. Rather, conductors are directed between the adjacent or closest component to adjacent or contiguous components. Although for example, the engine kill switch 406 is coupled directly to the light switch 410 by conductor 408, the fact that the light switch 410 is coupled to the first brake controller 414, and thereby, directly or indirectly to every other component, means that the engine kill switch 406 need not be directly coupled to the component, such as the on/off switch 446 with which it desires to communicate. Rather, the engine kill switch 406 joins the network that can relay its signal from the engine kill switch 406 to the on/off switch 446, for example, which is the component that the engine kill switch 406 desires to communicate with.

Unless otherwise stated, the particular components perform the function that they were described to perform above in this application.

The components include an engine kill switch 406 that is coupled through a conductor 408 to a light switch 410. The light switch is coupled by a conductor 412 to a first brake controller 414, for operating the first brake (such as the left hand brake) on the utility vehicle of the present disclosure. The first brake controller 414 is coupled by a connector 416*a* to a gauge cluster including first gauge 418, second gauge 420 and third gauge 422. These gauges can include for example, a power gauge, an oil pressure gauge, an amperage gauge and a temperature gauge, or may include a variety of other gauges that would be useful to use on the vehicle. The gauges are preferably designed as a gauge cluster, so that a single port will couple the gauge cluster 417 to its fellow components, rather than each of the gauges individually 418, 420, 422 being required to be coupled independently to an adjacent component. In such a case, a central processor to which each of the gauges 418, 420, 422 of the gauge cluster 417 are coupled can be employed, or alternately, each of the gauges can be equipped with its own processor that communicates out of a single control processor port.

Conductor 416*b* conducts signals between the gauge cluster 417 and the second brake controller 430. A conductor 432 conducts signals between the second brake controller 430 and the power take off control switch 434. A pair of conductors 436, 438 emerges from the power take off control switch 434 with one conductor 438 connecting the power take off control switch 434 to the second motor sensor 442. The other conductor 436 conducts communication signals between power take off control switch 434 and neutral sensor 440. Neutral sensor 440 includes a conductor 444 that conducts communication signals between neutral sensor 440 and on/off switch 446. The conductor 448 conducts communication signals between a first joystick 450 and the on/off switch 446. Joystick 450 serves as a first direction and speed controller for the vehicle.

A conductor 452 conducts signals between the first and second joysticks 450, 456 and a conductor 458 conducts communication signals between the second joystick 456 and a controller 460 for controlling the internal combustion engine of the vehicle. A conductor 462 conducts communication signals between the engine controller 460 and the battery controller 464.

A first motor sensor 468 includes a conductor 470 for conducting signals between the first motor sensor and a junction box 472. The junction box 472 includes a plurality of ports for coupling the semi-master controller containing junction box 472 to a plurality of slave-like components 474-482. The slave components are shown here as sensors, and may or may not have any controller functionality, as the controller functionality may well be contained within the junction box 472. Alternately, the junction box 472 may not include any control facilities, but rather may be little more than a switch box that can accept signals from the various slave components 474-482 and then conduct these signals to an opposite port and conductor.

The various slave components include a first conductor 484 for conducting signals between junction box 472 and first seat sensor 474, and a second conductor 486 for carrying communications between the junction box 472 and a second seat sensor 476.

Additionally, there are three engine sensors 478, 480, 482 that each respectively includes its own conductor 488, 490, 492 for delivering signals between the junction box 472 and the respective three engine sensors 478, 480, and 482. Illustratively, the engine sensors can comprise sensors such as a tachometer 478, a temperature gauge 480 and an oil pressure switch and/or gauge 482. The junction box 472 also includes a conductor 473 for conducting signals between the junction box 472 and a second motor sensor 442.

The second motor sensor 442 includes a conductor 496 for communicating signals between the second motor sensor 442 and a high current motor output controller 498. A communications conductor 505 extends between the second high current motor controller 498 and the first high current motor controller 504. A conductor 500 connects second motor controller 498 and second motor 502 and conductor 506 connects first motor controller 504 and first motor 508.

It will be appreciated that the selection of which component to couple a given component to appears to be somewhat random. In practice, it is likely that a particular component will be coupled to that component that is in the closest physical relationship to the first component, so as to minimize wiring complexity and wiring costs.

Notwithstanding this, the networking system of the present disclosure allows anyone of the components to communicate with any of the other components. For example, the first brake controller 414 can communicate with the joystick 450, even though they are not directly coupled to each other.

Figure 5:
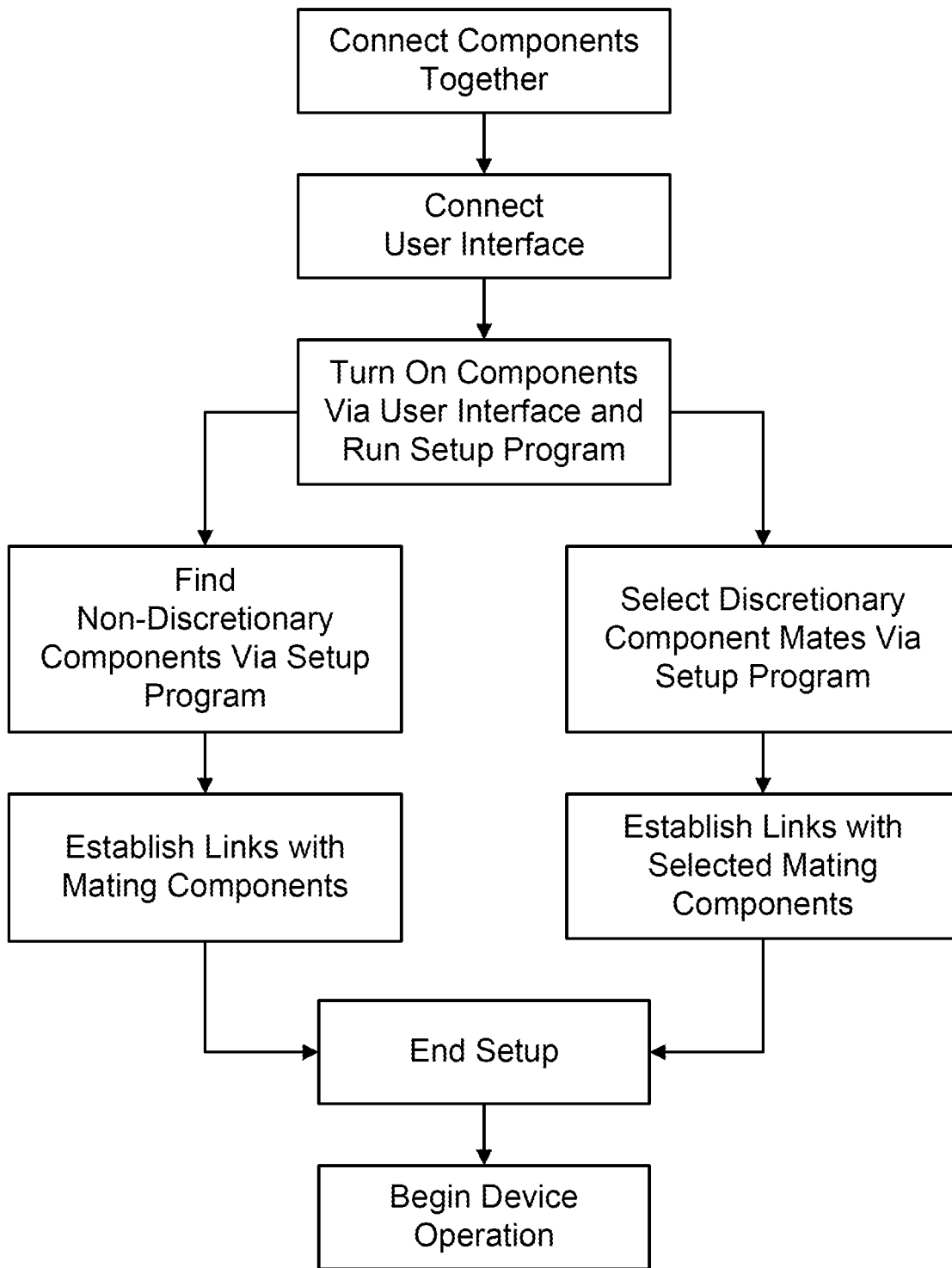
FIG. 5 is a flow chart view of a process useable with the disclosures herein.

Turning now to FIG. 5, a set-up procedure will be disclosed that sets forth the manner in which the various components communicate. The first step is for the user to connect the components together with the conductor.

The user connects the various components together in a manner similar to that shown in FIG. 4, wherein conductors extend between a port on one device and a port on a second device, with the particular device connection sequence usually influenced by spatial considerations rather than functional considerations.

A user interface, such as user interface 512 is then coupled to the system. The user interface 512 can be a permanently connected interface, or one that is coupled on a temporary basis. For example, one can couple a computer to a port, such as a communications port (not shown) of the vehicle that would then allow the user interface 512 to communicate with all of the various components of the device.

The components are then turned on and the interface is then set to run the setup program for setting up the components for the first time.

When first set up, the components will be divided, conceptually, into two major types of components. These components include discretionary components and nondiscretionary components. As used herein, non-discretionary components refer to those components that are capable of communicating and interacting with only one or one particular set of other components.

For example, the neutral sensor 440 is a non-discretionary component, as the only other components that the neutral sensor 440 communicates with are the on/off switch 446 and the transmission (not shown). The neutral sensor 440 senses the neutral state of the drive system, and then communicates this with the on/off switch 446 to ensure that the device is not allowed to be in the "on" position unless the neutral sensor 440 senses that the drive system is not in the neutral state.

Another similar, non-discretionary switch is the engine kill switch 406, as in a preferred embodiment, it communicates only with the on/off switch 446. As such, if the engine kill switch is actuated to cease the operation of the engine, it communicates with the on/off switch 446 to turn the utility vehicle off, to thereby stop the first and second motor 508, 502, along with the internal combustion engine.

During setup, the initiation of the setup program will cause non-discretionary components to send out communication signals to find the appropriate component or set of components with which they are supposed to be mating, and communicating with during the operation of the device.

The other group of components is discretionary components. The discretionary components require some sort of user interaction in order to mate the component with its appropriate other component. For example, first and second joysticks 450, 456 are designed for mating with the first and second motor controllers 504, 498. However, which of the particular joysticks 450,456 mates with which of the motor controllers 498, 504, is somewhat discretionary. As such, during the setup program, the user interface may flash a display instructing the user to decide which motor controller he wishes to associate the first joystick 450 with, and would also query the user as to which motor controller 498 or 504 he wishes to associate the second joystick 456 with.

Although the user interface 512 should be controllable, such as with a touch screen or the like, and should be capable of displaying a message, it need not do so. For example, the user interface can be something as simple as lights on a joystick that would light up to tell the user that he is to then engage the first joystick to associate it with a particular controller. For example, by moving the joystick to the left, the user could conceivably then associate the first joystick with the first or left hand motor 508.

A similar protocol could be used with the second joystick. During the setup procedure, the interface is used to enable the user to mate the discretionary components with the proper components to which the user decides to associate them. After both discretionary and non-discretionary components are so mated, the setup will end. After setup has ended, the user can then begin the operation of the device.

With the removable user interface, the interface device such as a computer can be removed after all of the discretionary and non-discretionary components are appropriately set up. With a permanent user interface, the interface can be employed for setup purposes along with other control and information display related purposes.

Preferably, the customer interface enables the user to go back in to re-set up the components if the user wishes to change the mating characteristics of the component, or if a new component is added.

Figure 6:
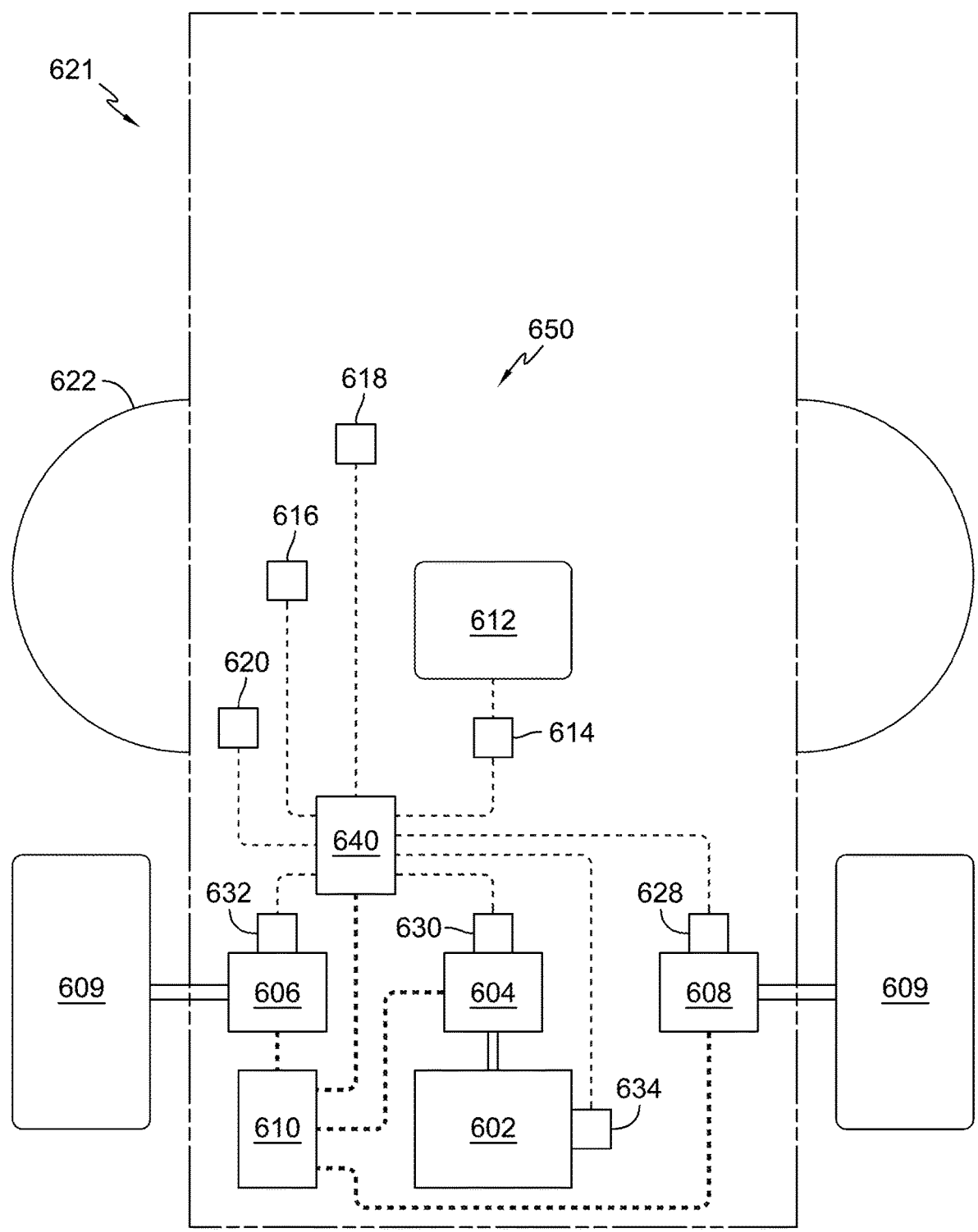
FIG. 6 is an exemplary embodiment of a vehicle system including a system state controller.

FIG. 6 illustrates one embodiment of a vehicle system 650 including a system state controller. In this embodiment, a vehicle 621 includes an internal combustion engine 602. The internal combustion engine 602 can drive a generator 604 which can be structured to provide electricity to one or more traction motors 606, 608 which drive one or more traction wheels 609. The generator 604 further provides electricity to a battery 610 and, in some forms, can additionally act as a motor to start the engine 602. The vehicle 621 can include a power take-off (PTO) such as mowing deck 622 which includes a plurality of grass cutting blades.

Vehicle 621 is illustrated as a garden tractor driven via traction motors 606, 608 and generator 604. However, vehicle 621 can be powered by various drive means and can take other forms, including but not limited to a zero-turn mower, a utility vehicle, a rice planter or harvester, a golf cart, or any other vehicle in which it may be desirable to integrate analog inputs and/or outputs and digital controllers. These analog inputs and/or outputs, digital controllers, and the integration thereof will be discussed hereinafter.

The generator 604 and the traction motors 606, 608 are electromechanical devices which convert mechanical to electrical energy, as is the case with generator 604, or electrical to mechanical energy, as is the case with traction motors 606, 608. In one specific form, the traction motors 606, 608 and the generator 604 are brushless DC permanent magnet motors; however, any electro-mechanical device is contemplated including, but not limited to brushed DC motors, asynchronous motors, or synchronous motors. The PTO can be directly driven by the internal combustion engine 602 or can be driven by an electric motor, depending on the specific application.

The vehicle 621 includes a plurality of analog sensors. An analog operator presence sensor 614 detects the presence of an operator in a specified location. The operator presence sensor 614 can be located at any one of various points of the vehicle 621 depending on the vehicle configuration. As illustrated in FIG. 6, the operator presence sensor 614 detects if an operator is sitting in seat 612.

An analog parking brake sensor 616 detects if the parking brake is engaged or disengaged. A vehicle 621 analog neutral sensor 618 detects if the vehicle 621 is placed in a drive state of neutral. An analog PTO engagement sensor 620 detects if the PTO is engaged or disengaged. Although various analog sensors have been discussed, it is contemplated that any number and/or type of analog sensors may be connected to the vehicle 621 depending on a desired application.

Additionally, some of the previously discussed analog sensors/controls can be digital depending upon the specific application. For example, vehicle kill control 634 is illustrated as an analog signal. Vehicle kill control 634 can prevent the engine 602 from being started and/or can kill the engine during vehicle operation should a kill vehicle condition arise. In an analog scenario, this could be completed by simply grounding the engine, or the like. However, in other forms the vehicle kill control 634 can be a digital engine controller 634 which, among other things, can control electronic fuel injection, ignition, valve timing and can prevent engine starting or can kill the engine by simply cutting fuel and/or preventing ignition.

The vehicle 621 additionally includes a plurality of digital controllers. The motors 606, 608 are in electronic communication with motor controllers 632, 628 respectively. The motor controllers 632, 628 can control the speed, direction of rotation, and the like of the motors 606, 608. The motor controllers 632, 628 can additionally provide feedback from the motors 606, 608 such as motor temperature, motor revolutions per minute, and the like. The generator 604 is controlled by a generator controller 630. The generator controller 630 can control various functioning of the generator, including but not limited to generator loading and power output.

Although specific digital controllers have been discussed, it is contemplated that any number and type of digital controllers and/or processors can be incorporated into the vehicle 621 depending on the desired vehicle specifications. In certain embodiments, the controllers can form a portion of a processing subsystem including one or more computing devices having memory, processing, and communication hardware. The controllers may be a single integrated device or distributed devices, may be modules which communicate unilaterally or bilaterally with other modules, and the functions of the controller may be performed by hardware and/or software. In various forms, the controllers may also include AC/DC converters, rectifiers, or the like.

Figure 7:
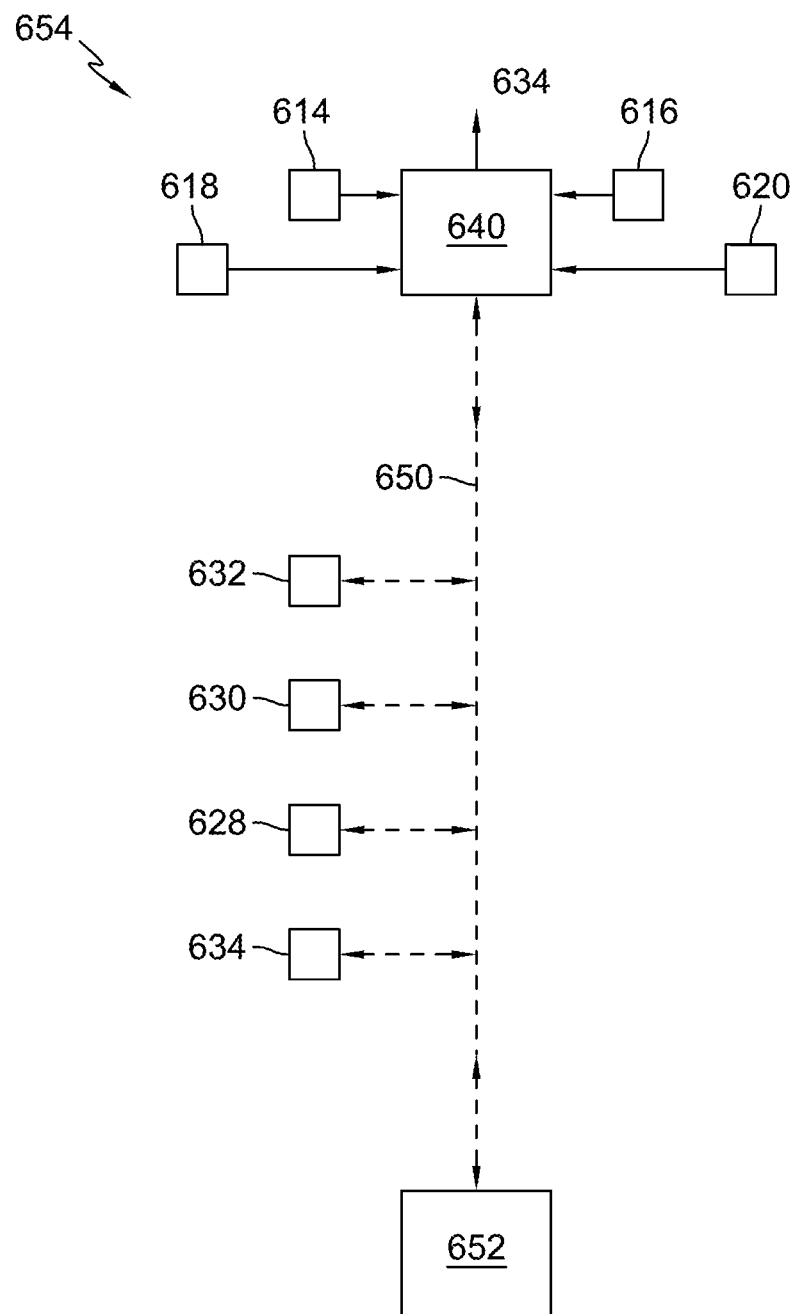
FIG. 7 is an exemplary embodiment of a serial connection for a system state controller of the present disclosure.

A vehicle controller 640 is in electrical communication with the various analog sensors/controllers and the digital controllers. In one form, the vehicle controller 640 can unilaterally communicate with the various analog sensors/controllers and bilaterally communicates with the various digital controllers. Referring now to FIG. 7, the system state controller 640 and the digital controllers can communicate over a bus 650 or other communications network, including but not limited to a hardwired digital network, a CAN network, or a wireless network. In one specific form, the network 650 is the MowNet network system owned by Hydro-Gear Limited Partnership, the assignee of the instant application.

FIG. 7 illustrates a serial bus-style connection between the system components. The serial bus 650 connection is illustrated as being comprised of a plurality of nodes in series, wherein each digital controller (e.g. motor controllers 628, 632, generator controller 630, digital engine controller 634, and a digital display controller 652) is a node which can include a microprocessor. In this manner, each of the digital controllers can communicate with each other as well as with the system state controller 640. The digital display controller 652 can be configured to display messages from the various digital controllers, analog sensors, the system state controller, and/or can be utilized as an input device by an operator to communicate with the system state controller. In further forms, the digital display controller 652 can be utilized to diagnose system issues via the system state controller 640.

As can be understood by one of ordinary skill, the system state controller 640 and digital controllers can be placed in electronic communication in various ways. In one specific non-limiting form, the system state controller 640 and the digital controllers are connected through a five pin wiring harness connection; however, other configurations are contemplated herein.

Figure 8:
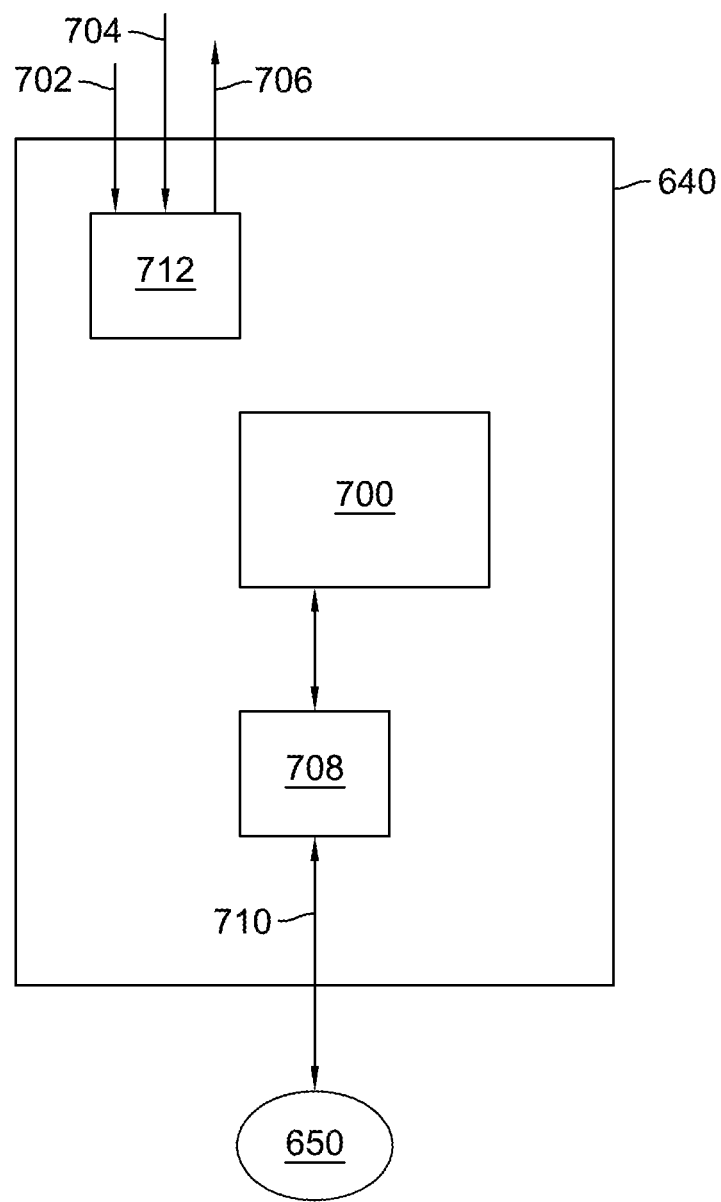
FIG. 8 is an illustrative view of a steady state controller of the present disclosure.

The system state controller 640 permits the communication of analog devices, collectively 654, to be transmitted to and/or from the network 650. Referring now to FIG. 8, one form of the system state controller is illustrated. The system state controller 640 can include a microprocessor 700, a serial CAN Bus style TRX/RE communications device 708, and a power regulator 712. However, it is contemplated that device 708 can be incorporated into microprocessor 700 and that the system state controller may contain various other modules, microprocessors, AC/DC converters, or the like. The system state controller 640 can bilaterally communicate with the digital controllers on the network 650.

The microprocessor 700 receives various analog inputs 702, 704 from one or more of the analog devices 654 and can send analog signals 706 to one or more of the analog devices 654. The microprocessor 700 converts these various analog inputs 702, 704 into digital signals 710 which can be transmitted over the network 650 to the various digital controllers. Additionally, the microprocessor 700 can convert various digital signals 710 to an analog signal. For example, the microprocessor can output a kill engine 634 signal in response to various digital signals 710 which would trigger a kill engine command. The integration via the system state controller 640 of the legacy analog inputs/outputs with the network 650 can allow for a significantly less complex system (e.g. wiring harnesses) and can greatly reduce the overall system cost, and therefore, vehicle cost.

Figure 9:
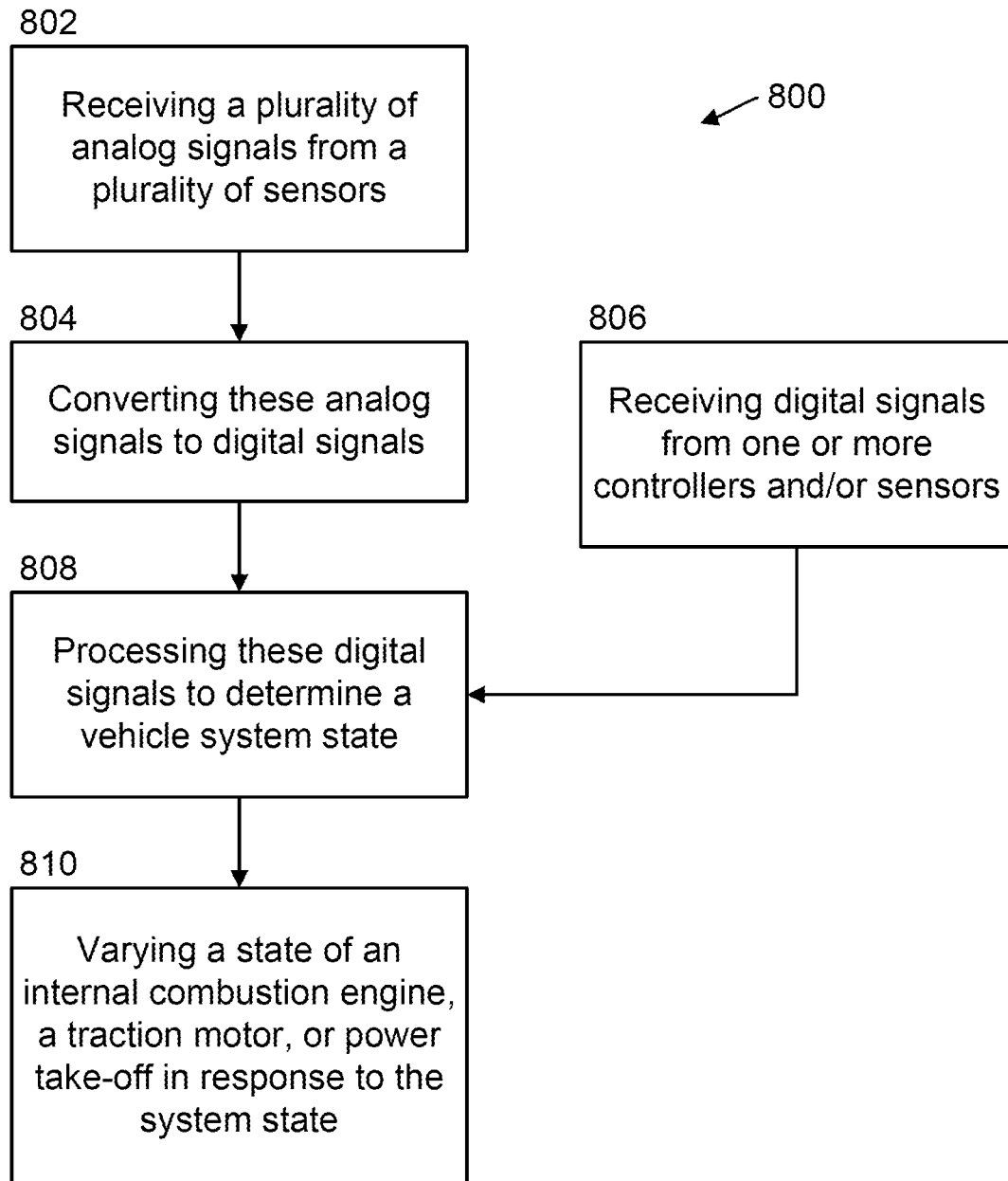
FIG. 9 is an illustrative view of a method of controller operation of the present disclosure.

FIG. 9 illustrates one embodiment of a method 800 of operation of a system state controller 640. The system state controller 640 receives a plurality of analog signals from a plurality of sensors at 802. The system state controller 640 converts these analog signals to digital signals at 804. The system state controller 640 receives digital signals from one or more digital controllers and/or sensors at 806. The system state controller 640 processes these digital signals to determine a vehicle system state at 808. In response to the system state, the system state controller 640 and/or the distributed digital controllers can vary a state of the engine, motor, or PTO at 810.

Figure 10:
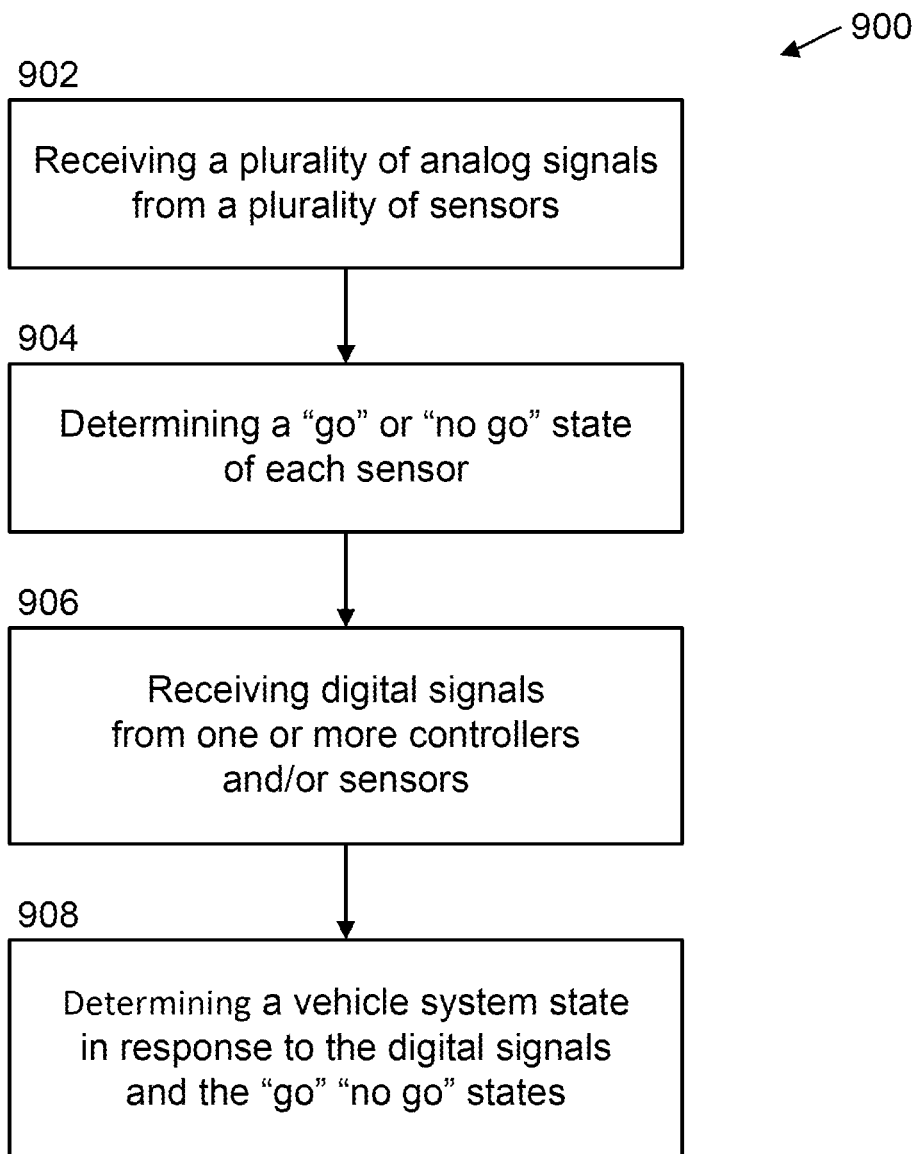
FIG. 10 is another embodiment of an illustrative view of a method of operation of the controller of the present disclosure.

FIG. 10 illustrates another embodiment of a method 900 of operation of a system state controller 640. The controller 640 receives a plurality of analog signals from a plurality of sensors at 902. At 904, the controller 640 determines a "go" or "no go" state of each analog sensor. At 906, the controller receives digital signals from one or more controllers and/or sensors. At 908, the controller 640 determines a vehicle system state in response to the digital signals and the "go" or "no go" state of each analog sensor.

The communication between the digital controllers, the system state controller, the analog signals, as well as a determination of a vehicle system state will be discussed by way of example. Referring back to FIGS. 6-8, prior to vehicle 621 startup, the left hand drive motor controller 632 can communicate over the network 650 "left hand drive is ready to operate." The right hand drive motor controller 628 can communicate over the network 650 "right hand drive is ready to operate." The analog sensors 654 can communicate to the system state controller 640 "go" whereby the system state controller 640 can communicate to the network 650 "analog sensors ready to operate."

However, as was discussed with FIG. 9, alternately, each analog sensor can communicate "go" or no go" to the system state controller 640 whereby the system state controller 640 can convert this analog signal into a digital message such as "parking brake engaged", "PTO disengaged", and/or "neutral off." The system state controller 640 can then determine vehicle system state is in an operable condition "permit startup." Alternately, if one or more digital controllers or analog sensors present a "no go" or abnormal signal, then the vehicle will be determined to be in a "kill engine" or "do not permit startup" condition.

During vehicle 621 operation, should an operator input an increase drive speed command, this can be communicated via network 650 to the motor controllers 632, 628 such that the vehicle speed is increased. Should the operator decide to turn left, this command can be communicated to the motor controllers 632, 628 such that the speed of the right hand motor 608 is increased relative the left hand motor 606 such that a left hand turn is achieved. The generator controller 630 can respond to power demand from the motor controllers 632, 628 as well as to the battery state of charge.

The system state controller 640 can detect a low charge condition in which case the system state controller 640 can communicate to the generator controller 630 "increase power output." In some forms, the decision whether to drive motors 606, 608 can reside within the motor controllers 632, 628. For example, if motor controller 632 detects an overheat or over-speed condition, among other possible fault conditions, it can issue a "stop driving command" to the system state controller 640 via network 650. The system state controller 640 will then issue a "stop driving command" to the other motor controller 628 via network 650 and the vehicle will stop.

In another form, the vehicle 621 can be operated via power from battery 610 without the internal combustion engine 602. For example, an operator could send an "electric drive" command to the system state controller 640 which would either issue a "kill engine" or "do not start engine" command to the engine controller 634. Alternately, should the engine controller 634 detect an engine fault condition (e.g. low oil, overheat, etc.) the engine controller 634 can send a "kill engine" command to the system state controller 640. Although specific commands have been illustrated in response to specific conditions, it is contemplated that various other commands can be sent in response to various other conditions as may be desirable for varied design parameters.

Figure 11:
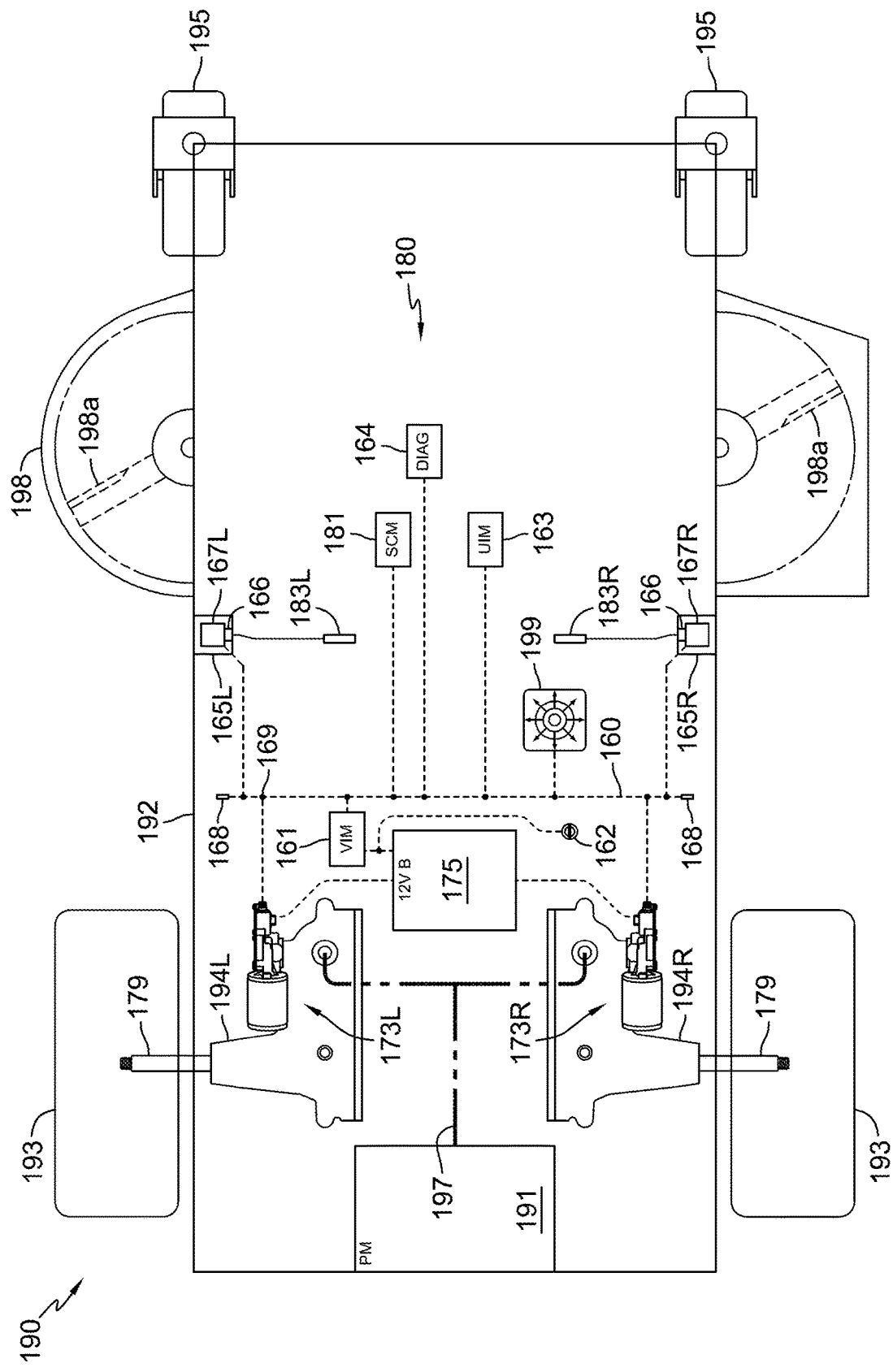
FIG. 11 is a schematic view of a vehicle having operator control levers and incorporating a vehicle control system in accordance with the present disclosure.

FIG. 11 depicts another embodiment of a zero turn vehicle 190 incorporating another embodiment of a vehicle control system 180 operable to interface with other vehicle systems via a CAN Bus. Vehicle 190 includes a frame 192 on which is mounted a prime mover, such as internal combustion engine 191, that drives a pair of hydrostatic transaxles 194L, 194R by means of a conventional power transfer apparatus, such as belt and pulley system 197. Internal combustion engine 191 may further drive (by means of belt and pulley system 197) an optional mowing deck 198 having mowing blade(s) 198a. Mowing deck 198 may be selectively engaged by operation of a manual or electric clutch-brake-pulley mechanism (not shown).

Each of the hydrostatic transaxles 194L, 194R includes an output axle 179 engaged to a drive wheel 193 to provide propulsion and steering as directed by the vehicle operator via control levers 183L, 183R engaged to respective speed control mechanisms 165L, 165R or via optional joystick 199 (including a joystick sensor module). Vehicle 190 also has a pair of non-driven, non-steered caster wheels 195 that freely pivot and track in response to the steering impetus provided by the drive wheels 193. Each hydrostatic transaxle 194L, 194R has an electric actuator 173L, 173R mounted thereon to control the output thereof. Electric actuators 173L, 173R receive power from a 12V battery 175 that is charged by an alternator or similar power generating device (not shown). Each electric actuator 173L, 173R is connected to a Vehicle Integration Module (VIM) 161 by way of a CAN Bus (communication network) 160. CAN Bus 160 is powered through the VIM 161, which receives power from battery 175 when key switch 162 is turned on, and directs power and serial communication through CAN Bus 160. The aforementioned pair of speed control mechanisms 165L, 165R, comprising speed and direction controllers (a.k.a. Lap Bar Sensor Modules) 167L, 167R, respectively, are also in communication with the VIM 161 via CAN Bus 160. Control signals are generated and transmitted by the Lap Bar Sensor Modules 167L, 167R via CAN Bus 160 in response to operator manipulation of the left and right-side control levers 183L, 183R engaged to the pair of speed control mechanisms 165L, 165R. A neutral switch 166 may be included with each speed control mechanism 165L, 165R. A CAN Bus termination module 168 (comprising a resistor) is connected to each end of the CAN Bus 160 network wiring harness to ensure communication speed and signal integrity on CAN Bus 160. This type of termination is necessary and typical in a CAN Bus communication system. A CAN Bus T-Connector 169 facilitates connection of any of the aforementioned components to CAN Bus 160.

For purposes of this disclosure, the respective speed control mechanisms 165L, 165R may include any or all of the speed control mechanisms, features and functionality described in U.S. patent application Ser. No. 15/377,706, filed Dec. 13, 2016, which is incorporated by reference herein in its entirety. That application is now issued as U.S. Pat. No. 10,414,436. Likewise, the electric actuator 173L, 173R may include any or all of the features and functionality described in U.S. Provisional Patent Application No. 62/481,422, filed Apr. 4, 2017, which is incorporated by reference herein in its entirety. That application is now itself incorporated into U.S. patent application Ser. No. 15/944,571, which issued as U.S. Pat. No. 10,890,253.

Figure 12:
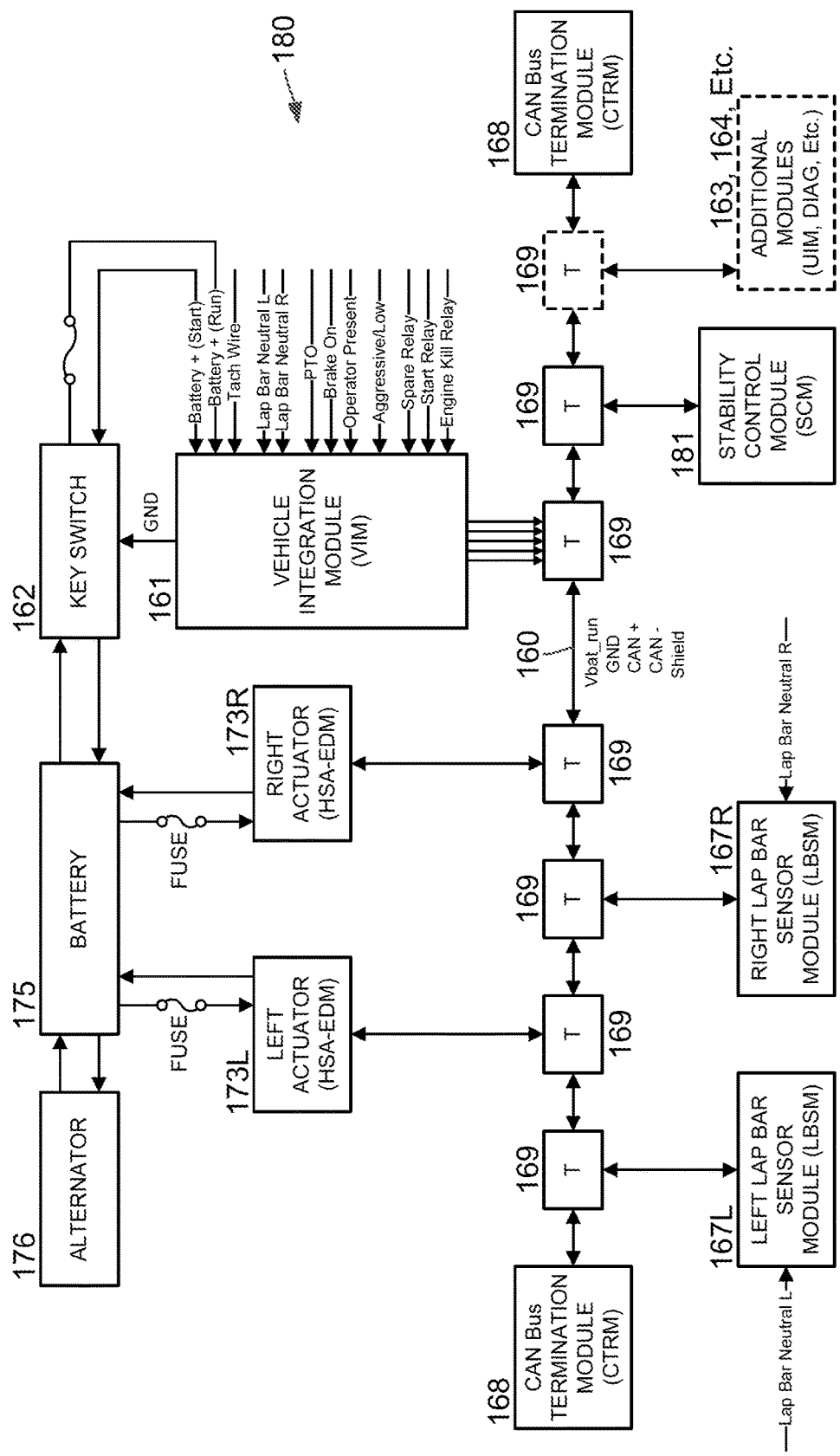
FIG. 12 is a schematic view of one embodiment of a vehicle control system in accordance with the present disclosure.

As shown in FIGS. 11 and 12, vehicle control system 180 may include a number of intelligent, electronic modules functioning as a single system and coordinating their activities via CAN Bus 160. These modules include (but are not limited to) the aforementioned Vehicle Integration Module (VIM) 161; Lap Bar Sensor Modules (LBSM) 167L, 167R; joystick with Joystick Sensor Module (JSM) 199; electric actuators 173L, 173R including High Speed Actuators with integrated Electronic Drive Modules (HSA-EDM) 173L, 173R; CAN Bus Termination Modules (CTRM) 168; User Interface Module (UIM) 163; Diagnostic Module and GUI (DIAG) 164; and Stability Control Module (SCM) 181, among others. In some embodiments, VIM 161 includes a Bluetooth Module for external communications with a remote device, such as a portable communications device or a web server. UIM 163 may include a display screen, a touch screen, or any other user interface to receive user input and/or to display or communicate system function, status, or other data to the user. The SCM 181 may be configured to provide stability control and related features and benefits, including straight line tracking, wheel slip and traction control, hillside stability and rollover protection. The SCM 181 may include all of the features and functionality described in U.S. patent application Ser. No. 15/082,425, filed Mar. 28, 2016, now U.S. Pat. No. 9,764,734, which is incorporated by reference herein in its entirety.

Figure 13:
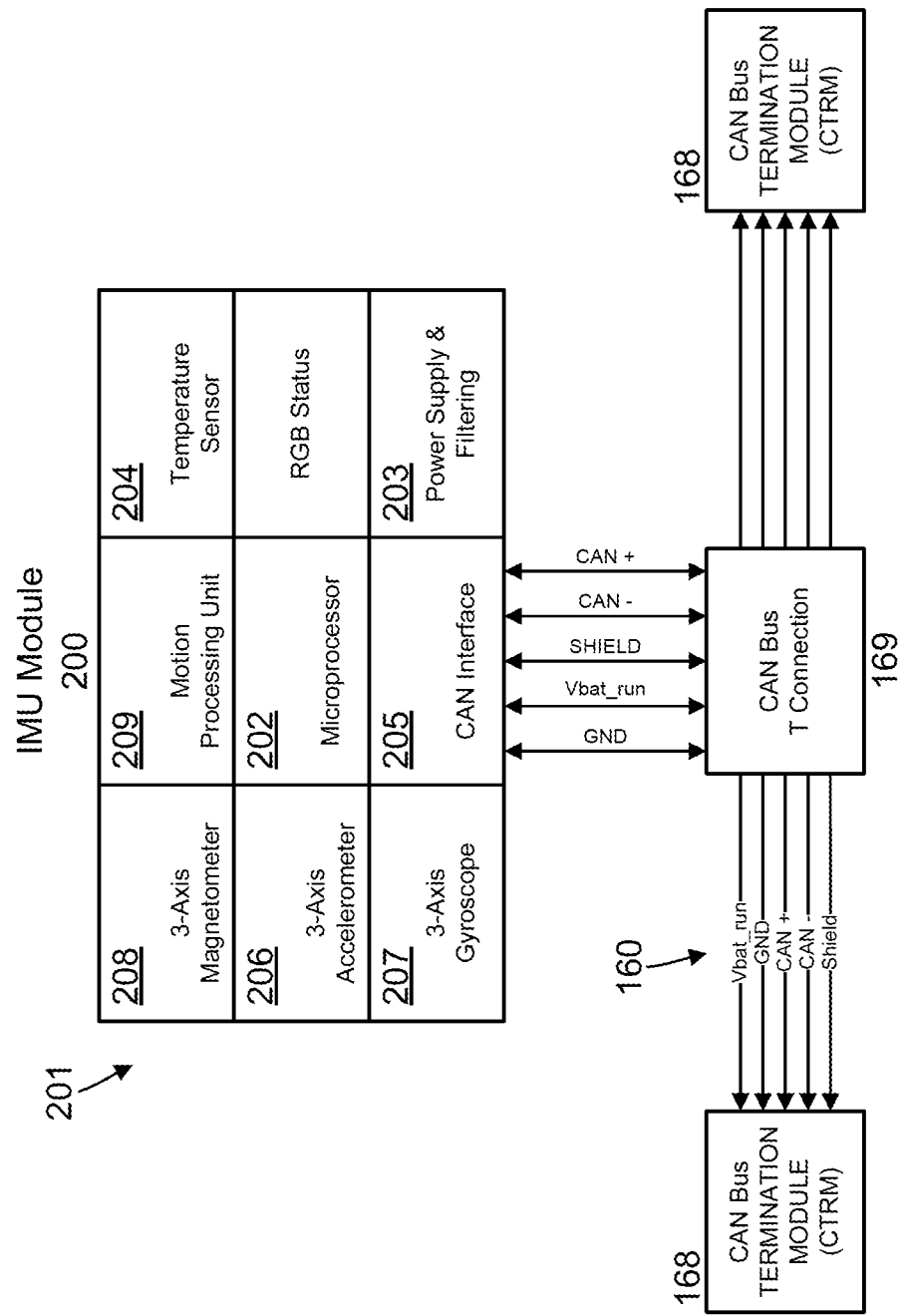
FIG. 13 is a schematic view of an embodiment of an inertial measurement unit of the present disclosure.

In some embodiments, SCM 181 is an Inertial Measurement Unit (IMU) module 200. As shown in FIG. 13, the IMU module 200 may be configured to include a 9-axis IMU 201, a microprocessor 202, power filtering and conversion 203, temperature sensor 204, and a CAN interface 205 for communicating data over CAN Bus 160. The 9-axis IMU 201 includes a 3-axis accelerometer 206, a 3-axis gyroscope 207, and a 3-axis magnetometer 208. In this way, the IMU module 200 may be capable of 9-axis motion processing, including 3-axis accelerometer processing, 3-axis gyroscope processing, and 3-axis magnetometer processing for traction and stability control of the vehicle, and particularly, to ensure the vehicle maintains a straight track on level ground as well as maintaining a straight track while traversing a side slope. In such instances, the IMU module 200 may also include an attitude and heading reference system for yaw, pitch, and roll control of the vehicle. To do this, the IMU module 200, via one or more algorithms, may fuse the output from each of the 3-axis accelerometer 206, the 3-axis gyroscope 207, and the 3-axis magnetometer 208 to obtain a vector in 3 dimensions. In other embodiments, the output of each of the 3-axis accelerometer 206, the 3-axis gyroscope 207, and the 3-axis magnetometer 208 may be utilized separately. From the user's standpoint, the one or more algorithms may be configured to provide real-time, dynamic, and effortless control of the vehicle when the vehicle is operating on a hill, for example.

In some embodiments, the 3-axis accelerometer 206, the 3-axis gyroscope 207, and the 3-axis magnetometer 208 are operating when the vehicle is turned "on." An on/off switch (not shown) may trigger the one or more algorithms to utilize the output from user selected or predetermined ones of the 3-axis accelerometer 206, the 3-axis gyroscope 207, and the 3-axis magnetometer 208 to automatically adjust vehicle roll angle, vehicle yaw, and vehicle speed, for example. The one or more algorithms may dynamically adjust vehicle drive system input to result in a user experience of effortless control of the vehicle.

The 9-axis IMU 201 may be isolation mounted in a housing to minimize noise and data loss of the 9-axis IMU 201. The IMU module 200 may be itself be isolation mounted to the vehicle via a mechanical, vibration and shock damping mount system. For example, a visco-elastic material such as Sorbothane®, which is available from Sorbothane, Inc., may be used to isolate the IMU module 200 from vibration during use of the vehicle. The SCM 181 and the IMU module 200 may be electrically powered via CAN Bus 160 as described herein.

In one embodiment, a Motion Processing Unit (MPU) 209 of the IMU module 200 is configured to receive data from the 3-axis gyroscope 207 and the 3-axis accelerometer 206 of the 9-axis IMU 201. The MPU 209 may be configured to fuse the data based on Digital Motion Processer (DMP) settings and produce quaternions. The data will be placed on the FIFO along with data from the 3-axis magnetometer 208 as well as any other selected data. An interrupt pin may be asserted so the microprocessor 202 will know data is ready. The microprocessor interrupt service routine may be configured to read the FIFO and load the data into a Motion Processing Library (MPL). The microprocessor 202 can now query the MPL for quaternions, Euler angles, heading, etc. The microprocessor 202 may be configured to generate appropriate messages based on the module configuration settings and place the messages on CAN bus 160.

In some embodiments, the data available from the IMU module 200 may include:
Module system status
IMU calibration status
IMU self-test status
IMU Temperature ° C.
Quaternion (w, x, y, z)
Yaw, Pitch, Roll degrees
Heading degrees
Heading (fused) degrees
Accelerometer (x, y, z) g
Gyroscope (x, y, z) (°/s)
Magnetometer (x, y, z)
Magnetometer strength uT
Accumulated Gyroscope (x, y, z) degrees
Accelerometer tilt x to z degrees
Accelerometer tilt y to z degrees
Accelerometer tilt x to y degrees Vehicle control system 180 may include multiple IMU modules, (including an IMU module 200) of one or more configurations. Each IMU module may be capable of parameter tuning or adjustment over CAN Bus 160 via a plug-in interface or via remote programming device 1180 described below. Tunable parameters may be defined by user access level so that only a user with the specified access level may modify the value of the parameter.

Figure 14:
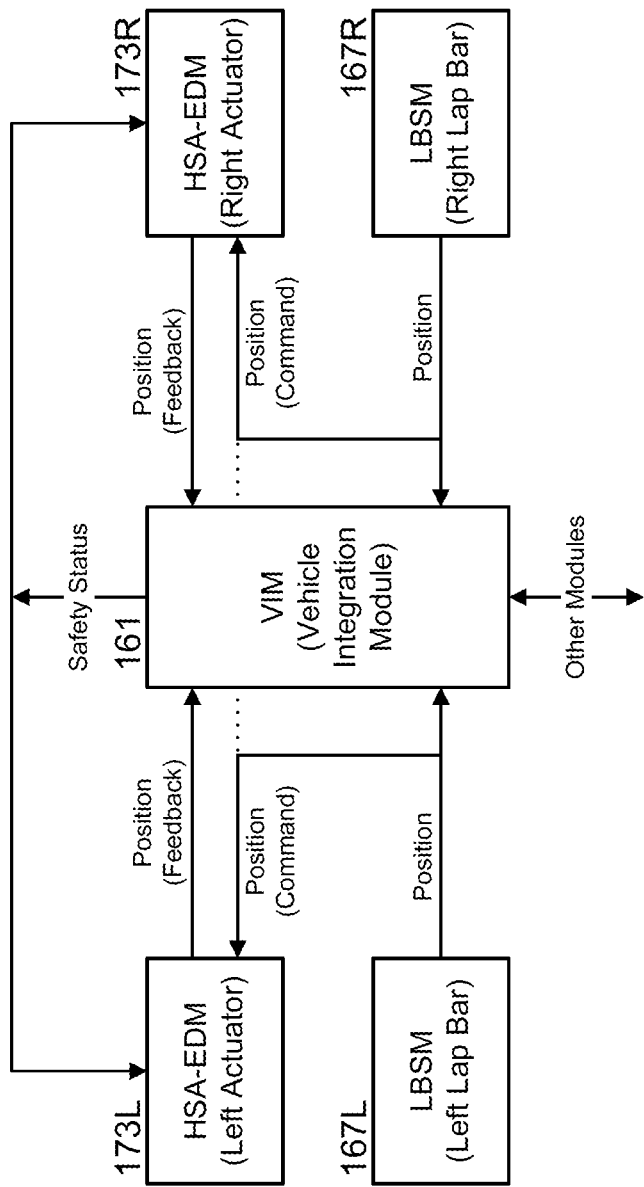
FIG. 14 is another schematic view of the vehicle control system shown in FIG. 12.

Referring to FIGS. 11, 12 and 14, operator commands (in the form of absolute position data of the control levers 183L, 183R) are generated by the LBSM pair 167L, 167R (or, optionally, via joystick with JSM 199) and communicated to the CAN Bus 160 network. The HSA-EDM 173L, 173R and VIM 161 may be configured to monitor these commands and if valid, respond by driving the actuator(s) to the requested position(s). Invalid commands are responded to with appropriate error handling or failsafe routines.

In one embodiment, the VIM 161 may monitor LBSM position updates received over the CAN Bus 160 and respond if data is invalid. For example, the VIM 161 may be configured to monitor vehicle status and override operator position commands if necessary for proper control of vehicle 190. The VIM 161 may provide status information to the operator of vehicle 190 for a variety of system functions including speed, operating temperature and battery status when the vehicle contains a UIM 163 and this feature is enabled. The UIM 163 may be configured to display vehicle status information messages generated by the VIM 161 and transmitted via the CAN Bus 160 to the vehicle operator. The UIM 163 may include any form of display device or system that may be removably connected to the VIM 161 when needed by the user.

The HSA-EDM 173L, 173R may be configured to respond to speed, position and diagnostic requests received over the CAN Bus 160, and communicate its status, absolute position and error codes to the VIM 161 over the CAN Bus 160. For example, the HSA-EDM 173L, 173R system may continuously compare the actual actuator positions to the operator-requested positions and drive the actuator motors to the commanded positions using a motion profile based on tunable parameters stored in the non-volatile memory of each HSA-EDM 173L, 173R.

Figure 15:
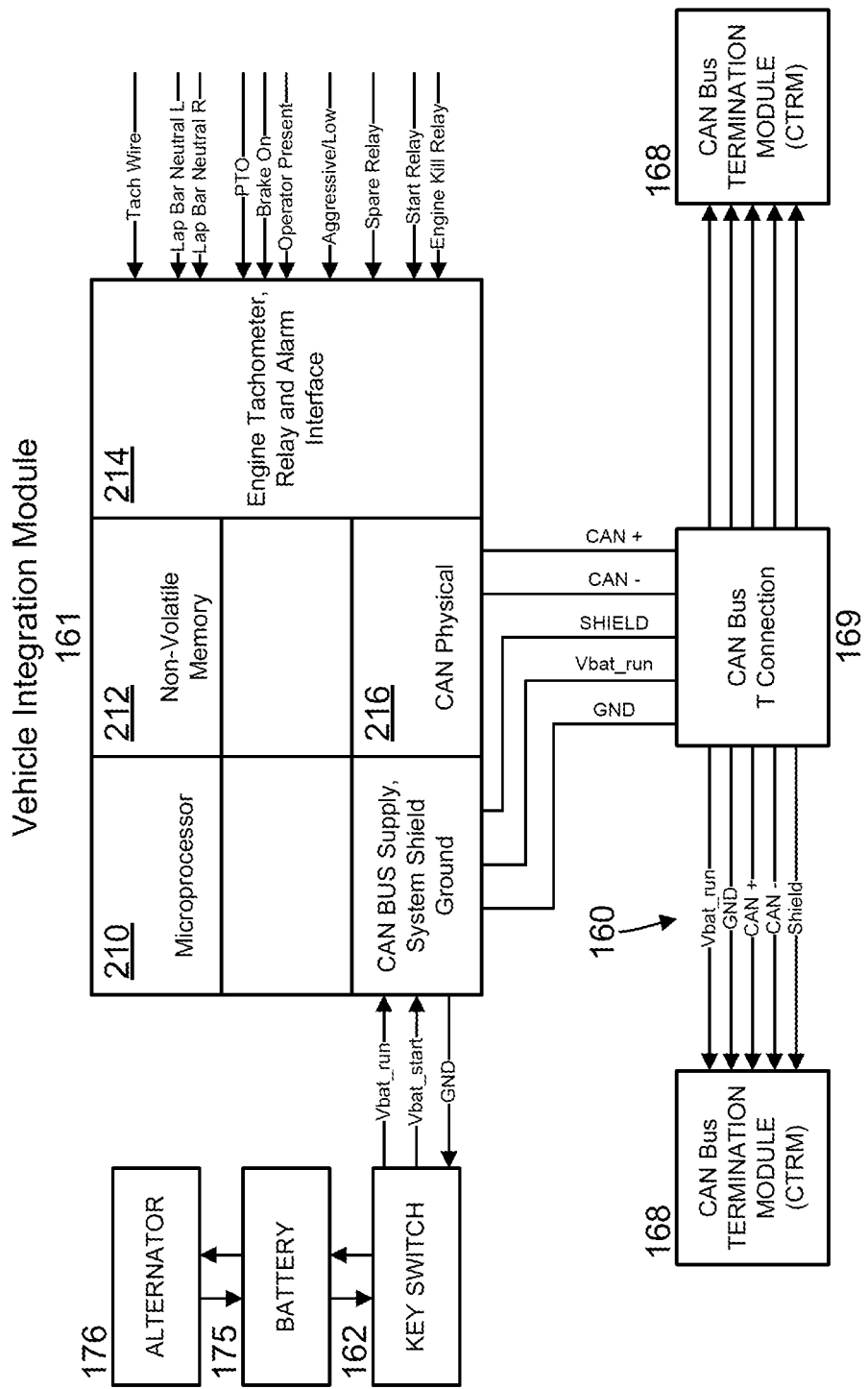
FIG. 15 is a schematic view of an embodiment of a vehicle integration module of the present disclosure.

Turning to FIG. 15, the VIM 161 is shown in more detail. The VIM 161 may be configured similar to a master controller, such as master controller 328 described above. VIM 161 may include a DC to DC power supply, microprocessor-based control board, and input/output bus housed in a rugged enclosure, and may be configured to operate on a 12V power source. The VIM 161 may include microprocessor 210, non-volatile memory 212, one or more data input ports 214, and CAN Bus interface 216. The VIM 161 may be configured to enable one or more display modules or devices to be plugged into one or more ports of the VIM 161 to enable a user to interface with the VIM 161. The VIM 161 may be configured to receive commands, such as module status signals, and process those signals within 5 ms of reception. The VIM 161 may be configured to transmit data, such as system safety data, or retransmit data, such as operator inputs, such that the transmitted or retransmitted data is not more than 5 ms old at the time of transmission.

As described above, CAN Bus 160 is powered through the VIM 161. The power initiation sequence begins when key switch 162 is turned on. Power from battery 175 when key switch 162 is turned on is directed to CAN Bus 160 to power CAN Bus 160. When the vehicle is running, power from alternator 176 may be directed (via battery 175) to the VIM 161 and to CAN Bus 160.

During vehicle operation, control signals are generated and transmitted via CAN Bus 160 in response to operator manipulation of the left and right-side control levers 183L, 183R engaged to the pair of speed control mechanisms 165L, 165R. The VIM 161 may be configured to determine system operational status based on the status of the individual modules described above as well as safety interlock sensor data, etc., and control the state of the electric actuators 173L, 173R as appropriate.

System data logging to memory 212, providing vehicle system messages to the user via the UIM 163, and vehicle system management and control may be performed entirely by the VIM 161. For example, the VIM 161 may be configured to log and store the safety interlock status, vehicle sensor alarm status, error and fault condition status, and minimum and maximum VIM temperatures.

The VIM 161 may be configured to send a control signal to the electric actuators 173L, 173R to reduce the speed of the vehicle to a predetermined speed, including stopping all vehicle motion, upon receiving or detecting one or more fault conditions, errors or data lying outside of predetermined ranges or limits.

The VIM 161 may be configured to receive engine kill requests from any of the modules described above. When an engine kill request is received by the VIM 161, the VIM 161 may provide an active low (GND) signal to shut down the vehicle prime mover, such as internal combustion engine 191. Likewise, when the vehicle operator turns the key switch 162 to the off position, the VIM receives a low power signal, which causes the VIM 161 to initiate the step of powering down vehicle systems. The VIM 161 may be configured to maintain its own internal power for a short period of time to enable it to perform vehicle power down functions safely.

Figure 16:
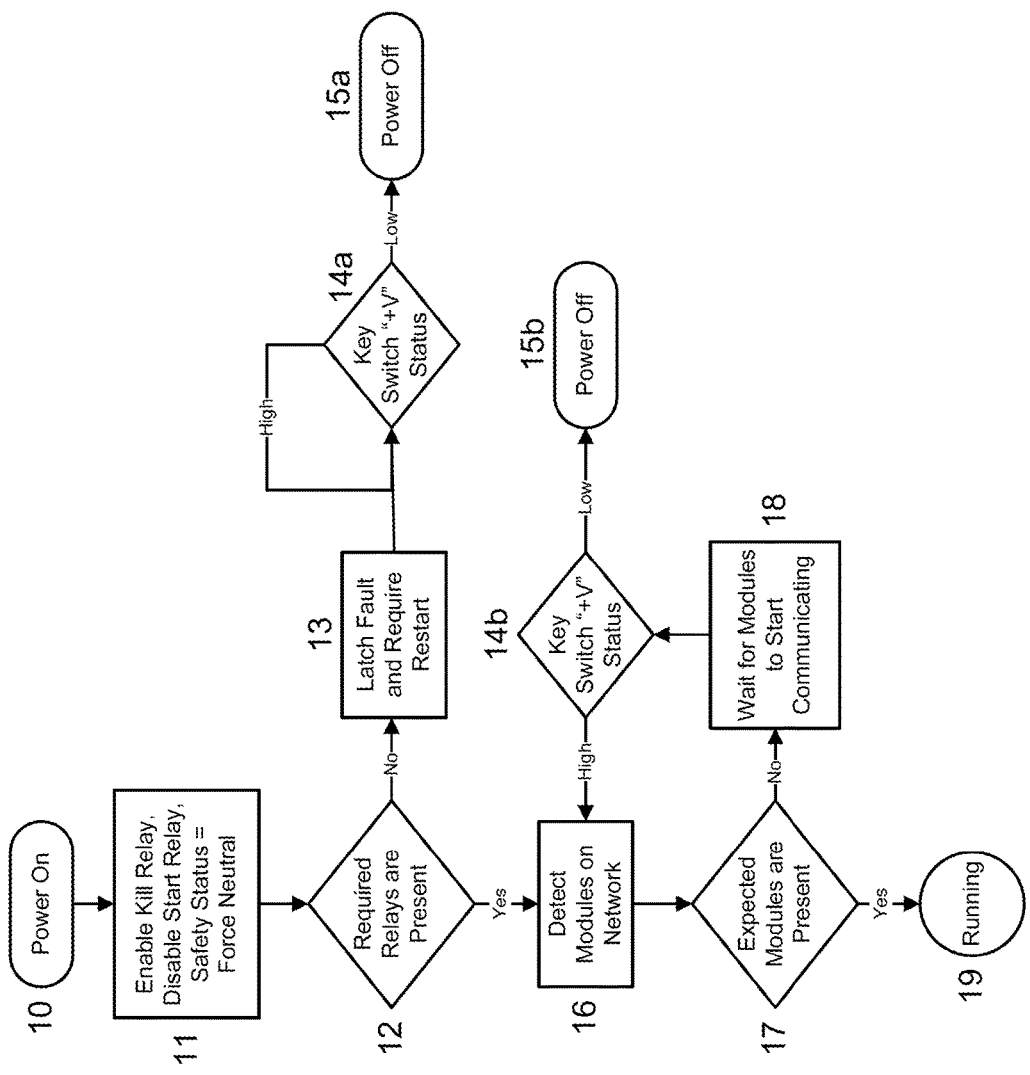
FIGS. 16 and 17 are block diagrams illustrating the functionality of one embodiment of a vehicle integration module of the present disclosure.
Figure 17:
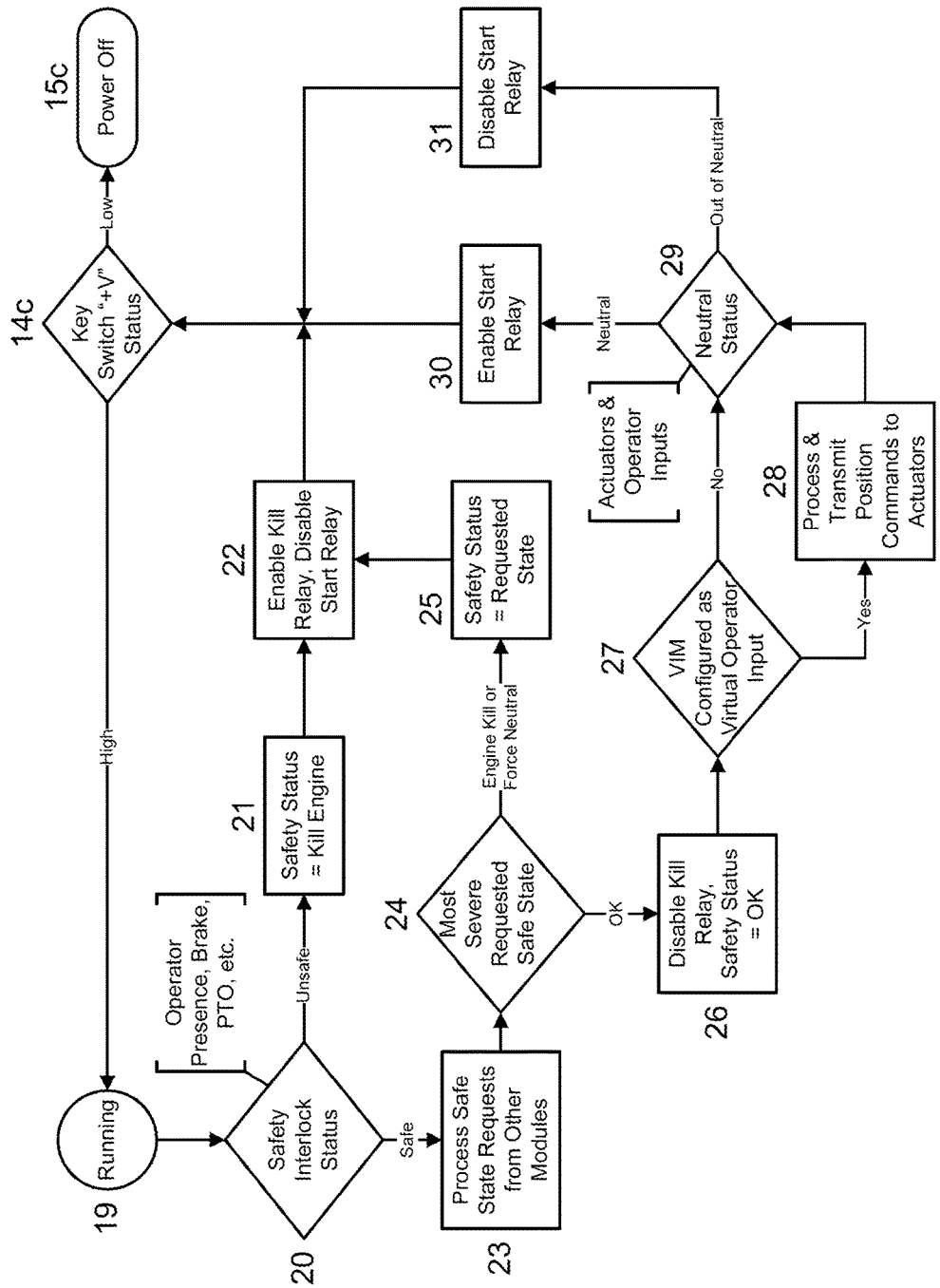

Turning to FIGS. 16 and 17, there is shown a schematic flow diagram illustrating the operational behavior of one embodiment of the VIM 161. At step 10, power from battery 175 is commanded "on" by virtue of the vehicle operator turning the key switch 162 to the "on" position. At step 11, the VIM 161 performs power-on functional self-checks, and sets the initial conditions for one or more relays and safety sensors. For example, VIM 161 may set to "enable" a Kill Relay configured to provide a kill engine signal to the engine. Simultaneously, the VIM 161 may set to "disable" a Start Relay to avoid prematurely powering a starter motor of the engine before the VIM 161 determines that all required relays are present and functional in accordance with Step 12.

If the VIM 161 determines that not all required relays are present or functional, then a latch fault condition occurs, which sets in motion a signal from the VIM 161 to power off vehicle systems, as shown at Steps 13, 14a, and 15a. If the VIM 161 instead determines that all required relays are present and functional, then at Step 16 the VIM 161 detects whether all required modules are present and functional.

If the VIM 161 detects that not all required modules are present and functional at Step 17, then at Step 18 the VIM 161 is programmed to wait a predetermined period of time to allow all of the modules to start communicating with the VIM 161 over the CAN Bus 160. At Step 14b, the VIM 161 confirms the key switch 162 is still in the on position, and if not, the VIM 161 may provide an active low (GND) signal to power off vehicle systems, as shown at Step 15b. If the VIM 161 confirms the key switch 162 is still in the "on" position at step 14b, then the VIM 161 may provide an active high signal, and restarts the module detection Step 16.

If the VIM 161 detects that all modules are present and functional at step 17, the communication system is allowed to enter a "running" mode at step 19. Then, at Step 20, the VIM 161 determines the status of the safety interlock system. The safety interlock system may include one or more sensors, such as any of the sensors described above including a neutral sensor, brake sensor, operator seat sensor, and power take-off sensor. (It should be noted that some of these "sensors" may be simple switches.) The VIM 161 may be configured to detect a fault condition with respect to any signal provided to the VIM 161 from any one or more of these sensors. At Step 20, if the VIM 161 determines that the signal from one or more of these sensors is indicative of an unsafe condition, then at Step 21 the VIM 161 sets the vehicle safety status to "Kill Engine," and at Step 22 the VIM 161 enables the Kill Engine relay while disabling the Start Relay. At Step 14c, the VIM 161 provides an active low (GND) signal regardless of whether the position of the key switch 162 is set to "on" to power off vehicle systems, as shown at Step 15c.

If at Step 20 the VIM 161 determines that the signal from one or more of these sensors is indicative of a safe condition, then at Step 23 the VIM 161 is configured to process safe state requests from other vehicle modules. At Step 24, the VIM 161 evaluates the most severe requested safe state from the other modules, and if the VIM 161 receives a signal corresponding to an Engine Kill state or a Force to Neutral state, then at Step 25, the VIM 161 sets the safety status to the requested state, and enables the Kill Relay while disabling the Start Relay and provides an active low (GND) signal to power off vehicle systems, as shown in Step 15c.

If at Step 24 the VIM 161 receives no Engine Kill signal or Force to Neutral signal from any of the other modules, then at Step 26 the VIM 161 disables the Kill Relay and sets the safety status to "OK." At Step 27, the VIM 161 confirms whether it is configured to receive virtual operator input, and if yes, then at Step 28 the VIM 161 processes and transmits position commands to the electric actuator(s) 173L, 173R. If no, then at Step 29 the VIM 161 determines whether the transaxles 194L, 194R are in a neutral position.

If at Step 29 the VIM 161 determines that one or both of the transaxles 194L, 194R are not in a neutral position, the VIM 161 at Step 31 disables the Start Relay and provides an active low (GND) signal to power off vehicle systems, as shown in Step 15c.

If both of the transaxles 194L, 194R are determined by the VIM 161 to be in a neutral position, then at Step 30 the VIM 161 enables the start relay and provides an active high signal to enable power from the battery 175 to be directed to the engine starter motor to start the engine 191, assuming the key switch 162 remains in the "on" position. Apart from mechanical engine failure, the engine 191 will remain running until the key switch 162 is turned to the "off" position or until the VIM 161 enables the Kill Relay and thereafter provides an active low (GND) signal upon determination of a fault condition.

Figure 18:
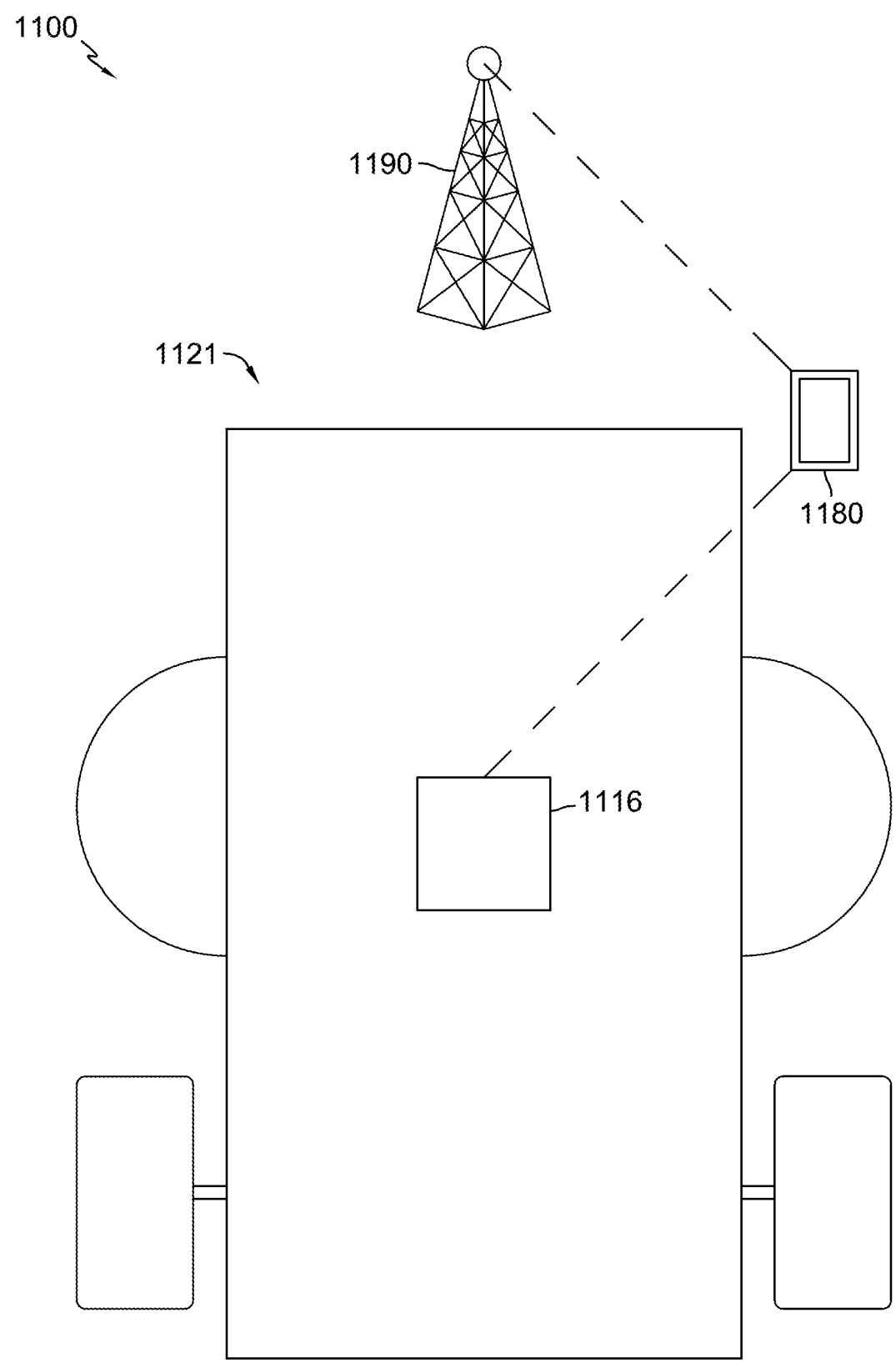
FIG. 18 is a schematic representation of an illustrative embodiment of a vehicle communication system including a remote programming device.

Turning now to FIG. 18 there is shown an embodiment of a vehicle communication system 1100 including a remote programming device 1180 for use with communicating with a utility vehicle, such as a mowing vehicle. The remote programming device 1180 wirelessly communicates with one or more onboard controllers 1116 of a mowing vehicle 1121. The remote programming device 1180 can additionally be in electronic communication with one or more communication outlets, such as cellular towers 1190, internet service providers, etc. as will be discussed herein.

Figure 19:
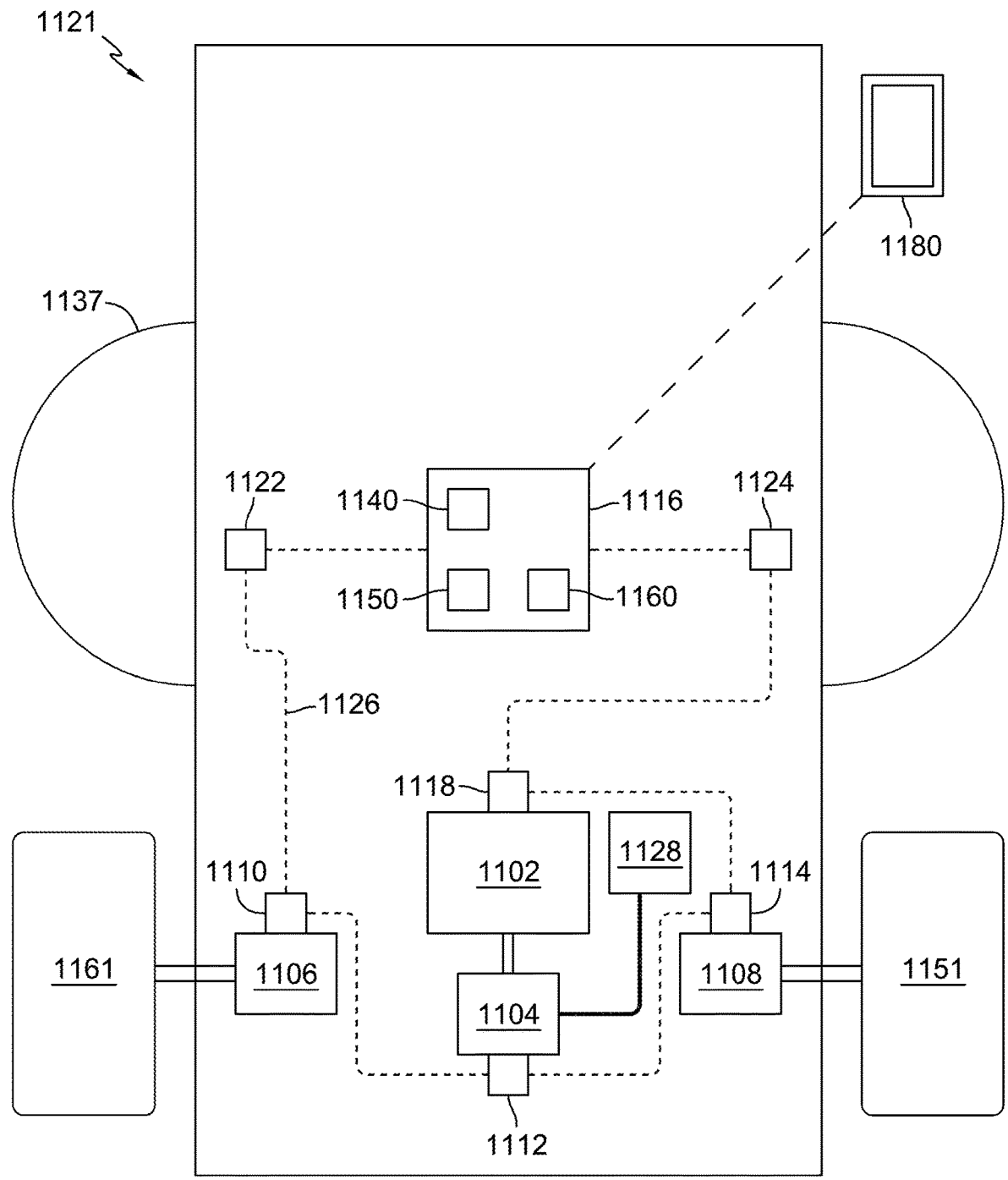
FIG. 19 is a schematic representation of an illustrative embodiment of a hybrid lawnmower in communication with a remote programming device.

Referring now to FIG. 19, the mowing vehicle 1121 includes an internal combustion engine 1102. The internal combustion engine 1102 can drive a generator 1104 which can be structured to provide electricity to one or more traction motors 1106, 1108 which drive one or more traction wheels 1161, 1151. The generator 1104 further provides electricity to a battery 1128 which, in some forms, can directly power the traction motors 1106, 1108.

As illustrated, a left hand drive traction motor 1106 powers left hand traction wheel 1161 and a right hand drive traction motor 1108 provides power to a right hand traction wheel 1151. The vehicle 1121 can include a power take-off (PTO) 1137 such as a mower deck which includes a plurality of grass cutting blades.

Utility vehicle 1121 is illustrated as a hybrid-type lawnmower driven via traction motors 1106, 1108 and generator 1104. However, vehicle 1121 can be powered by various drive means including, but not limited to an electric only drive or mechanical only drive. The vehicle 1121 can take various forms, including but not limited to utility vehicles such as a zero-turn mower, a utility terrain vehicle, a rice planter or harvester, a golf cart, or any other vehicle in which it may be desirable to integrate various controllers which can be programmed by a remote programming device 1180.

The generator 1104 and the traction motors 1106, 1108 are electro-mechanical devices that convert mechanical to electrical energy, as is the case with generator 1104, or electrical to mechanical energy, as is the case with traction motors 1106, 1108. In one specific form, the traction motors 1106, 1108 and the generator 1104 are brushless DC permanent magnet motors. However, any electro-mechanical device is contemplated including, but not limited to brushed DC motors, asynchronous motors, or synchronous motors. The PTO 1137 can be directly driven by the internal combustion engine 1102 or can be driven by an electric motor, depending on the specific application.

The vehicle 1121 additionally includes a plurality of digital controllers. The motors 1106, 1108 are in electronic communication with motor controllers 1110, and 1114 respectively. The motor controllers 1110, 1114 can control the speed, direction, and the like of the motors 1106, 1108. The motor controllers 1110, 1114 can additionally receive feedback from the motors 1106, 1108 such as motor temperature, motor revolutions per minute, and the like.

The generator 1104 is controlled by a generator controller 1112. The generator controller 1112 can control various functions of the generator 1104, including but not limited to generator loading and power output and can additionally provide feedback from the generator 1104 such as current, temperature, voltage, and the like. An internal combustion engine controller 1118 can control various aspects of the internal combustion engine 1102 including fuel injection, timing and the like. Additionally, the internal combustion engine controller 1118 can provide feedback with regard to the operational conditions of the internal combustion engine 1102 such as engine speed, engine load, engine temperature, and/or various engine fault conditions. As illustrated, a left drive speed controller 1122 communicates speed and direction requests to the left motor controller 1110 and a right drive speed controller 1124 communicates speed and direction requests to the right motor controller 1114. Vehicle ground drive speed and direction requests may be received from the operator via the operator's movement of an input device, such as a joystick (e.g., joystick 450 described above) or a lap bar (described below). One or more sensors may be configured to detect the operator's movement of these devices, which movement may be interpreted from the sensor data output by the sensors by a controller, such as a central controller 1116 and more fully described below.

A central controller 1116 is illustrated in electronic communication with the various digital controllers. As can be understood by one of ordinary skill, the central controller 1116 and digital controllers can be placed in electronic communication in various ways. For example, the illustrated central controller 1116 and the digital controllers are connected in series via a bus 1126 whereby each controller can communicate with each of the other controllers as well as the central controller 1116. However, it is contemplated that any means may be utilized wherein one or more of the digital controllers are placed in electronic communication with the central controller 1116.

Additionally, the central controller 1116 can receive a plurality of analog inputs from various sensors (not shown) such as an operator presence sensor, a parking brake engagement state sensor, a PTO engagement state sensor, and a vehicle neutral engagement state sensor. The aforementioned controllers and analog sensors can not only sense and/or determine operating conditions of the components of the mowing vehicle 1121 but can also sense and/or determine operational conditions of the lawnmower (e.g. speed, vehicle incline, turn angle, and the like).

The central controller 1116 can include one or more microprocessors and various modules to perform the desired functions of central controller 1116. As illustrated, the central controller 1116 includes a communication module 1140, a GPS module 1160, and a system health/diagnostic module 1150.

In an alternate form, the traction wheels of the vehicle 1121 are powered by the internal combustion engine 1102 via a hydrostatic transmission (not shown). This hydrostatic transmission is in part controlled by an electronic servo controller which controls electronically operated valves within the transmission. The output speed of the hydrostatic transmission is varied by a swash plate which can be controlled by an electric motor through the servo controller. In this form, the remote programming device 1180 can wirelessly interface with the electronic servo controller.

Although the remote programming device 1180 is illustrated as solely communicating with the central controller 1116 which transfers information to/from the bus 1126, it is contemplated that the programming device 1180 can communicate wirelessly with any controller onboard vehicle 1121 designed to receive wireless signals, such as a safety module. This wireless connectivity can be integrated into the boards of the one or more controllers of the vehicle 1121. Additionally, the controllers of the vehicle 1121 may be set up as a distributed system whereby no central controller 1116 is present. In such a configuration, one or more of the controllers can wirelessly communicate with the programming device 1180 and can then communicate with one or more of the other controllers on the vehicle 1121. Any controller configuration whereby at least one controller is configured to send feedback from the controller(s) to the remote programming device 1180 and receive input from the remote programming device 1180 is contemplated herein.

Although specific digital and/or analog controllers and processors are discussed, any number and type of digital controllers, analog controllers, analog sensors, and/or processors can be incorporated into the vehicle 1121, depending on the desired vehicle configuration. In certain embodiments, the controllers can form a portion of a processing subsystem including one or more computing devices having memory, processing, and communication hardware. The controllers may either be a single integrated device or a distributed device having modules which communicate unilaterally or bilaterally with other modules. The functions of the controller may be performed by hardware and/or software. In various forms, the controllers may also include AC/DC converters, analog/digital converters, rectifiers, or the like.

Figure 20:
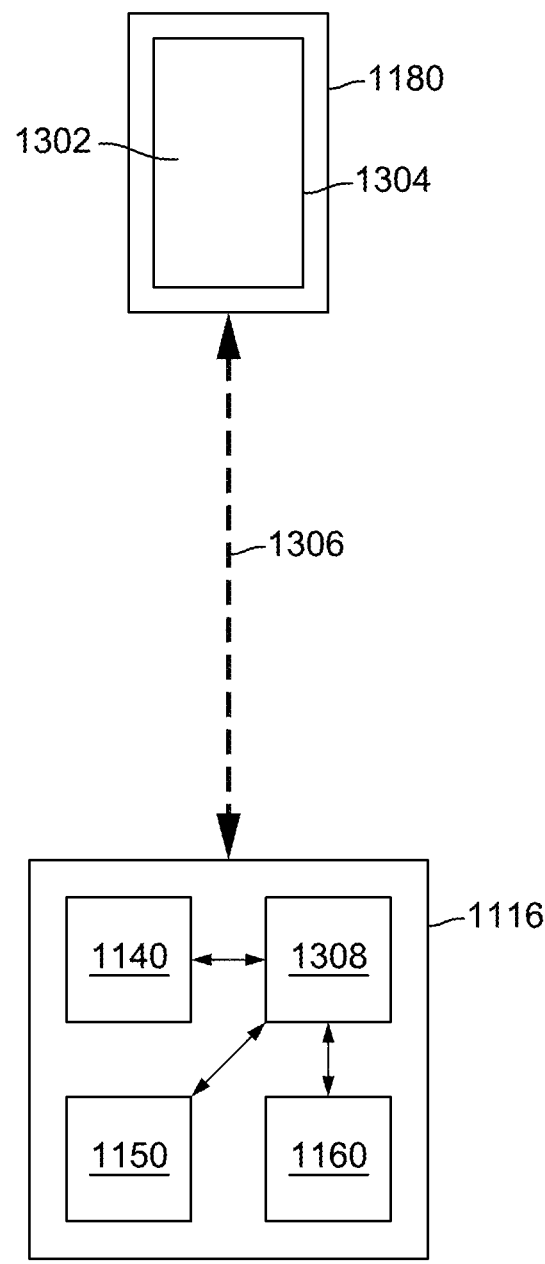
FIG. 20 is a schematic illustration of a communication system for communicating between a remote programming device and a central controller of a lawnmower.

FIG. 20 depicts a schematic illustration of a remote programming device 1180 in wireless communication with a controller 1116. This wireless interface between the remote programming device 1180 and the controller 1116 of the vehicle 1121 permits bilateral communication of information between the programming device 1180 and the one or more controllers of the vehicle 1121. For example, the remote programming device 1180 can receive information from the vehicle 1121, such as feedback from the various controllers on the vehicle 1121. The remote programming device 1180 can also send values and/or parameters to one or more of the controllers of the vehicle 1121.

The remote programming device 1180 includes a screen 1304, a processor (not shown), and a graphical user interface (GUI) 1302. The remote programming device 1180 also includes an input device such as a keypad (not shown), or screen 1304 may be a touchscreen. In a preferred form, the remote programming device 1180 is a smartphone equipped with a Bluetooth transmission module. Alternately, the remote programming device 1180 can take other forms, such as a tablet, laptop, or any other device with wireless communication abilities.

The remote programming device 1180 communicates over a wireless connection 1306 with the one or more controllers 1116. In one form, the wireless connection 1306 is a Bluetooth connection. However, it is contemplated that various wireless connection types can be utilized which may operate over various frequencies, utilize various protocols, or the like. For example, Z-wave, ZigBee, Apple Communications, and near field communication are all contemplated as possible wireless connections 1306. Alternately, the programming device 1180 may communicate indirectly with the controller 1116 through, for example, a wireless internet connection or cellular tower.

As discussed above, the remote programming device 1180 bilaterally communicates with one or more controllers 1116 of the vehicle 1121. In an exemplary form, the controller 1116 includes a processor 1308, a communication module 1140, a GPS module 1160, and a system health module 1150. These various processors and modules can be integrated or distributed within the system. For example, the GPS module 1160 can be located on the vehicle 1121 remote from the controller 1116 or can be integrated into the controller 1116. The communication module 1140 can take various forms such that bilateral communication with the remote programming device 1180 is facilitated.

The graphical user interface (GUI) 1302 of the remote programming device 1180 permits a user, technician, or the like to wirelessly send and receive data from the controller 1116. In one form, the graphical user interface 1302 is an application that can be downloaded from, for example, the Apple App Store or Google Play. The GUI 1302 can include various intuitive icons and diagrams such that even a novice user can easily understand how to interpret and control various parameters of the vehicle 1121.

The bilateral communication between the remote programming device 1180 and the controller 1116 enables a user, technician, or the like to perform an initial vehicle setup and/or program an initial operation of the vehicle 1121, change or update one or more controllers or display other vehicle settings after initial setup, diagnose and troubleshoot issues with one or more systems of the vehicle 1121, and expedite and/or enable repair of the vehicle. During an initial setup, various operational and control parameters of the vehicle 1121 are communicated to the controller 1116 via the remote programming device 1180.

The initial setup allows the user to program the operational parameters of the vehicle 1121. By way of example, the initial setup of a zero-turn hybrid mower will now be described. In a preferred form, this initial setup can take place prior to delivery to an end user.

A technician at a manufacturing facility can enter a programming mode of the application of the remote programming device 1180. The remote programming device 1180 can ask for "input from left lap bar." The user can then move the left lap bar thereby programming which lap bar is left. It is important to note that, from the factory, many mowers are not programmed on the assembly line to identify left and right, since the left lap bar accelerator, right lap bar accelerator, left motor, and right motor may be identical components merely placed in opposite locations.

Once the left lap bar has been designated, the remote programming device 1180 can request "move left lap bar forward" in response to which the motor controller can identify the left motor as well as the forward direction for the left motor. This process can then be repeated to program the right lap bar and motor, or alternately, the system can self-program based upon the "left" inputs.

Further, the remote programming device 1180 can request "left lap bar forward" then "left lap bar backward" to determine the zero position of the lap bar. This process can then be repeated to zero the right lap bar. The remote programming device can also allow a technician to calibrate and/or program the vehicle top speed and/or ensure that the left motor and the right motor both operate at the same speed in response to an equidistant movement of both lap bars in a forward and/or reverse direction.

Additionally, an end user may be able to program certain aspects of vehicle 1121 functionality. For example, an end user who is a novice can program a lower top speed than what was initially set. Alternately, an end user may be able to set predetermined angles at which the vehicle 1121 will not operate to prevent the device from operating at an unsafe angle on a hill.

The vehicle may also utilize GPS data from the GPS module 1160 to set parameters. For example, should the GPS determine the mower is in West Virginia, and in hilly or rocky terrain, a "hill safe mode" may be initiated and/or a lower top speed allowed. On the other hand, if the GPS determines the mower is in a flat part of Kansas, a "flat terrain mode" may be entered and a greater top speed may be allowed.

Although the GPS module is illustrated as being integrated into the controller 1116 of the vehicle 1121, it is contemplated that the GPS can be located within the remote programming device 1180, as is the case with most smartphones. In this case, GPS data and programming characteristics derived therefrom can be sent to the controller 1116.

The remote programming device 1180 can also facilitate diagnostics and troubleshooting operations. For example, if a vehicle 1121 problem is detected, a user and/or technician can access a diagnostic screen of the remote programming device 1180. This screen can report such things as "overheat condition in left motor", "over-speed condition in generator", or "communication failure with right motor", among various fault conditions. Those component conditions which could trigger faults are communicated from the various controllers as was previously discussed with regard to the individual system components (e.g. the motor controller sends voltage, temperature, and speed signals). Should a fault occur with regard to software, the remote programming device 1180 can detect the fault and update the software or otherwise correct the software fault.

The remote programming device 1180 can allow for ease of preventive maintenance as well as ease of access to vehicle information. For example, the remote programming device can signal "200 hours has been reached, change oil in internal combustion engine" or "it has been six months since the last vehicle service." The remote programming device can also display service information such as how frequently to change the oil, replace the spark plugs, service the motors, or the like.

The remote programming device 1180 also facilitates repair of a component once a problem has been diagnosed.

In some forms, should a fault be detected, the GUI 1302 can provide a link to the service website which may include instructions or videos on how to repair the issue such that the fault condition is resolved. Additionally, the fault screen can specify the exact parts and/or part numbers which should be ordered to complete the repair, the location of the nearest dealer, and/or contact information for a certified service technician.

Although various setup, diagnostic, and repair examples have been discussed, it is contemplated that any parameters, data, or the like may be desired to be transferred to/from the controller 1116 to/from the remote programming device 1180 depending upon the specific application, the vehicle 1121 type, and the desired user access to the vehicle 1121 functionality as would be understood by one of ordinary skill.

In various forms, the access to functionality of the remote programming device 1180 can be user specific. For example, an end user may be able to select from various drive profiles which would vary vehicle operation. However, an end user may be prevented from setting the voltage of a given motor. However, a technician may be able to perform a full vehicle setup, change various vehicle parameters and the like. An authorized dealer may be granted full access such that any parameter may be changed. These levels of functionality can be controlled through the application via, e.g. which version can be downloaded by entering/supplying a user code or the like.

Figure 21:
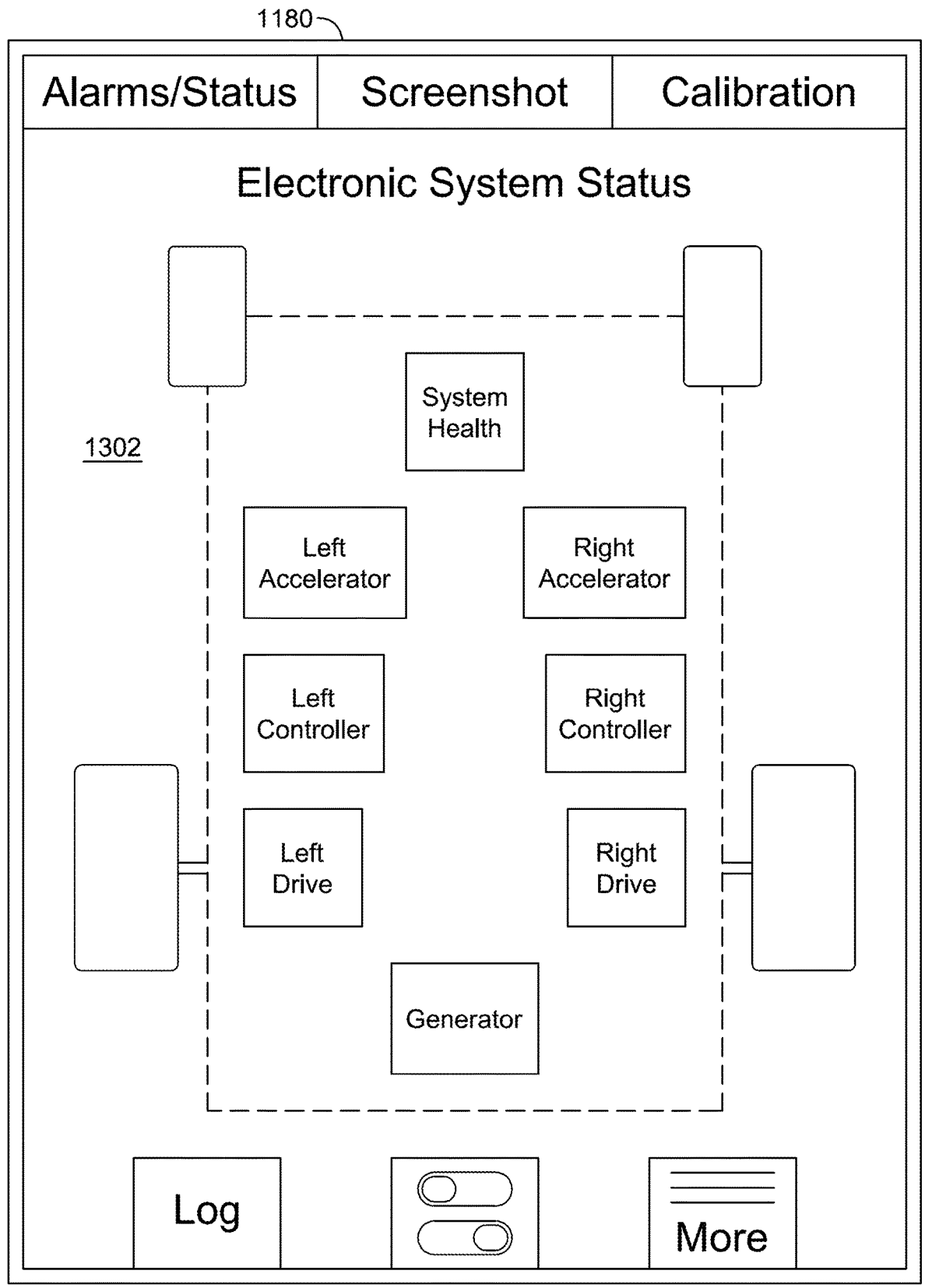

FIGS. 21-25 depict an exemplary GUI 1302. As illustrated, an alarm/status tab, a screenshot tab, a calibration tab, and a log tab, among others, can be included. FIG. 21 illustrates an Electronic System Status interface. A user can select one or more items (e.g. Left Accelerator, Right Accelerator, Left Controller, Right Controller, System Health, or the like) to receive information about these systems and/or to set up operational parameters for these systems.

Figure 22:
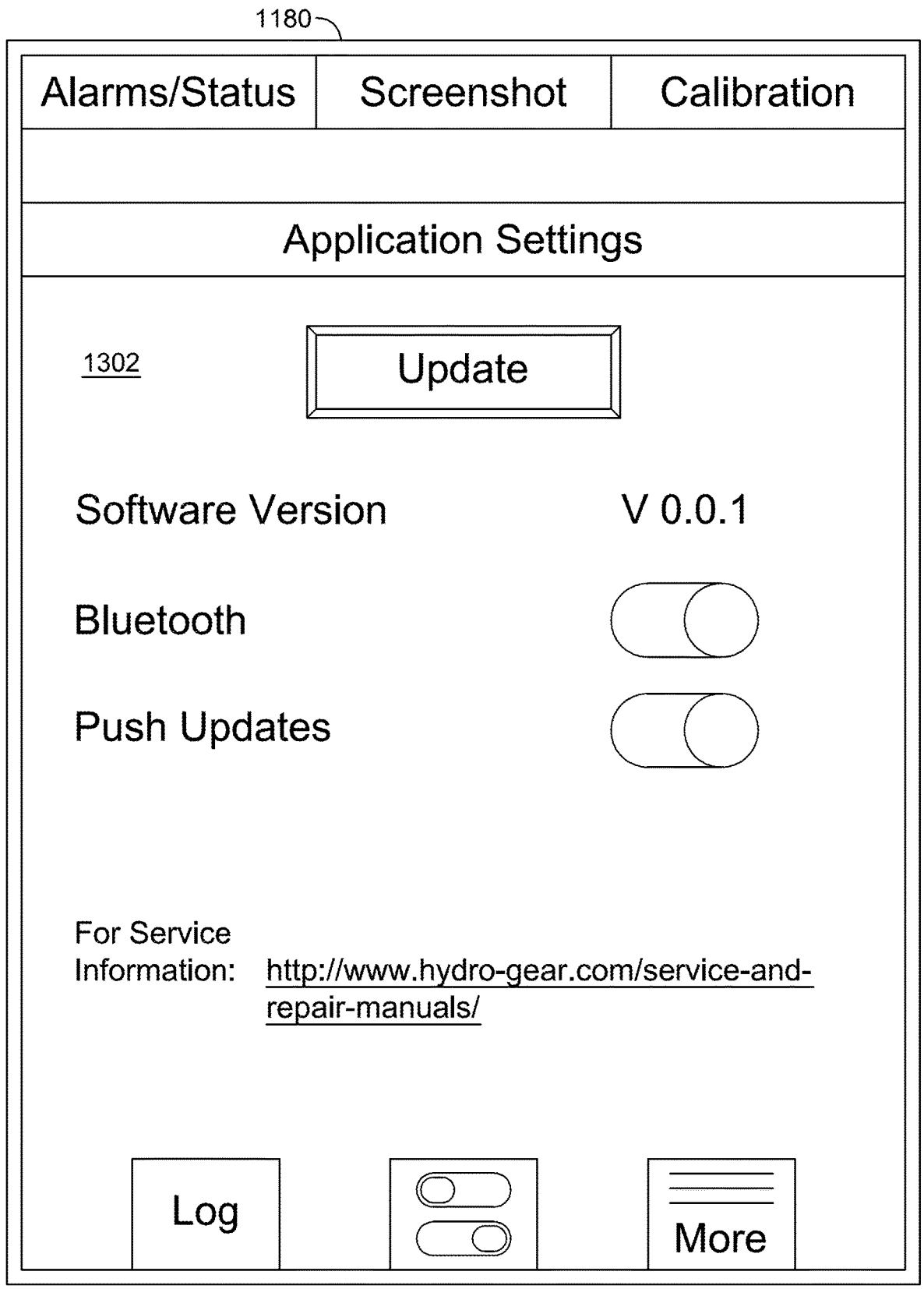

FIG. 22 illustrates an Application Settings screen, whereby a user may update the application, turn on/off the wireless communication from the remote programming device 1180, or push updates to the remote programming device and/or the vehicle 1121 controllers. As illustrated, various links for ease of use can be provided. For example, a link to service information is illustrated.

FIG. 23 illustrates a Calibration screen. This screen permits a user to either auto-calibrate or manually calibrate various system components such as the left accelerator, right accelerator, left feedback, and/or right feedback, among other components. Although exemplary voltage ranges are illustrated, i.e. 1-5 V, other voltage ranges may be utilized depending upon the specific application.

FIG. 24 illustrates a Fault Log. In this exemplary fault log, the fault date, fault severity level, system and/or component where the fault occurred, and description of the fault, are illustrated. For example, the Fault Log can illustrate that on Mar. 21, 2016 a critical fault occurred with regard to the right accelerator in that communication was lost with the right accelerator. During this fault state, if a user selected the right accelerator status, the screen of FIG. 25 would be displayed. The status screen can depict, for example, the part number of the specific component status being viewed, the fault (Status), a Description of the fault, and a Potential Cause of the fault.

Figure 26:
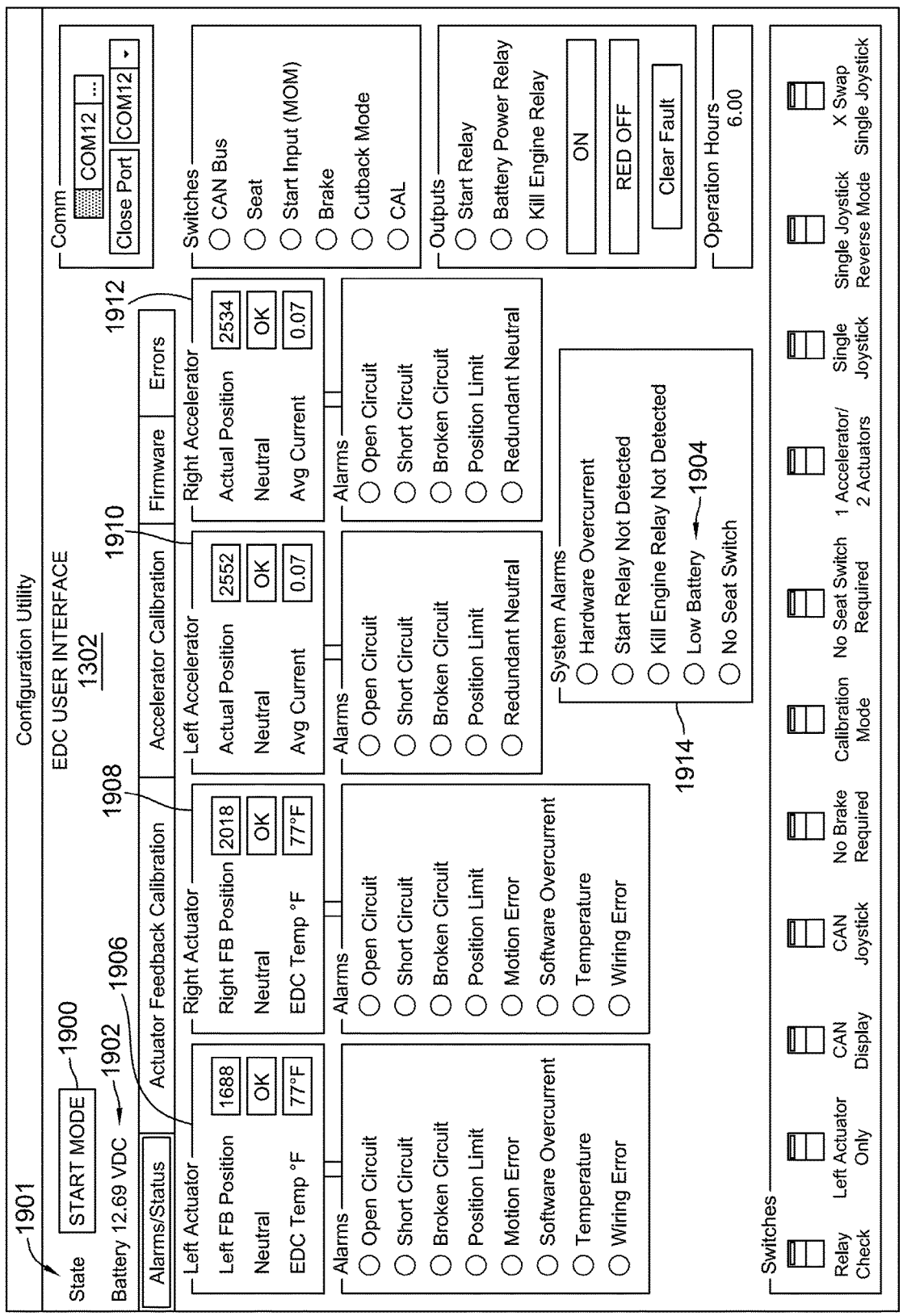

Another exemplary GUI 1302 for the remote programming device 1180 is illustrated in FIGS. 26-29 and 31-35. Referring now to FIGS. 26-29, the controller "State" indicator 1901 displays the current state/status/mode of the controller. The present state/status/mode of the controller, as illustrated in FIG. 26, is "Start Mode" 1900. Battery voltage display 1902 indicates the present battery voltage (12.69 VDC in this example) and, if voltage drops below a certain level, a "Low Battery" voltage indicator 1904 will be activated. For example, the "Low Battery" indicator 1904 can be triggered if a voltage bus connection drops to a certain level for a given time (e.g. 10.5 V for 50 ms or 9.5 V for 30 ms). The first column 1906 pertains to the status and alarms of the left electric actuator, such as electric actuator 173L. The second column 1908 pertains to the status and alarms of the right electric actuator, such as electric actuator 173R.

The third column 1910 illustrates the status and alarms of the left accelerator (e.g. LBSM 167L) or a left joystick. The fourth column 1912 displays the status and alarms of the right accelerator (e.g. LBSM 167R) or a right joystick. The "System Alarms" column 1914 pertains to the status and alarms for a specific vehicle control system.

Figure 27:
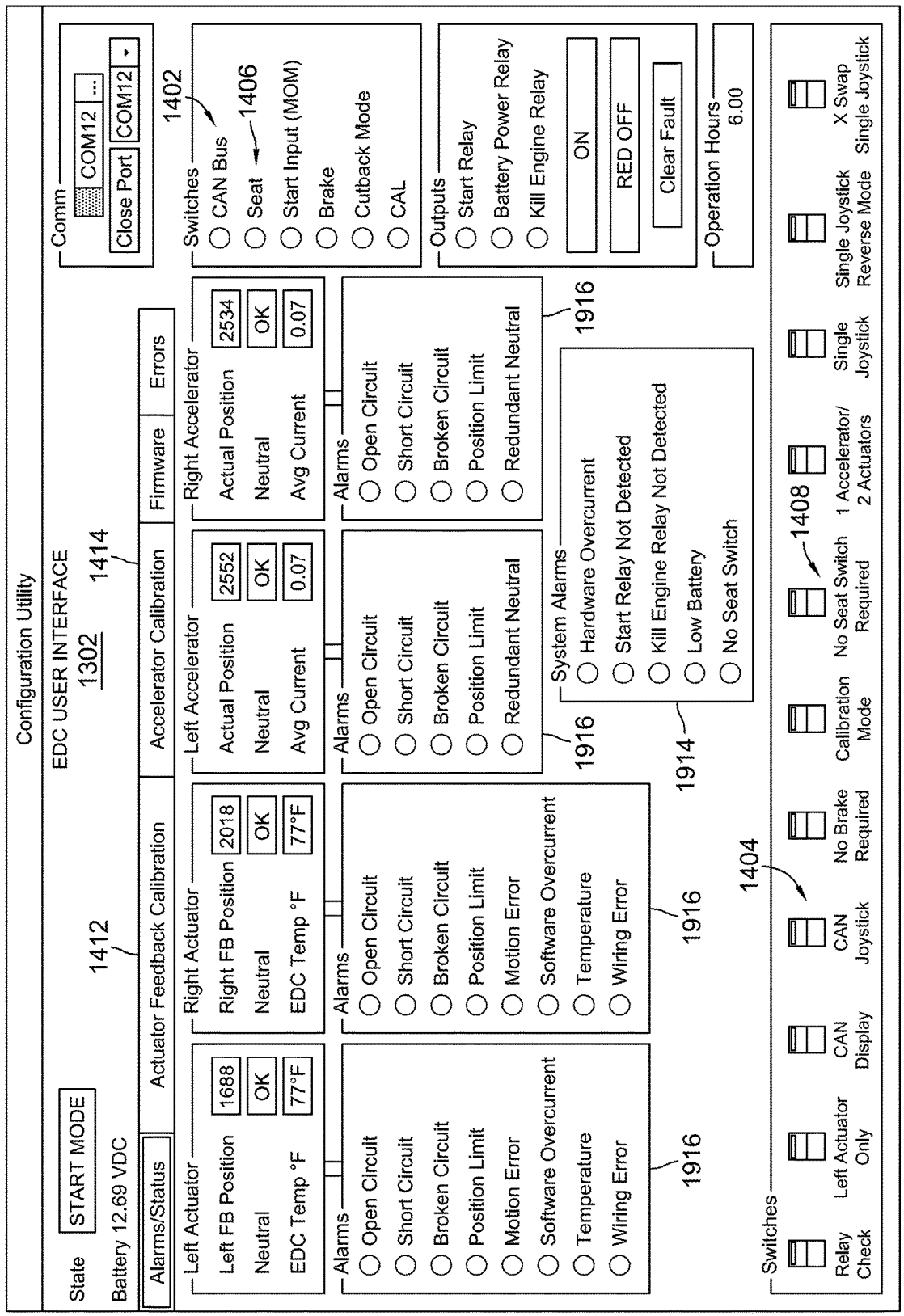

Referring now to FIG. 27, an illustrative description of various alarms 1916 will be given. An "Open Circuit" alarm can be triggered if a circuit is temporarily blocked. A "Short Circuit" alarm can indicate that a short circuit to high voltage has been reached (e.g. a voltage is sensed or determined as being above a threshold limit, for example 4.88 volts). A "Broken Circuit" alarm can indicate that voltage swings over a specified time limit exceed a desired limit. The "Position Limit" alarm can be triggered if the position of a left or right feedback sensor is outside of the limits specified in the "Actuator Feedback Calibration" tab 1412. A Position Limit alarm can additionally be triggered if a left or right accelerator position falls outside of the limits specified in the "Actuator Feedback Calibration" tab 1412.

A "Motion Error" alarm can be triggered if the position of an actuator does not reach the commanded position within a specified time period. A "Software Overcurrent" alarm can be triggered if the current is detected as exceeding a threshold for a given period of time. A "Wiring Error" alarm can be triggered if the software is in a diagnostic mode or calibration mode if a target position is not reached within a given period of time.

A "Temperature" alarm can be triggered if the temperature of a component exceeds a temperature limit threshold which can be specified in the "Accelerator Calibration" tab

1414. A Hardware Overcurrent alarm can be triggered if EDM hardware detects an overcurrent condition in one or more electrical conductors. "System Alarms" 1914 may include this Hardware Overcurrent alarm, a Start Relay Not Detected alarm, a Kill Engine Relay Not Detected alarm, Low Battery alarm 1904, and a No Seat Switch alarm. The Start Relay Not Detected alarm is triggered if there is no current through the coil of the start relay when current should be present (e.g. in start mode).

The Kill Engine Relay Not Detected alarm is triggered if there is no current detected through the coil of the kill engine relay when current should be present. The Low Battery alarm is triggered if the voltage drops below a given threshold. The No Seat Switch alarm can be triggered if a seat switch is not detected.

The "CAN Bus" indicator 1402 can be illuminated when the CAN Bus mode has been selected. The CAN Bus mode selection can be performed via the "CAN Joystick" button 1404 or via an external switch. The "Seat" switch indicator 1406 will be illuminated when the seat switch is on; however, this indicator can be overridden by selecting the "No Seat Switch Required" button 1408.

Figure 28:
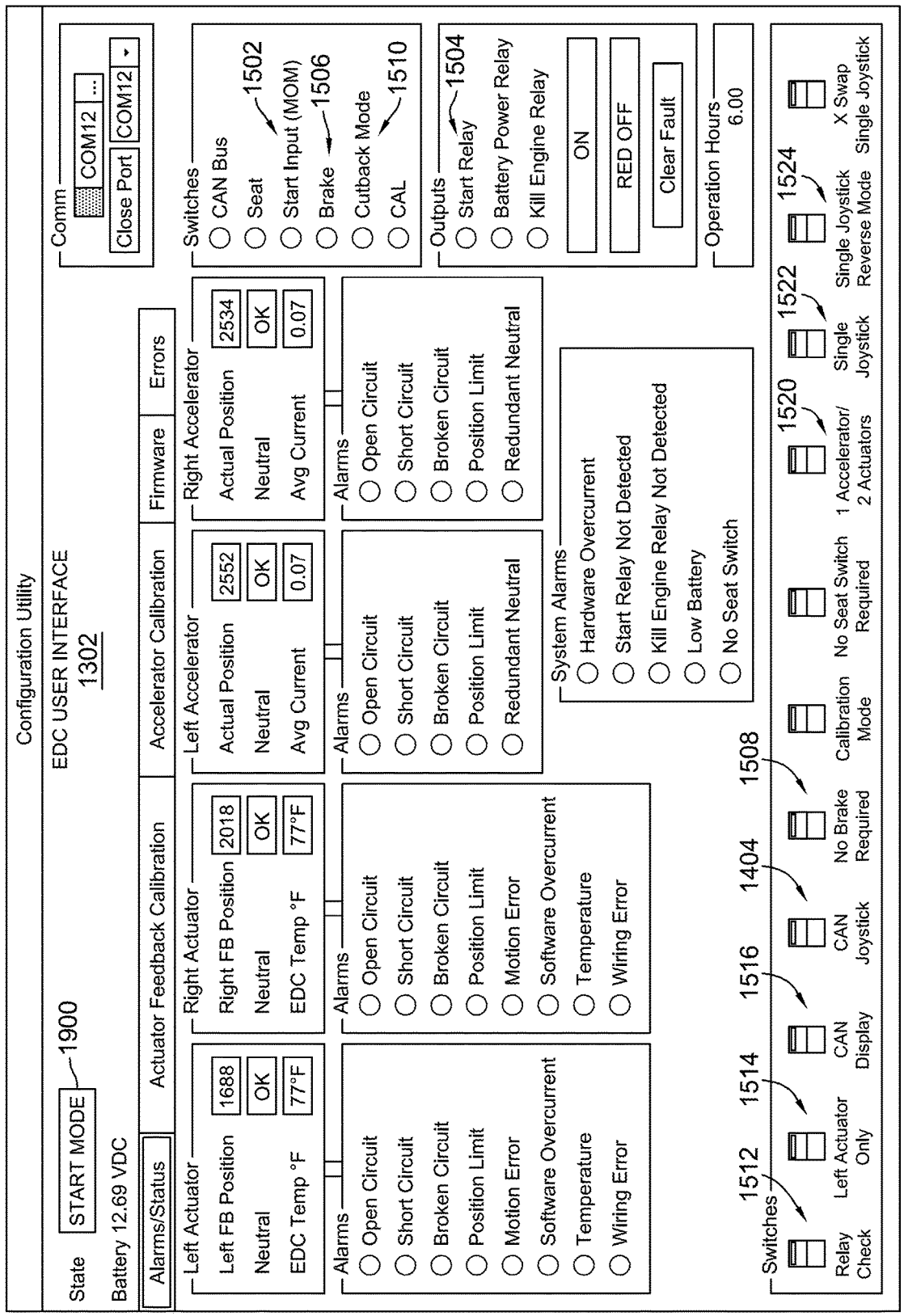

Referring now to FIG. 28, the "Start Input (MOM)" indicator 1502 can be illuminated when an operator moves the key to the "start" position. The controller "State" 1901 must be in "Start Mode" 1900 and the "Start Relay" indicator 1504 must be "on" to enter a "running mode." The "Brake" switch indicator 1506 will be illuminated when the brake switch is on. A user will not be able to go into "running mode" if the brake switch is not on unless this is overridden by selection of the "No Brake Required" button 1508.

The "Cutback Mode" switch indicator 1510 is illuminated when the "Cutback Mode" switch (not shown) is on. This switch reduces the stroke limit by a percentage of the FWD/REV limits of the electric actuators. The "Relay Check" button 1512 signals the system to check for the kill engine relay and the start engine relay. The "Left Actuator Only" relay button 1514 signals the system to run the left electric actuator only. The "CAN Display" button 1516 and the "CAN Joystick" button 1404 will tell the EDM to look at the CAN Bus line. The "One Accelerator/Two Actuators" button 1520 will force the system to only look at the left accelerator as the input to drive two separate electric actuators. Alternately, or as a selectable option, the "One Accelerator/Two Actuators" button 1520 can force the system to only look at the right accelerator as the input to drive two separate electric actuators.

The "Single Joystick" button 1522 will turn on a single multi-axis joystick algorithm. The "Single Joystick Reverse Mode" button 1524 will invert the reverse direction algorithm of the single multi-axis joystick. For example, instead of the front of the machine turning right in response to a user moving the joystick to the bottom right, the front of the machine will turn left.

Figure 29:
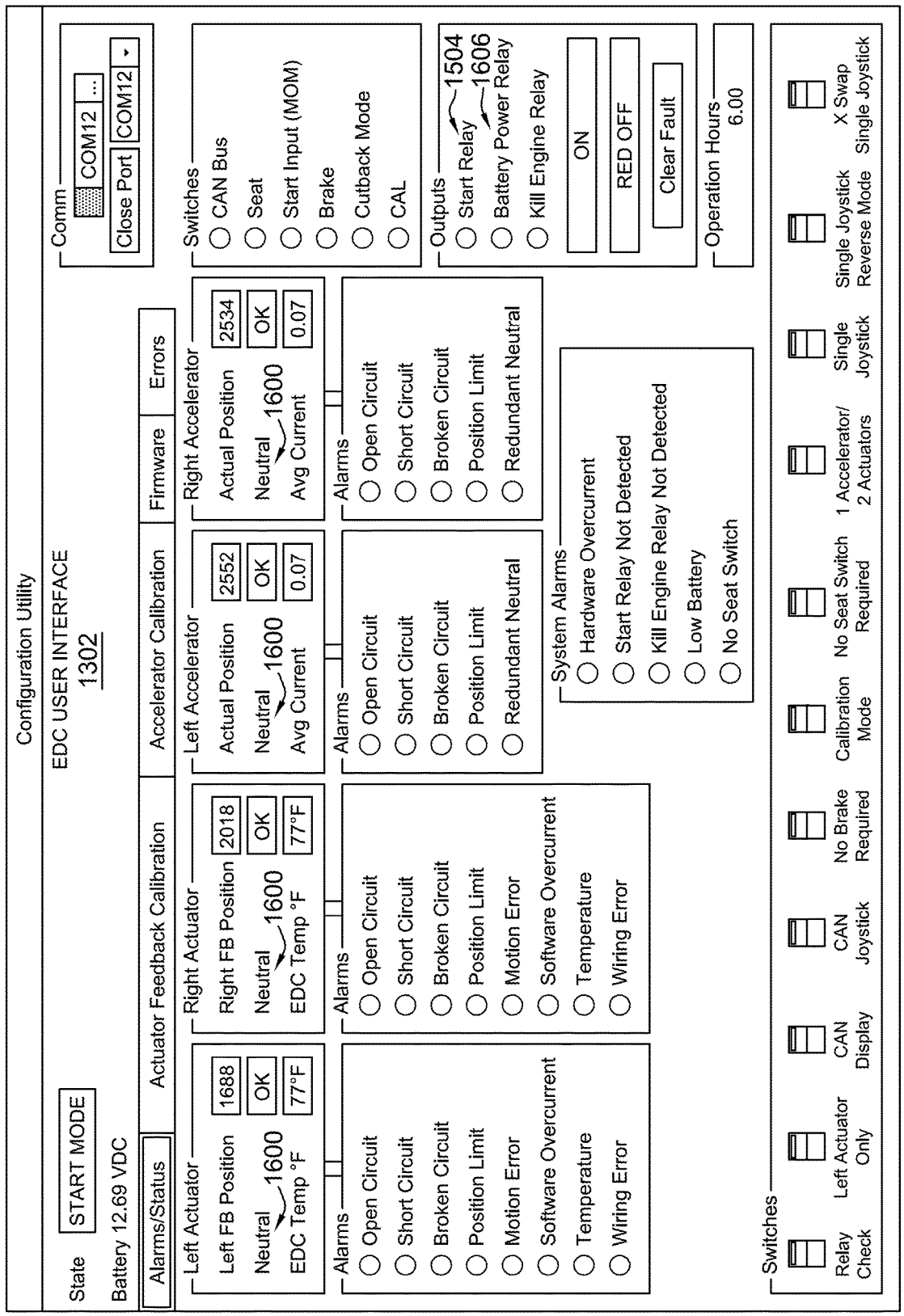

Referring now to FIG. 29, the "Start Relay" indicator 1504 can be lit after the diagnostic mode has finished and at the same time the state changes to "Start Mode" 1900. The "Start Relay" indicator 1504 will only be activated if all four "Neutral" indicators 1600 display "OK." The four Neutral indicators 1600 can additionally (or alternatively) display a color, e.g. green for "OK." The "Battery Power Relay" indicator 1606 can be illuminated as soon as the key switch is turned on.

Figure 30:
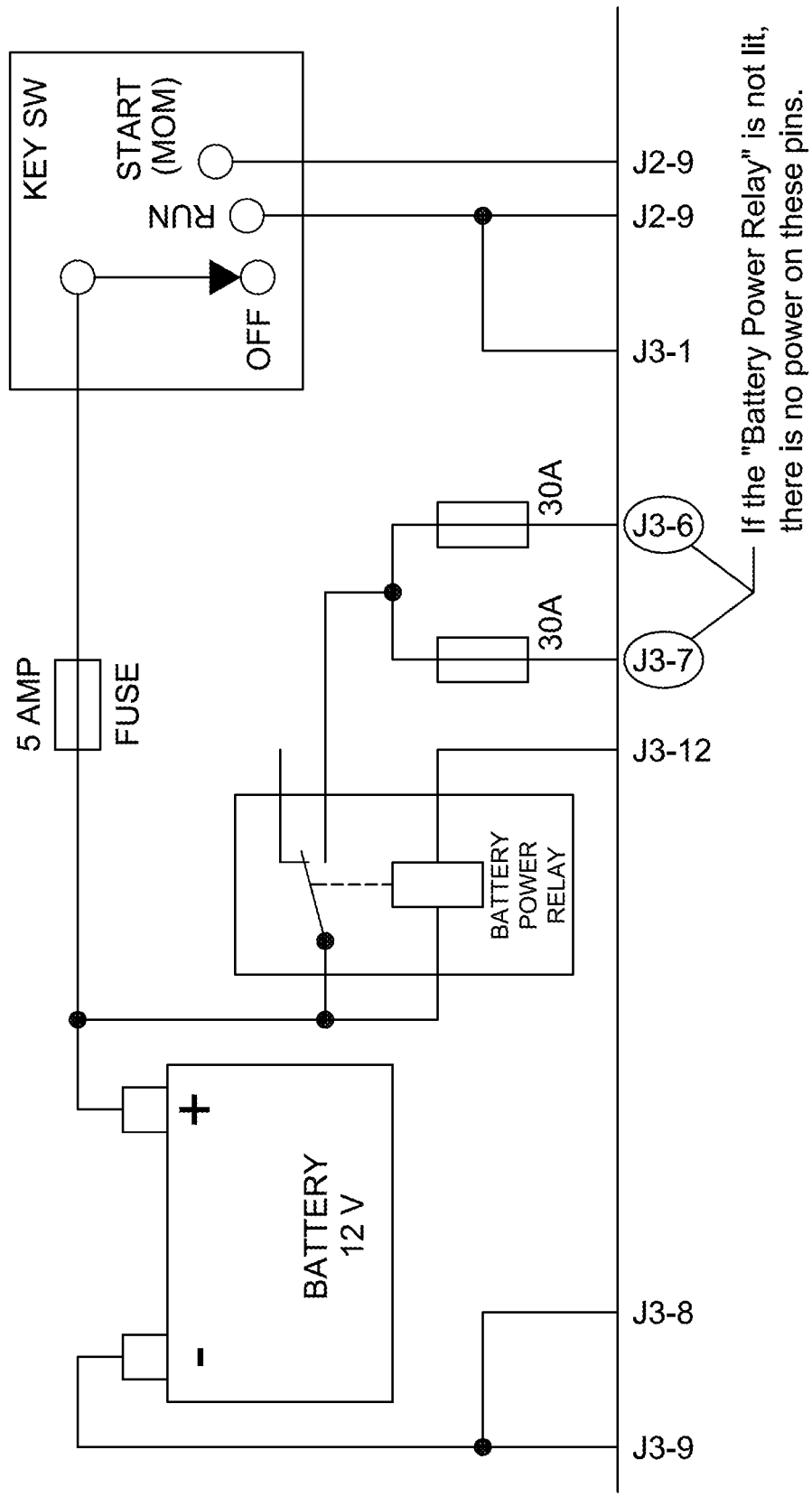
FIG. 30 is a schematic illustration of a block diagram of a battery power relay.
Figure 31:
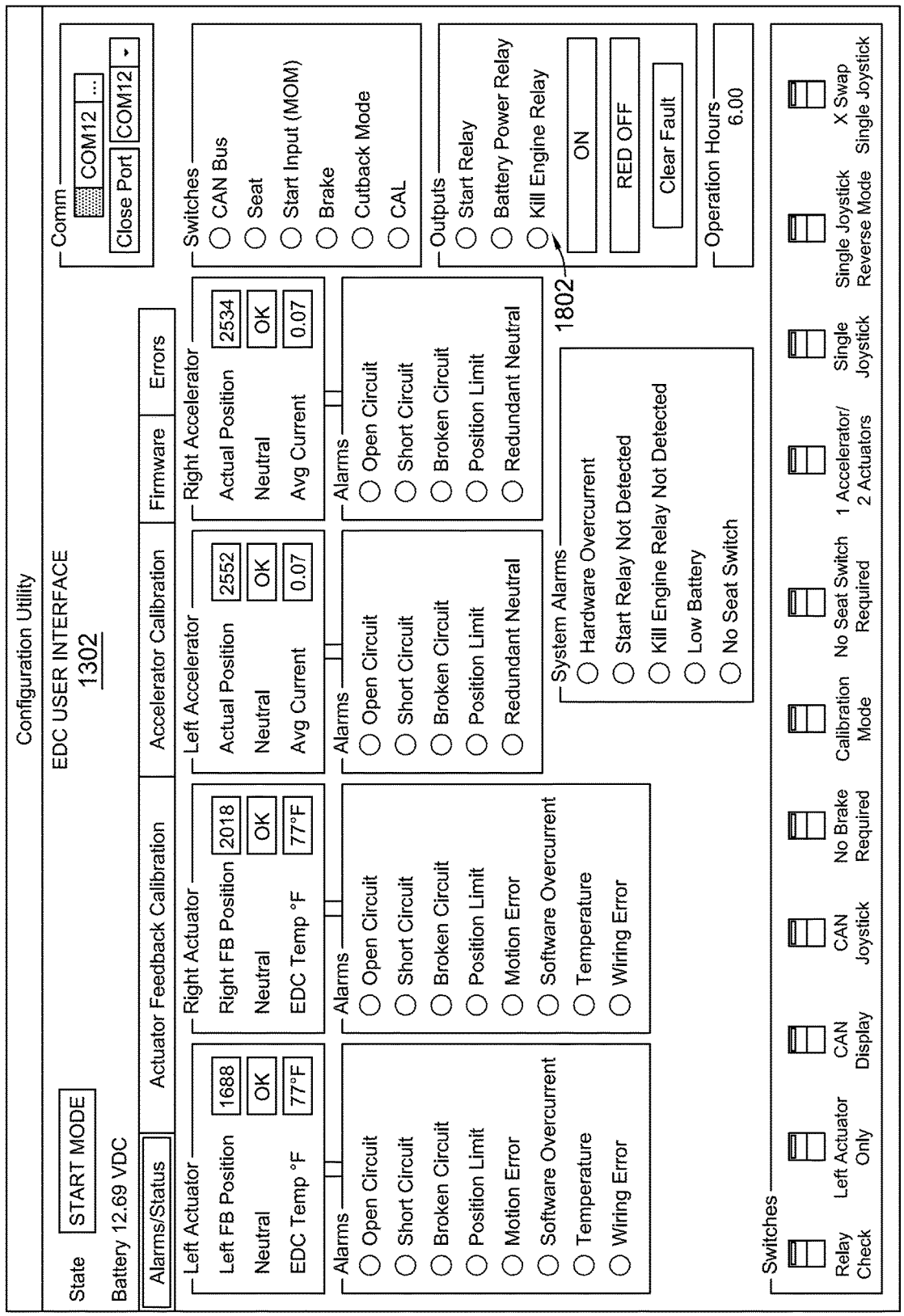

Referring now to FIG. 30, a block diagram of a battery power relay is illustrated. This diagram illustrates that if the "Battery Power Relay" indicator 1606 is not illuminated, pins J3-7 and J3-6 are not receiving power. Referring now to FIG. 31, the "Kill Engine Relay" indicator 1802 is lit as soon as there is an alarm that can be a safety concern to the operator. The "Kill Engine Relay" indicator 1802 could also be a master control button to shut off the vehicle's internal combustion engine 1102.

Figure 32:
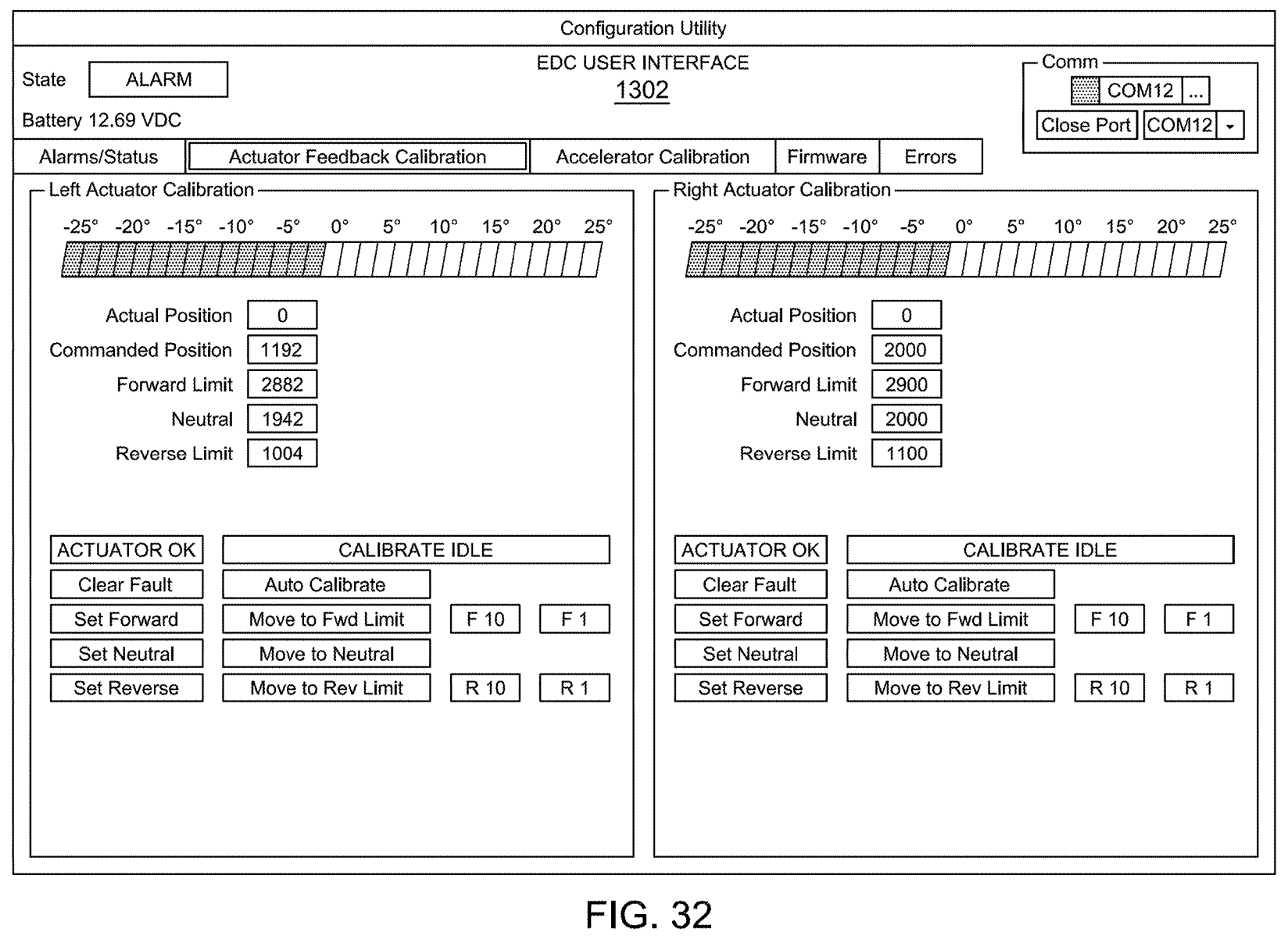
Figure 33:
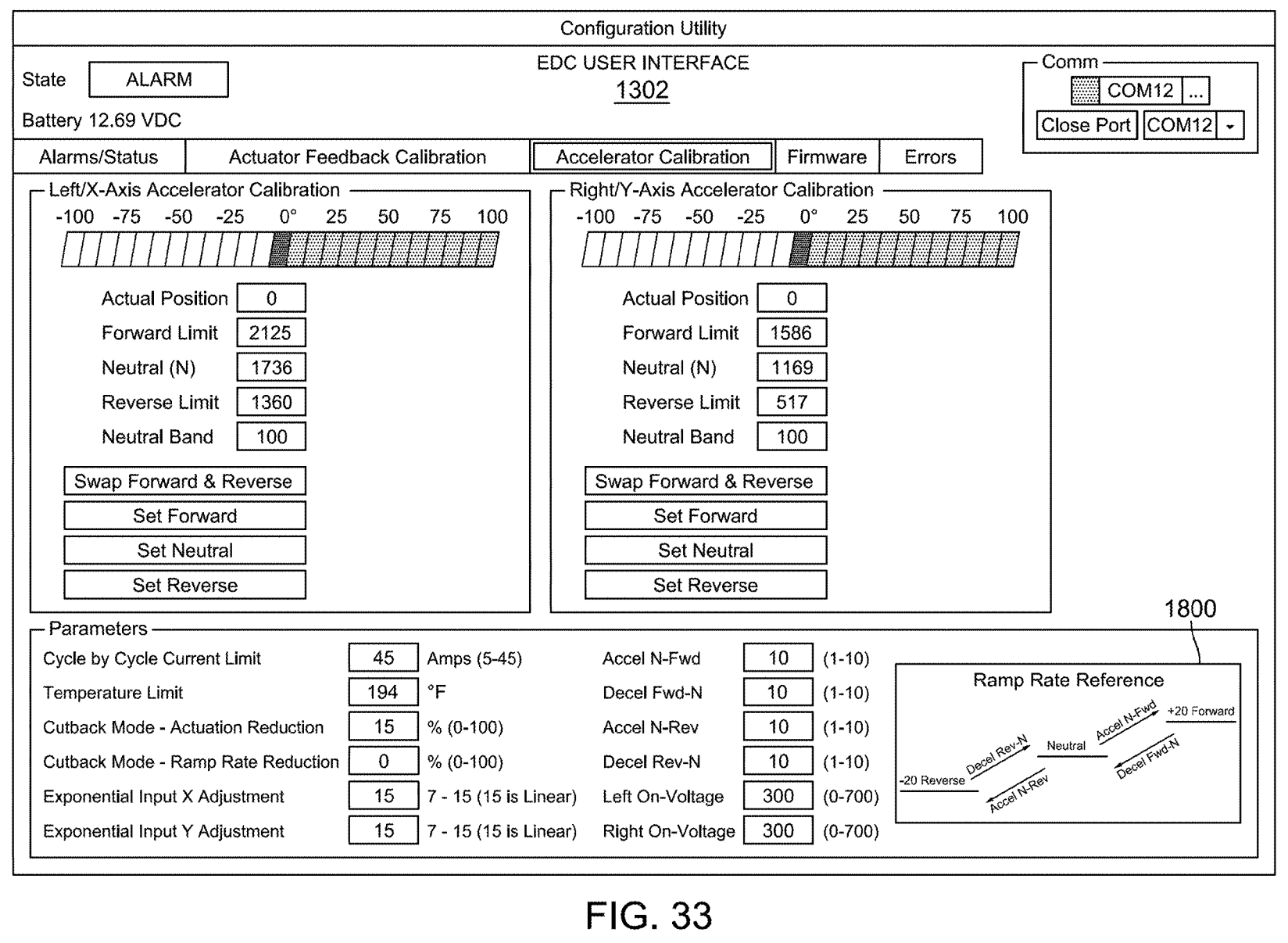
Figure 34:
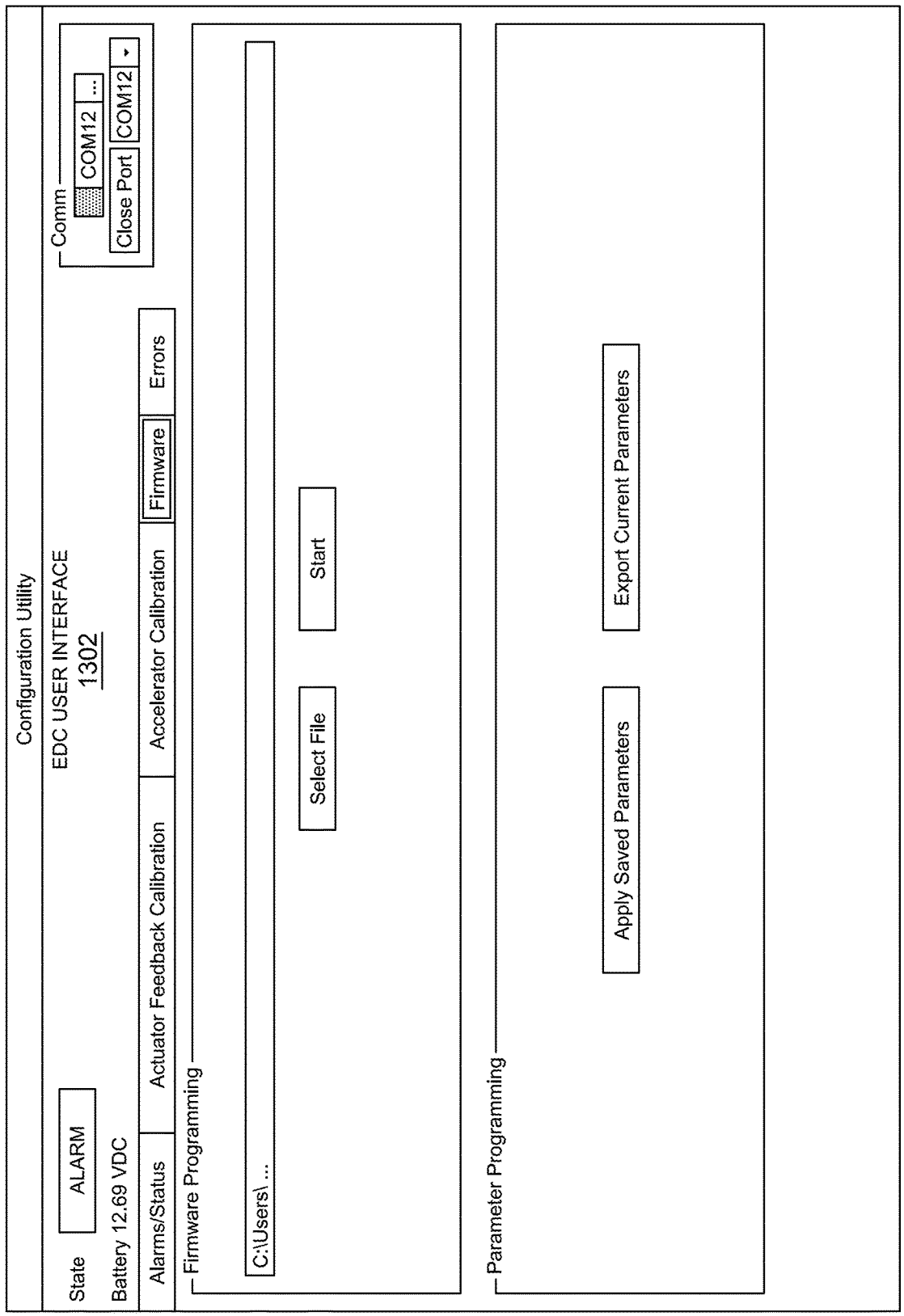
Figure 35:
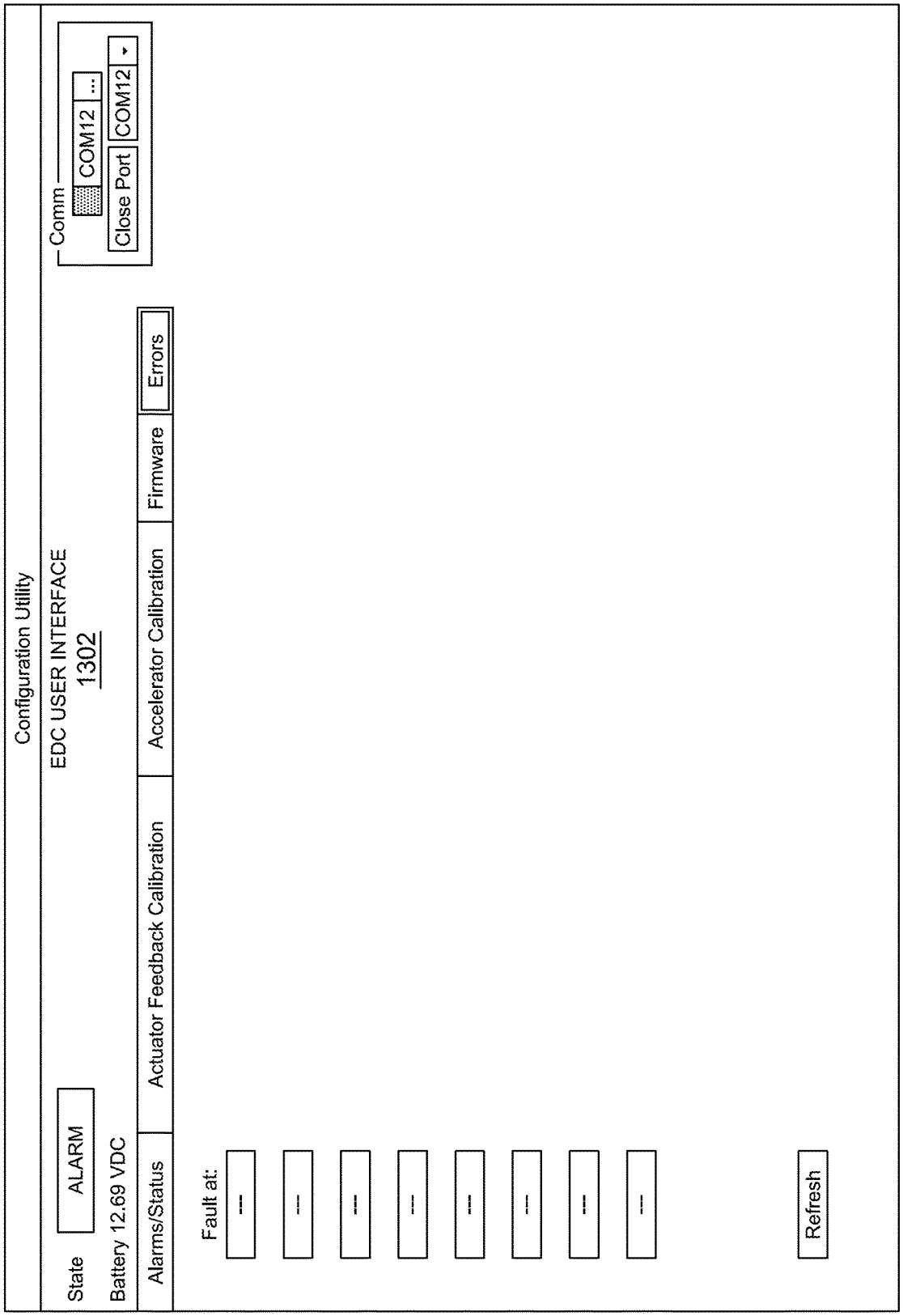

FIG. 32 illustrates an "Actuator Feedback Calibration" user interface/display. This interface is utilized to calibrate the electric actuator sensors. More specifically, this interface is utilized to set neutral, set a forward limit, set a reverse limit, and the like. The "Accelerator Calibration" user interface/display of FIG. 33 displays accelerator output and is utilized to calibrate neutral, a forward limit, a reverse limit, a neutral band, and a temperature limit. A "Ramp Rate Reference" graphic 1800 illustrates how acceleration rates are adjusted for four different directions (neutral to forward, forward to neutral, neutral to reverse, and reverse to neutral). The rate in the GUI 1302 can be accumulated at intervals, e.g. 10 ms, until it reaches the desired position. The "Acceleration Calibration" interface is further utilized to calibrate a cycle by cycle current limit, ramp rates, and single joystick only settings for exponential ramp rates. FIG. 34 is an exemplary screen used for installing new EDM firmware/software. FIG. 35 is an exemplary screen used for identifying system errors.

While the invention has been described in connection with what is presently considered to be the most practical and preferred embodiment, it is to be understood that the invention is not to be limited to the disclosed embodiment(s). Rather, the invention is intended to cover various modifications and equivalent arrangements included within the spirit and scope of the appended claims, which scope is to be accorded the broadest interpretation so as to encompass all such modifications and equivalent structures as permitted under the law. It should also be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow.

In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law.

Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

Having described the invention in detail with reference to certain preferred embodiments, it will be understood that modifications and variations exist within the scope and spirit of the present disclosure.

What is claimed is:

1. A utility vehicle with a drive and control system, the utility vehicle comprising:
a battery;
a CAN bus;
a plurality of sensor modules connected to the CAN bus;
a plurality of input relays configured to monitor operational parameters;
a kill switch configured to relay a kill signal; and
a vehicle integration module connected to the CAN bus, the plurality of input relays, and the kill switch, wherein the vehicle integration module is configured to:
upon initially receiving power from the battery, set the kill switch to an enabled state;
determine whether each of the plurality of input relays are in a respective present state;
in response to determining that one or more of the plurality of input relays is not in the respective present state, send a power-off signal;
in response to determining that each of the plurality of input relays is in the respective present state, determine whether each of the plurality of sensor modules is in a respective present-and-functional state after a predetermined period of time; and
in response to determining that each of the plurality of sensor modules is in the respective present-and-functional state, enter into a running mode during which movement of the utility vehicle is to start.

2. The utility vehicle of claim 1, further comprising a key switch, wherein the battery is configured to provide the power when the key switch is in an on-position.

3. The utility vehicle of claim 2, wherein, in response to determining that one or more of the plurality of sensor modules is not in the respective present-and-functional state for at least a predetermine period of time, the vehicle integration module is configured to determine whether the key switch is in the on position.

4. The utility vehicle of claim 3, wherein the vehicle integration module is configured to send the power-off signal in response to determining that the key switch is not in the on position.

5. The utility vehicle of claim 1, further comprising a motor and a start relay, wherein the battery is permitted to power the motor when the start relay is enabled.

6. The utility vehicle of claim 5, wherein the vehicle integration module is configured to disable the start relay upon initially receiving the power from the battery to avoid prematurely powering the motor before entering the running mode.

7. The utility vehicle of claim 6, wherein the vehicle integration module is configured to subsequently enable the start relay in the running mode in response to:
receiving a signal that is indicative of a safe condition from each of one or more sensors;
not receiving an engine-kill signal or a force-to-neutral signal; and
determining that transaxles are in a neutral position.

8. A utility vehicle with a drive and control system, the utility vehicle comprising:
a CAN bus;
a plurality of digital controllers connected to the CAN bus, wherein each of the plurality of digital controllers is configured to control at least one output device;
a plurality of analog input sensors, each of which is configured to monitor at least one operational parameter; and
a vehicle controller that is connected to each of the plurality of analog input sensors for unilateral communication with each of the plurality of analog input sensors and is connected to the CAN bus for bilateral communication with each of the plurality of digital controllers, wherein the vehicle controller is configured to:
receive an analog input signal from each of the plurality of analog input sensors;
determine an operating state for each of the plurality of analog input sensors based on the respective analog input signal, wherein the operating state for each of the plurality of analog input sensors is a "go" state or a "no-go" state;
determine a system state for the utility vehicle based on the operating state of each of the plurality of analog input sensors; and
send a digital signal based on the system state to one or more of the plurality of digital controllers via the CAN bus for operation of the utility vehicle.

9. The utility vehicle of claim 8, wherein the digital signal is a "ready to operate" signal in response to the vehicle controller determining that the analog input signal of each of the plurality of analog input sensors corresponds with the "go" state.

10. The utility vehicle of claim 8, wherein the digital signal is a "do not permit startup" signal in response to the vehicle controller determining that the analog input signal of one or more of the plurality of analog input sensors corresponds with the "no-go" state.

11. The utility vehicle of claim 10, wherein the vehicle controller is configured to convert the analog input signal into a digital message for each of the plurality of analog input sensors.

12. The utility vehicle of claim 11, wherein the plurality of analog input sensors includes a parking brake sensor, and wherein the vehicle controller is configured to convert the analog input signal of the parking brake sensor into a "parking brake engaged" message when the operating state for the brake sensor is the "go" state.

13. The utility vehicle of claim 11, wherein the plurality of analog input sensors includes a power take-off engagement sensor, and wherein the vehicle controller is configured to convert the analog input signal of the power take-off engagement sensor into a "PTO disengaged" message when the operating state for the power take-off engagement sensor is the "go" state.

14. The utility vehicle of claim 11, wherein the plurality of analog input sensors includes a neutral sensor configured to detect a drive state, and wherein the vehicle controller is configured to convert the analog input signal of the neutral sensor into a "neutral off" message when the operating state for the neutral sensor is the "go" state.

15. A utility vehicle with a drive and control system, the utility vehicle comprising:
- a CAN bus;
- a plurality of digital controllers connected to the CAN bus, wherein each of the plurality of digital controllers is configured to control at least one output device;
- a plurality of analog input sensors each of which is configured to monitor at least one operational parameter; and
- a vehicle controller that is connected to each of the plurality of analog input sensors for unilateral communication with the plurality of analog input sensors and is connected to the CAN bus for bilateral communicate with the plurality of digital controllers, wherein the vehicle controller is configured to:
  - receive one or more analog input signals from the plurality of analog input sensors;
  - receive one or more digital input signals from the plurality of digital controllers via the CAN bus;
  - determine a system state of the utility vehicle based on the one or more analog input signals and the one or more digital input signals; and
  - send a digital control signal to one or more of the plurality of digital controllers via the CAN bus to control operation of the respective at least one output device.

16. The utility vehicle of claim 15, wherein the plurality of digital controllers includes a digital engine controller that is configured to send a digital kill signal.

17. The utility vehicle of claim 15, wherein the vehicle controller is configured to send an analog kill signal.

18. The utility vehicle of claim 17, wherein the vehicle controller is configured to receive a digital output signal from one of the plurality of digital controllers and convert the digital output signal into the analog kill signal.

19. The utility vehicle of claim 15, wherein the vehicle controller is configured to convert the one or more analog input signals into respective one or more digital signals that can be transmitted via the CAN bus.

20. The utility vehicle of claim 15, wherein the vehicle controller includes a power regulator for receiving the one or more analog input signals.

* * * * *